(12) United States Patent
Fang et al.

(10) Patent No.: US 10,158,294 B2
(45) Date of Patent: Dec. 18, 2018

(54) SYSTEMS AND METHODS FOR CONSTANT CURRENT CONTROL WITH PRIMARY-SIDE SENSING AND REGULATION IN VARIOUS OPERATION MODES

(71) Applicant: GUANGZHOU ON-BRIGHT ELECTRONICS CO., LTD., Guangzhou (CN)

(72) Inventors: Lieyi Fang, Shanghai (CN); Guo Wei Lin, Guangzhou (CN)

(73) Assignee: Guangzhou On-Bright Electronics Co., Ltd., Guangzhou (CN)

( * ) Notice: Subject to any disclaimer, the term of this patent is extended or adjusted under 35 U.S.C. 154(b) by 0 days.

(21) Appl. No.: 15/707,184

(22) Filed: Sep. 18, 2017

(65) Prior Publication Data

US 2018/0076717 A1 Mar. 15, 2018

Related U.S. Application Data

(60) Continuation of application No. 15/054,032, filed on Feb. 25, 2016, now Pat. No. 9,812,970, which is a
(Continued)

(30) Foreign Application Priority Data

May 5, 2011 (CN) .......................... 2011 1 0123187

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 3/33515* (2013.01); *H02M 2001/0009* (2013.01); *Y02B 70/1433* (2013.01)

(58) Field of Classification Search
CPC .................... H02M 3/33515; H02M 3/33507
See application file for complete search history.

(56) References Cited

U.S. PATENT DOCUMENTS 5,497,119 A 3/1996 Tedrow et al.
6,069,458 A 5/2000 Takehara et al.
(Continued)

FOREIGN PATENT DOCUMENTS

CN 1806381 A 7/2006
CN 101039075 A 9/2007
(Continued)

OTHER PUBLICATIONS

Chinese Patent Office, Office Action dated Apr. 24, 2014, in Application No. 201210099930.8.
(Continued)

*Primary Examiner* — Adolf Berhane
*Assistant Examiner* — Afework Demisse
(74) *Attorney, Agent, or Firm* — Faegre Baker Daniels LLP

(57) ABSTRACT

System and method for regulating a power converter. The system includes a first signal processing component configured to receive at least a sensed signal and generate a first signal. The sensed signal is associated with a primary current flowing through a primary winding coupled to a secondary winding for a power converter. Additionally, the system includes a second signal processing component configured to generate a second signal, an integrator component configured to receive the first signal and the second signal and generate a third signal, and a comparator configured to process information associated with the third signal and the sensed signal and generate a comparison signal based on at least information associated with the third signal and the sensed signal.

25 Claims, 30 Drawing Sheets

Related U.S. Application Data division of application No. 14/536,514, filed on Nov. 7, 2014, now Pat. No. 9,343,979, which is a division of application No. 13/152,646, filed on Jun. 3, 2011, now Pat. No. 8,917,527.

(56) References Cited

U.S. PATENT DOCUMENTS

| | | |
|---|---|---|
| 6,977,824 B1 | 12/2005 | Yang et al. |
| 7,061,780 B2 | 6/2006 | Yang et al. |
| 7,535,736 B2 | 5/2009 | Nakamura et al. |
| 7,869,229 B2 | 1/2011 | Huynh et al. |
| 7,898,187 B1 | 3/2011 | Mei et al. |
| 7,990,202 B2 | 8/2011 | Fang et al. |
| 8,013,544 B2 | 9/2011 | Negrete et al. |
| 8,093,826 B1 | 1/2012 | Eagar et al. |
| 8,144,487 B2 | 3/2012 | Djenguerian et al. |
| 8,391,028 B2 | 3/2013 | Yeh |
| 8,416,596 B2 | 4/2013 | Huang |
| 8,525,442 B2 | 9/2013 | Zimmermann et al. |
| 8,593,075 B1 | 11/2013 | Melanson et al. |
| 8,630,103 B2 | 1/2014 | Bäurle et al. |
| 8,664,883 B2 | 3/2014 | Hiramatu et al. |
| 8,824,173 B2 | 9/2014 | Fang et al. |
| 8,917,527 B2 | 12/2014 | Fang et al. |
| 9,084,317 B2 | 7/2015 | Fang et al. |
| 9,088,218 B2 | 7/2015 | Zhang et al. |
| 9,124,188 B2 | 9/2015 | Fang et al. |
| 9,148,061 B2 | 9/2015 | Fang et al. |
| 9,343,979 B2 | 5/2016 | Fang et al. |
| 9,531,278 B2 | 12/2016 | Zhang et al. |
| 9,794,997 B2 | 10/2017 | Fang et al. |
| 9,807,840 B2 | 10/2017 | Fang et al. |
| 9,812,970 B2 | 11/2017 | Fang et al. |
| 2002/0080625 A1 | 6/2002 | Goyhenetche et al. |
| 2003/0174520 A1 | 9/2003 | Bimbaud |
| 2006/0113975 A1 | 6/2006 | Mednik et al. |
| 2006/0244429 A1 | 11/2006 | Quitayen |
| 2007/0120506 A1 | 5/2007 | Grant |
| 2008/0067993 A1 | 3/2008 | Coleman |
| 2008/0191679 A1 | 8/2008 | Williams |
| 2009/0051336 A1 | 2/2009 | Hartlieb et al. |
| 2009/0051340 A1 | 2/2009 | Wang |
| 2009/0091953 A1 | 4/2009 | Huynh et al. |
| 2009/0261758 A1 | 10/2009 | Ger |
| 2009/0273292 A1 | 11/2009 | Zimmermann |
| 2009/0289618 A1 | 11/2009 | Tajima et al. |
| 2010/0019682 A1 | 1/2010 | Lu et al. |
| 2010/0020573 A1 | 1/2010 | Melanson |
| 2010/0128501 A1 | 5/2010 | Huang et al. |
| 2010/0141178 A1 | 6/2010 | Negrete et al. |
| 2010/0238689 A1 | 9/2010 | Fei et al. |
| 2010/0308733 A1 | 12/2010 | Shao |
| 2010/0321956 A1 | 12/2010 | Yeh |
| 2011/0044076 A1 | 2/2011 | Zhang et al. |
| 2011/0096574 A1 | 4/2011 | Huang |
| 2011/0148376 A1 | 6/2011 | Xu et al. |
| 2011/0254457 A1 | 10/2011 | Marent et al. |
| 2011/0267846 A1 | 11/2011 | Djenguerian et al. |
| 2011/0292704 A1 | 12/2011 | Makino et al. |
| 2012/0008344 A1 | 1/2012 | Zeng et al. |
| 2012/0049758 A1 | 3/2012 | Hwang et al. |
| 2012/0049825 A1 | 3/2012 | Chen et al. |
| 2012/0075891 A1 | 3/2012 | Zhang et al. |
| 2012/0105030 A1 | 5/2012 | Chen et al. |
| 2012/0120342 A1 | 5/2012 | Uchimoto et al. |
| 2012/0146532 A1 | 6/2012 | Ivey et al. |
| 2012/0147630 A1 | 6/2012 | Cao et al. |
| 2012/0155122 A1 | 6/2012 | Tang et al. |
| 2012/0195076 A1* | 8/2012 | Zhang ............ H02M 3/33523 363/21.12 |
| 2012/0217890 A1 | 8/2012 | Chang et al. |
| 2012/0281438 A1 | 11/2012 | Fang et al. |
| 2012/0320640 A1 | 12/2012 | Baurle et al. |
| 2013/0033905 A1 | 2/2013 | Lin et al. |
| 2013/0038227 A1 | 2/2013 | Yan et al. |
| 2013/0093356 A1 | 4/2013 | Green et al. |
| 2013/0114307 A1 | 5/2013 | Fang et al. |
| 2013/0119881 A1 | 5/2013 | Fang et al. |
| 2013/0147379 A1 | 6/2013 | Zhou et al. |
| 2013/0148387 A1 | 6/2013 | Ren et al. |
| 2013/0258723 A1 | 10/2013 | Fang et al. |
| 2013/0307431 A1 | 11/2013 | Zhu et al. |
| 2014/0029315 A1 | 1/2014 | Zhang et al. |
| 2014/0043879 A1 | 2/2014 | Eum et al. |
| 2014/0104895 A1 | 4/2014 | Baurle et al. |
| 2014/0140109 A1 | 5/2014 | Valley |
| 2014/0146578 A1 | 5/2014 | Fang et al. |
| 2014/0177280 A1 | 6/2014 | Yang et al. |
| 2015/0084530 A1 | 3/2015 | Kitamura et al. |
| 2015/0180347 A1 | 6/2015 | Fang et al. |
| 2015/0188441 A1 | 7/2015 | Fang et al. |
| 2015/0295494 A1 | 10/2015 | Gong |
| 2015/0311804 A1 | 10/2015 | Fang |
| 2015/0326130 A1 | 11/2015 | Zhang et al. |
| 2015/0334803 A1 | 11/2015 | Fang et al. |
| 2016/0028318 A1 | 1/2016 | Fang et al. |
| 2016/0276939 A1 | 9/2016 | Fang et al. |
| 2016/0278178 A1 | 9/2016 | Fang et al. |
| 2016/0285375 A1 | 9/2016 | Fang et al. |
| 2016/0329821 A1 | 11/2016 | Zhang et al. |
| 2017/0126137 A1 | 5/2017 | Zhang et al. |
| 2018/0042078 A1 | 2/2018 | Fang et al. |
| 2018/0042079 A1 | 2/2018 | Fang et al. |
| 2018/0124891 A1 | 5/2018 | Fang et al. |

FOREIGN PATENT DOCUMENTS

| | | |
|---|---|---|
| CN | 101056063 A | 10/2007 |
| CN | 101164384 A | 4/2008 |
| CN | 201087939 Y | 7/2008 |
| CN | 101248574 A | 8/2008 |
| CN | 101777848 A | 7/2010 |
| CN | 101835311 A | 9/2010 |
| CN | 1882214 B | 5/2011 |
| CN | 102055344 A | 5/2011 |
| CN | 102065602 A | 5/2011 |
| CN | 102076138 A | 5/2011 |
| CN | 102076149 A | 5/2011 |
| CN | 102083257 A | 6/2011 |
| CN | 102105010 A | 6/2011 |
| CN | 102158091 A | 8/2011 |
| CN | 102164439 A | 8/2011 |
| CN | 102185466 A | 9/2011 |
| CN | 102187736 A | 9/2011 |
| CN | 102202449 A | 9/2011 |
| CN | 102361402 A | 2/2012 |
| CN | 102437842 A | 5/2012 |
| CN | 102638165 A | 8/2012 |
| CN | 102651613 A | 8/2012 |
| CN | 102651935 A | 8/2012 |
| CN | 202435294 U | 9/2012 |
| CN | 103108437 | 5/2013 |
| CN | 103441660 A | 12/2013 |
| JP | 2011171231 | 9/2011 |
| TW | 185041 | 6/1992 |
| TW | 583817 | 4/2004 |
| TW | I 312914 | 8/2009 |
| TW | I 338994 | 3/2011 |
| TW | M412573 | 9/2011 |
| TW | 201134078 | 10/2011 |
| TW | I 357708 | 2/2012 |
| TW | 201218594 | 5/2012 |
| TW | 201249079 A | 12/2012 |
| TW | I 362170 | 12/2012 |
| TW | 201308842 A | 2/2013 |
| WO | WO 2007/041897 A1 | 4/2007 |

OTHER PUBLICATIONS

Chinese Patent Office, Office Action dated Apr. 3, 2014, in Application No. 201210258359.X.

(56) References Cited

OTHER PUBLICATIONS

Chinese Patent Office, Office Action dated May 14, 2014, in Application No. 201110123187.0.
Chinese Patent Office, Office Action dated Nov. 22, 2013, in Application No. 201110376439.0.
Chinese Patent Office, Office Action dated Apr. 15, 2015, in Application No. 201410053176.3.
Chinese Patent Office, Office Action dated Apr. 14, 2017, in Application No. 201510622975.2.
Chinese Patent Office, Office Action dated Oct. 10, 2017, in Application No. 201610177113.8.
Chinese Patent Office, Office Action dated Oct. 23, 2017, in Application No. 201610177276.6.
Chinese Patent Office, Office Action dated Dec. 25, 2017, in Application No. 201610177097.2.
Liang et al., "Differential Detection Method of MOSFET Drain-source Voltage Valley Time," (Mar. 31, 2010).
Taiwanese Patent Office, Office Action dated Mar. 6, 2014, in Application No. 101102919.
Taiwanese Patent Office, Office Action dated Nov. 10, 2014, in Application No. 101118856.
Taiwanese Patent Office, Office Action dated Oct. 22, 2013, in Application No. 100120903.
Taiwanese Patent Office, Office Action dated Sep. 2, 2014, in Application No. 101144020.
Taiwanese Patent Office, Office Action dated Dec. 15, 2015, in Application No. 103140986.
United States Patent and Trademark Office, Office Action dated Nov. 18, 2015, in U.S. Appl. No. 14/273,339.
United States Patent and Trademark Office, Office Action dated Jul. 27, 2016, in U.S. Appl. No. 14/273,339.
United States Patent and Trademark Office, Notice of Allowance dated Apr. 14, 2017, in U.S. Appl. No. 14/273,339.
United States Patent and Trademark Office, Notice of Allowance dated Sep. 21, 2017, in U.S. Appl. No. 14/273,339.
United States Patent and Trademark Office, Office Action dated Dec. 27, 2016, in U.S. Appl. No. 15/054,026.
United States Patent and Trademark Office, Office Action dated Jun. 2, 2017, in U.S. Appl. No. 15/054,026.
United States Patent and Trademark Office, Notice of Allowance dated Oct. 17, 2017, in U.S. Appl. No. 15/054,026.
United States Patent and Trademark Office, Notice of Allowance dated Dec. 18, 2017, in U.S. Appl. No. 15/054,026.
United States Patent and Trademark Office, Office Action dated Nov. 2, 2016, in U.S. Appl. No. 14/824,018.
United States Patent and Trademark Office, Office Action dated Jun. 30, 2017, in U.S. Appl. No. 14/824,018.
United States Patent and Trademark Office, Notice of Allowance dated Nov. 14, 2017, in U.S. Appl. No. 14/824,018.
United States Patent and Trademark Office, Office Action dated Mar. 22, 2017, in U.S. Appl. No. 15/152,362.
United States Patent and Trademark Office, Office Action dated Dec. 18, 2017, in U.S. Appl. No. 15/152,362.
United States Patent and Trademark Office, Office Action dated Oct. 5, 2017, in U.S. Appl. No. 15/352,133.
United States Patent and Trademark Office, Notice of Allowance dated Jan. 24, 2018, in U.S. Appl. No. 14/273,339.
United States Patent and Trademark Office, Notice of Allowance dated Jan. 18, 2018, in U.S. Appl. No. 14/824,018.
United States Patent and Trademark Office, Office Action dated Mar. 1, 2018, in U.S. Appl. No. 15/683,489.
Chinese Patent Office, Office Action dated Jul. 2, 2018, in Application No. 201610177276.6.
United States Patent and Trademark Office, Notice of Allowance dated Jul. 6, 2018, in U.S. Appl. No. 15/152,362.
United States Patent and Trademark Office, Notice of Allowance dated Jun. 22, 2018, in U.S. Appl. No. 15/352,133.
United States Patent and Trademark Office, Notice of Allowance dated Aug. 9, 2018, in U.S. Appl. No. 15/683,402.
United States Patent and Trademark Office, Notice of Allowance dated Sep. 20, 2018, in U.S. Appl. No. 15/352,133.
United States Patent and Trademark Office, Office Action dated Oct. 4, 2018, in U.S. Appl. No. 15/683,489.
United States Patent and Trademark Office, Notice of Allowance dated Sep. 28, 2018, in U.S. Appl. No. 15/812,933.

* cited by examiner

SYSTEMS AND METHODS FOR CONSTANT CURRENT CONTROL WITH PRIMARY-SIDE SENSING AND REGULATION IN VARIOUS OPERATION MODES

1. CROSS-REFERENCES TO RELATED APPLICATIONS

This application is a continuation of U.S. patent application Ser. No. 15/054,032, filed Feb. 25, 2016, which is a divisional of U.S. patent application Ser. No. 14/536,514, filed Nov. 7, 2014, which is a divisional of U.S. patent application Ser. No. 13/152,646, filed Jun. 3, 2011, which claims priority to Chinese Patent Application No. 201110123187.0, filed May 5, 2011, all of the above-referenced applications being incorporated by reference herein for all purposes.

2. BACKGROUND OF THE INVENTION

The present invention is directed to integrated circuits. More particularly, the invention provides systems and methods for constant current control with primary-side sensing and regulation in various operation modes. Merely by way of example, the invention has been applied to a flyback power converter. But it would be recognized that the invention has a much broader range of applicability.

Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side.

FIG. 1 is a simplified diagram showing a conventional flyback power conversion system with primary-side sensing and regulation. The power conversion system 100 includes a primary winding 110, a secondary winding 112, an auxiliary winding 114, a power switch 120, a current sensing resistor 130, an equivalent resistor 140 for an output cable, resistors 150 and 152, and a rectifying diode 160. For example, the power switch 120 is a bipolar transistor. In another example, the power switch 120 is a MOS transistor.

To regulate the output voltage within a predetermined range, information related to the output voltage and the output loading often needs to be extracted. In the power conversion system 100, such information can be extracted through the auxiliary winding 114. When the power switch 120 is turned on, the energy is stored in the secondary winding 112. Then, when the power switch 120 is turned off, the stored energy is released to the output terminal, and the voltage of the auxiliary winding 114 maps the output voltage on the secondary side as shown below:

$$V_{FB} = \frac{R_2}{R_1 + R_2} \times V_{aux} = k \times n \times (V_o + V_F + I_o \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $I_o$ represent the output voltage and the output current respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1 + R_2} \quad \text{(Equation 2)}$$

FIG. 2 is a simplified diagram showing a conventional operation mechanism for the flyback power conversion system 100. As shown in FIG. 2, the controller chip of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 114 is sampled at, for example, point A of FIG. 2. The sampled voltage value is usually held until the next voltage sampling is performed. Through a negative feedback loop, the sampled voltage value can become equal to a reference voltage $V_{ref}$. Therefore, $$V_{FB} = V_{ref} \quad \text{(Equation 3)}$$

Combining Equations 1 and 3, the following can be obtained:

$$V_o = \frac{V_{ref}}{k \times n} - V_F - I_o \times R_{eq} \quad \text{(Equation 4)}$$

Based on Equation 4, the output voltage decreases with the increasing output current.

Additionally, in the discontinuous conduction mode (DCM), the flyback power conversion system 100 can also regulate the output current regardless of the output voltage based on information associated with the waveform for the voltage $V_{aux}$ of the auxiliary winding 114 as shown in FIG. 2.

FIG. 3 is a simplified conventional diagram showing characteristics of output voltage and output current of a flyback power conversion system. As shown in FIG. 3, if the output current $I_o$ is in the range of from zero to $I_{max}$, the system operates in the constant voltage (CV) mode. In the CV mode, the output voltage $V_o$ is equal to $V_{max}$. Alternatively, if the output voltage is below $V_{max}$, the system operates in the constant current (CC) mode. In the CC mode, the output current $I_o$ is equal to $I_{max}$. For example, if the output terminal of the system is connected to a discharged battery, the system operates in the CC mode.

FIG. 4 is a simplified diagram showing a conventional flyback power conversion system with primary-side sensing and regulation. The power conversion system 300 includes a primary winding 310, a secondary winding 312, an auxiliary winding 314, a power switch 320, a current sensing resistor 330, an equivalent resistor 340 for an output cable, resistors 350 and 352, a rectifying diode 360, and a controller 370. For example, the power switch 320 is a bipolar transistor. In another example, the power switch 320 is a MOS transistor.

As shown in FIG. 4, the auxiliary winding 314 is magnetically coupled to the secondary winding 312, which, with one or more other components, generates the output voltage.

Information related to the output voltage is processed by a voltage divider of the resistors 350 and 352, and is used to generate a feedback voltage 354, which is received by a terminal 372 (e.g., the terminal FB) of the controller 370. The controller 370 samples and holds the feedback voltage 354, and the sampled voltage is compared with a predetermined reference voltage (e.g., V_REF). The error of the sampled voltage with respect to the reference voltage is amplified, and the amplified error is used to control the pulse width for pulse-width modulation (PWM) and/or the switching frequency for pulse-frequency modulation (PFM) in order to regulate the output voltage in the constant voltage mode. In contrast, in the constant current mode, the output current is estimated by sensing the primary current that flows through the primary winding 310 and determining length of the demagnetization period.

FIGS. 5(A), (B), and (C) are simplified diagrams showing certain conventional timing diagrams for a flyback power conversion system with primary-side sensing and regulation that operates in the discontinuous conduction mode (DCM), the continuous conduction mode (CCM), and the quasi-resonant (QR) mode, respectively.

As shown in FIG. 5(A), in DCM, the off-time of the switch, $T_{off}$, is much longer than the demagnetization period, $T_{demag}$. The demagnetization process ends at point C, and the next switching cycle starts after the completion of the demagnetization process. The demagnetization period is determined as follows:

$$T_{demag} = \frac{I_{sec\_p}}{(V_o/L_s)} = \frac{I_{sec\_p} \times L_s}{V_o} \quad \text{(Equation 5)}$$

where $V_o$ is the output voltage, $I_{sec\_p}$, is the peak value of the secondary current that flows through the secondary winding, and $L_s$ is the inductance of the secondary winding.

Additionally, as shown in FIG. 5(B), in CCM, the next switching cycle starts before the demagnetization process is completed. In CCM, the residual energy reflects back to the primary winding and appears as the initial primary current, $I_{pri\_0}$, at the beginning of the next switching cycle.

Moreover, as shown in FIG. 5(C), in the QR mode, the demagnetization period, $I_{demag}$, is slightly shorter than the off-time of the switch, $T_{off}$. The demagnetization process ends at point C, and the next switching cycle starts shortly after the completion of the demagnetization process. The next switching cycle starts at a minimum voltage level (e.g., a valley) of the drain voltage of a MOS transistor switch or at a minimum voltage level (e.g., a valley) of the collector voltage of a bipolar transistor switch.

The conventional power conversion system with primary-side sensing and regulation often operates in the DCM mode. But the CCM mode and the QR mode usually can achieve higher efficiency than the DCM mode. Hence it is highly desirable to improve the techniques of constant current control with primary-side sensing and regulation that can operate in the CCM mode and the QR modes, in addition to the DCM mode, and that can provide both high power factor and precision control of constant output current.

3. BRIEF SUMMARY OF THE INVENTION

The present invention is directed to integrated circuits. More particularly, the invention provides systems and methods for constant current control with primary-side sensing and regulation in various operation modes. Merely by way of example, the invention has been applied to a flyback power converter. But it would be recognized that the invention has a much broader range of applicability.

According to one embodiment, a system for regulating a power converter includes a first signal processing component configured to receive at least a sensed signal and generate a first signal. The sensed signal is associated with a primary current flowing through a primary winding coupled to a secondary winding for a power converter. Additionally, the system includes a second signal processing component configured to generate a second signal, an integrator component configured to receive the first signal and the second signal and generate a third signal, and a comparator configured to process information associated with the third signal and the sensed signal and generate a comparison signal based on at least information associated with the third signal and the sensed signal. Moreover, the system includes a signal generator configured to receive at least the comparison signal and generate a modulation signal, and a gate driver configured to receive the modulation signal and output a drive signal to a switch. The switch is configured to affect the primary current flowing through the primary winding. The drive signal is associated with at least one or more switching periods, and each of the one or more switching periods includes at least an on-time period for the switch and a demagnetization period for a demagnetization process. For each of the one or more switching periods, the first signal represents the demagnetization period multiplied by a sum of a first current magnitude and a second current magnitude, and the second signal represents the switching period multiplied by a predetermined current magnitude. The first current magnitude represents the primary current at the beginning of the on-time period, and the second current magnitude represents the primary current at the end of the on-time period. The integrator component is further configured to integrate period-by-period differences between the first signal and the second signal for a plurality of switching periods, and the third signal represents the integrated period-by-period differences. The integrated period-by-period differences are smaller than a predetermined threshold in magnitude.

According to another embodiment, a method for regulating a power converter includes receiving at least a sensed signal. The sensed signal is associated with a primary current flowing through a primary winding coupled to a secondary winding for a power converter. Additionally, the method includes processing information associated with the sensed signal, generating a first signal based on at least information associated with the sensed signal, and generating a second signal. Moreover, the method includes receiving the first signal and the second signal, processing information associated with the first signal and the second signal, generating a third signal based on at least information associated with the first signal and the second signal, processing information associated with the third signal and the sensed signal, and generating a comparison signal based on at least information associated with the third signal and the sensed signal. Also, the method includes receiving at least the comparison signal, generating a modulation signal based on at least information associated with the comparison signal, receiving the modulation signal, and outputting a drive signal based on at least information associated with the modulation signal to affect the primary current flowing through the primary winding. The drive signal is associated with at least one or more switching periods, and each of the one or more switching periods includes at least an on-time period and a demagnetization period. For each of the one or more switching periods, the first signal represents the demagnetization period multiplied by a sum of a first current magnitude and a second current magnitude, and the second signal represents the switching period multiplied by a predetermined current magnitude. The first current magnitude represents the primary current at the beginning of the on-time period, and the second current magnitude represents the primary current at the end of the on-time period. The process for processing information associated with the first signal and the second signal includes integrating period-by-period differences between the first signal and the second signal for a plurality of switching periods, and the third signal represents the integrated period-by-period differences. The integrated period-by-period differences are smaller than a predetermined threshold in magnitude.

According to yet another embodiment, a system for regulating a power converter includes a first sampling-and-holding and voltage-to-current-conversion component configured to receive at least a sensed signal and generate a first current signal. The sensed signal is associated with a primary current flowing through a primary winding coupled to a secondary winding for a power converter. Additionally, the system includes a second sampling-and-holding and voltage-to-current-conversion component configured to receive at least the sensed signal and generate a second current signal, a current-signal generator configured to generate a third current signal, and a capacitor coupled to the current-signal generator and coupled, through a switch, to the first sampling-and-holding and voltage-to-current-conversion component and the second sampling-and-holding and voltage-to-current-conversion component. The capacitor is configured to generate a voltage signal. Moreover, the system includes a comparator configured to process information associated with the voltage signal and the sensed signal and generate a comparison signal based on at least information associated with the voltage signal and the sensed signal. Also, the system includes a modulation-signal generator configured to receive at least the comparison signal and generate a modulation signal, and a gate driver configured to receive the modulation signal and output a drive signal to a switch. The switch is configured to affect the primary current flowing through the primary winding. The drive signal is associated with at least one or more switching periods, and each of the one or more switching periods includes at least an on-time period for the switch and a demagnetization period for a demagnetization process. The first current signal represents the primary current at the beginning of the on-time period, and the second current signal represents the primary current at the end of the on-time period. For each of the one or more switching periods, the first current signal and the second current signal discharge or charge the capacitor during only the demagnetization period, the third current signal charges or discharges the capacitor during the switching period, and the switching period multiplied by the third current signal is equal to the demagnetization period multiplied by a sum of the first current signal and the second current signal in magnitude.

According to yet another embodiment, a method for regulating a power converter includes receiving at least a sensed signal. The sensed signal is associated with a primary current flowing through a primary winding coupled to a secondary winding for a power converter. Additionally, the method includes processing information associated with the sensed signal, generating a first current signal and a second current signal based on at least information associated with the sensed signal, generating a third current signal, and processing information associated with the first current signal, the second current signal and the third current signal. Moreover, the method includes generating a voltage signal, by at least a capacitor, based on at least information associated with the first current signal, the second current signal and the third current signal, processing information associated with the voltage signal and the sensed signal, and generating a comparison signal based on at least information associated with the voltage signal and the sensed signal. Also, the method includes receiving at least the comparison signal, generating a modulation signal based on at least information associated with the comparison signal, receiving the modulation signal, and outputting a drive signal based on at least information associated with the modulation signal to affect the primary current flowing through the primary winding. The drive signal is associated with at least one or more switching periods, and each of the one or more switching periods includes at least an on-time period and a demagnetization period. The first current signal represents the primary current at the beginning of the on-time period, and the second current signal represents the primary current at the end of the on-time period. For each of the one or more switching periods, the process for processing information associated with the first current signal, the second current signal and the third current signal includes discharging or charging the capacitor with the first current signal and the second current signal during only the demagnetization period, and charging or discharging the capacitor with the third current signal during the switching period. The switching period multiplied by the third current signal is equal to the demagnetization period multiplied by a sum of the first current signal and the second current signal in magnitude.

According to yet another embodiment, a system for regulating a power converter includes a voltage-to-current-conversion component configured to generate a first current signal, a current-signal generator configured to generate a second current signal, and a capacitor coupled to the current-signal generator and coupled, through a switch, to the voltage-to-current-conversion component. The capacitor is configured to generate a voltage signal. Additionally, the system includes a comparator configured to process information associated with the voltage signal and a sensed signal and generate a comparison signal based on at least information associated with the voltage signal and the sensed signal. The sensed signal is associated with a primary current flowing through a primary winding coupled to a secondary winding for a power converter. Moreover, the system includes a modulation-signal generator configured to receive at least the comparison signal and generate a modulation signal, and a gate driver configured to receive the modulation signal and output a drive signal to a switch. The switch is configured to affect the primary current flowing through the primary winding. The voltage-to-current-conversion component is further configured to process information associated with the voltage signal and generate the first current signal based on at least information associated with the voltage signal. The drive signal is associated with at least one or more switching periods, and each of the one or more switching periods includes at least an on-time period for the switch and a demagnetization period for a demagnetization process. The first current signal represents the primary current at the end of the on-time period. For each of the one or more switching periods, the first current signal discharges or charges the capacitor during only the demagnetization period, the second current signal charges or discharges the capacitor during the switching period, and the switching period multiplied by the second current signal is equal to the demagnetization period multiplied by the first current signal in magnitude.

According to yet another embodiment, a method for regulating a power converter includes generating a first current signal and a second current signal, processing information associated with the first current signal and the second current signal, generating a voltage signal, by at least a capacitor, based on at least information associated with the first current signal and the second current signal, and processing information associated with the voltage signal and a sensed signal. The sensed signal is associated with a primary current flowing through a primary winding coupled to a secondary winding for a power converter. Additionally, the method includes generating a comparison signal based on at least information associated with the voltage signal and the sensed signal, receiving at least the comparison signal, and generating a modulation signal based on at least information associated with the comparison signal. Moreover, the method includes receiving the modulation signal, and outputting a drive signal based on at least information associated with the modulation signal to affect the primary current flowing through the primary winding. The process for generating a first current signal and a second current signal includes processing information associated with the voltage signal and generating the first current signal based on at least information associated with the voltage signal. The drive signal is associated with at least one or more switching periods, each of the one or more switching periods includes at least an on-time period and a demagnetization period, and the first current signal represents the primary current at the end of the on-time period. For each of the one or more switching periods, the process for processing information associated with the first current signal and the second current signal includes discharging or charging the capacitor with the first current signal during only the demagnetization period, and charging or discharging the capacitor with the second current signal during the switching period. The switching period multiplied by the second current signal is equal to the demagnetization period multiplied by the first current signal in magnitude.

According to yet another embodiment, a system for regulating a power converter includes a sampling-and-holding and voltage-to-current-conversion component configured to receive at least a sensed signal and generate a first current signal. The sensed signal is associated with a primary current flowing through a primary winding coupled to a secondary winding for a power converter. Additionally, the system includes a current-signal generator configured to generate a second current signal, and a capacitor coupled to the current-signal generator and coupled, through a switch, to the sampling-and-holding and voltage-to-current-conversion component. The capacitor is configured to generate a voltage signal. Moreover, the system includes a comparator configured to process information associated with the voltage signal and the sensed signal and generate a comparison signal based on at least information associated with the voltage signal and the sensed signal. Also, the system includes a modulation-signal generator configured to receive at least the comparison signal and generate a modulation signal, and a gate driver configured to receive the modulation signal and output a drive signal to a switch. The switch is configured to affect the primary current flowing through the primary winding. The drive signal is associated with at least one or more switching periods, each of the one or more switching periods includes at least an on-time period for the switch and a demagnetization period for a demagnetization process, and the first current signal represents the primary current at the end of the on-time period. For each of the one or more switching periods, the first current signal discharges or charges the capacitor during only the demagnetization period, and the second current signal charges or discharges the capacitor during the switching period. The switching period multiplied by the second current signal is equal to the demagnetization period multiplied by the first current signal in magnitude.

According to yet another embodiment, a method for regulating a power converter includes receiving at least a sensed signal. The sensed signal is associated with a primary current flowing through a primary winding coupled to a secondary winding for a power converter. Additionally, the method includes processing information associated with the sensed signal, generating a first current signal based on at least information associated with the sensed signal, and generating a second current signal. Moreover, the method includes processing information associated with the first current signal and the second current signal, generating a voltage signal, by at least a capacitor, based on at least information associated with the first current signal and the second current signal, processing information associated with the voltage signal and the sensed signal, and generating a comparison signal based on at least information associated with the voltage signal and the sensed signal. Also, the method includes receiving at least the comparison signal, generating a modulation signal based on at least information associated with the comparison signal, receiving the modulation signal, and outputting a drive signal based on at least information associated with the modulation signal to affect the primary current flowing through the primary winding. The drive signal is associated with at least one or more switching periods, each of the one or more switching periods includes at least an on-time period and a demagnetization period, and the first current signal represents the primary current at the end of the on-time period. For each of the one or more switching periods, the process for processing information associated with the first current signal and the second current signal includes discharging or charging the capacitor with the first current signal during only the demagnetization period, and charging or discharging the capacitor with the second current signal during the switching period. The switching period multiplied by the second current signal is equal to the demagnetization period multiplied by the first current signal in magnitude.

According to yet another embodiment, a system for regulating a power converter includes a first sampling-and-holding and voltage-to-current-conversion component configured to receive at least a sensed signal and generate a first current signal. The sensed signal is associated with a primary current flowing through a primary winding coupled to a secondary winding for a power converter. Additionally, the system includes a second sampling-and-holding and voltage-to-current-conversion component configured to receive at least the sensed signal and generate a second current signal, a current-signal generator configured to generate a third current signal, and a capacitor coupled to the current-signal generator and coupled, through a switch, to the first sampling-and-holding and voltage-to-current-conversion component and the second sampling-and-holding and voltage-to-current-conversion component. The capacitor is configured to generate a voltage signal. Moreover, the system includes a comparator configured to process information associated with the voltage signal and a ramping signal and generate a comparison signal based on at least information associated with the voltage signal and the ramping signal, a modulation-signal generator configured to receive at least the comparison signal and generate a modulation signal, and a gate driver configured to receive the modulation signal and output a drive signal to a switch, the switch being configured to affect the primary current flowing through the primary winding. The drive signal is associated with at least a plurality of switching periods, and each of the plurality of switching periods includes at least an on-time period for the switch and a demagnetization period for a demagnetization process. The first current signal represents the primary current at the beginning of the on-time period, and the second current signal represents the primary current at the end of the on-time period. For each of the plurality of switching periods, the first current signal and the second current signal discharge or charge the capacitor during only the demagnetization period, and the third current signal charges or discharges the capacitor during the switching period. Over the plurality of switching periods, accumulatively, the switching period multiplied by the third current signal is equal to the demagnetization period multiplied by a sum of the first current signal and the second current signal in magnitude.

According to yet another embodiment, a method for regulating a power converter includes receiving at least a sensed signal. The sensed signal is associated with a primary current flowing through a primary winding coupled to a secondary winding for a power converter. Additionally, the method includes processing information associated with the sensed signal, generating a first current signal and a second current signal based on at least information associated with the sensed signal, and generating a third current signal. Moreover, the method includes processing information associated with the first current signal, the second current signal and the third current signal, generating a voltage signal, by at least a capacitor, based on at least information associated with the first current signal, the second current signal and the third current signal, processing information associated with the voltage signal and a ramping signal, and generating a comparison signal based on at least information associated with the voltage signal and the ramping signal. Also, the method includes receiving at least the comparison signal, generating a modulation signal based on at least information associated with the comparison signal, receiving the modulation signal, and outputting a drive signal based on at least information associated with the modulation signal to affect the primary current flowing through the primary winding. The drive signal is associated with at least a plurality of switching periods, and each of the plurality of switching periods includes at least an on-time period, a demagnetization period. The first current signal represents the primary current at the beginning of the on-time period, and the second current signal represents the primary current at the end of the on-time period. For each of the plurality of switching periods, the process for processing information associated with the first current signal, the second current signal and the third current signal includes discharging or charging the capacitor with the first current signal and the second current signal during only the demagnetization period, and charging or discharging the capacitor with the third current signal during the switching period. Over the plurality of switching periods, accumulatively, the switching period multiplied by the third current signal is equal to the demagnetization period multiplied by a sum of the first current signal and the second current signal in magnitude.

According to yet another embodiment, a system for regulating a power converter includes a first sampling-and-holding and voltage-to-current-conversion component configured to receive at least a sensed signal and generate a first current signal. The sensed signal is associated with a primary current flowing through a primary winding coupled to a secondary winding for a power converter. Additionally, the system includes a second sampling-and-holding and voltage-to-current-conversion component configured to receive at least the sensed signal and generate a second current signal, a current-signal generator configured to generate a third current signal, and a capacitor coupled to the current-signal generator and coupled, through a switch, to the first sampling-and-holding and voltage-to-current-conversion component and the second sampling-and-holding and voltage-to-current-conversion component. The capacitor is configured to generate a voltage signal. Moreover, the system includes a multiplier component configured to process information associated with the voltage signal and an input signal and generate a multiplication signal based on at least information associated with the voltage signal and the input signal. The input signal is related to the primary winding. Also, the system includes a comparator configured to receive the multiplication signal and the sensed signal and generate a comparison signal based on at least information associated with the multiplication signal and the sensed signal, a modulation-signal generator configured to receive at least the comparison signal and generate a modulation signal, and a gate driver configured to receive the modulation signal and output a drive signal to a switch. The switch is configured to affect the primary current flowing through the primary winding. The drive signal is associated with at least a plurality of switching periods, and each of the plurality of switching periods includes at least an on-time period for the switch and a demagnetization period for a demagnetization process. The first current signal represents the primary current at the beginning of the on-time period, and the second current signal represents the primary current at the end of the on-time period. For each of the plurality of switching periods, the first current signal and the second current signal discharge or charge the capacitor during only the demagnetization period, and the third current signal charges or discharges the capacitor during the switching period. Over the plurality of switching periods, accumulatively, the switching period multiplied by the third current signal is equal to the demagnetization period multiplied by a sum of the first current signal and the second current signal in magnitude.

According to yet another embodiment, a method for regulating a power converter includes receiving at least a sensed signal. The sensed signal is associated with a primary current flowing through a primary winding coupled to a secondary winding for a power converter. Additionally, the method includes processing information associated with the sensed signal, generating a first current signal and a second current signal based on at least information associated with the sensed signal, generating a third current signal, and processing information associated with the first current signal, the second current signal and the third current signal. Moreover, the method includes generating a voltage signal, by at least a capacitor, based on at least information associated with the first current signal, the second current signal and the third current signal, and processing information associated with the voltage signal and an input signal. The input signal is related to the primary winding. Also, the method includes generating a multiplication signal based on at least information associated with the voltage signal and the input signal, receiving the multiplication signal and the sensed signal, and generating a comparison signal based on at least information associated with the multiplication signal and the sensed signal. Additionally, the method includes receiving at least the comparison signal, generating a modulation signal based on at least information associated with the comparison signal, receiving the modulation signal, and outputting a drive signal based on at least information associated with the modulation signal to affect the primary current flowing through the primary winding. The drive signal is associated with at least a plurality of switching periods, and each of the plurality of switching periods includes at least an on-time period and a demagnetization period. The first current signal represents the primary current at the beginning of the on-time period, and the second current signal represents the primary current at the end of the on-time period. For each of the plurality of switching periods, the process for processing information associated with the first current signal, the second current signal and the third current signal includes discharging or charging the capacitor with the first current signal and the second current signal during only the demagnetization period, and charging or discharging the capacitor with the third current signal during the switching period. Over the plurality of switching periods, accumulatively, the switching period multiplied by the third current signal is equal to the demagnetization period multiplied by a sum of the first current signal and the second current signal in magnitude.

According to yet another embodiment, a system for regulating a power converter includes a voltage-to-current-conversion component configured to generate a first current signal, a current-signal generator configured to generate a second current signal, and a capacitor coupled to the current-signal generator and coupled, through a switch, to the voltage-to-current-conversion component. The capacitor is configured to generate a voltage signal. Additionally, the system includes a multiplier component configured to process information associated with the voltage signal and an input signal and generate a multiplication signal based on at least information associated with the voltage signal and the input signal. The input signal is related to the primary winding. Moreover, the system includes a comparator configured to receive the multiplication signal and the sensed signal and generate a comparison signal based on at least information associated with the multiplication signal and the sensed signal, a modulation-signal generator configured to receive at least the comparison signal and generate a modulation signal, and a gate driver configured to receive the modulation signal and output a drive signal to a switch. The switch is configured to affect the primary current flowing through the primary winding. The voltage-to-current-conversion component is further configured to process information associated with the multiplication signal and generate the first current signal based on at least information associated with the multiplication signal. The drive signal is associated with at least a plurality of switching periods, each of the plurality of switching periods includes at least an on-time period for the switch and a demagnetization period for a demagnetization process, and the first current signal represents the primary current at the end of the on-time period. For each of the plurality of switching periods, the first current signal discharges or charges the capacitor during only the demagnetization period, and the second current signal charges or discharges the capacitor during the switching period. Over the plurality of switching periods, accumulatively, the switching period multiplied by the second current signal is equal to the demagnetization period multiplied by the first current signal in magnitude.

According to yet another embodiment, a method for regulating a power converter includes generating a first current signal and a second current signal, processing information associated with the first current signal and the second current signal, generating a voltage signal, by at least a capacitor, based on at least information associated with the first current signal and the second current signal, and processing information associated with the voltage signal and an input signal. The input signal is related to the primary winding. Additionally, the method includes generating a multiplication signal based on at least information associated with the voltage signal and the input signal, receiving the multiplication signal and the sensed signal, and generating a comparison signal based on at least information associated with the multiplication signal and the sensed signal. Moreover, the method includes receiving at least the comparison signal, generating a modulation signal based on at least information associated with the comparison signal, receiving the modulation signal, and outputting a drive signal based on at least information associated with the modulation signal to affect the primary current flowing through the primary winding. The process for generating a first current signal and a second current signal includes processing information associated with the multiplication signal and generating the first current signal based on at least information associated with the multiplication signal. The drive signal is associated with at least a plurality of switching periods, each of the plurality of switching periods includes at least an on-time period and a demagnetization period, and the first current signal represents the primary current at the end of the on-time period. For each of the plurality of switching periods, the process for processing information associated with the first current signal and the second current signal includes discharging or charging the capacitor with the first current signal during only the demagnetization period, and charging or discharging the capacitor with the second current signal during the switching period. Over the plurality of switching periods, accumulatively, the switching period multiplied by the second current signal is equal to the demagnetization period multiplied by the first current signal in magnitude.

According to yet another embodiment, a system for regulating a power converter includes a sampling-and-holding and voltage-to-current-conversion component configured to receive at least a sensed signal and generate a first current signal. The sensed signal is associated with a primary current flowing through a primary winding coupled to a secondary winding for a power converter. Additionally, the system includes a current-signal generator configured to generate a second current signal, and a capacitor coupled to the current-signal generator and coupled, through a switch, to the sampling-and-holding and voltage-to-current-conversion component. The capacitor is configured to generate a voltage signal. Moreover, the system includes a multiplier component configured to process information associated with the voltage signal and an input signal and generate a multiplication signal based on at least information associated with the voltage signal and the input signal. The input signal is related to the primary winding. Also, the system includes a comparator configured to receive the multiplication signal and the sensed signal and generate a comparison signal based on at least information associated with the multiplication signal and the sensed signal, a modulation-signal generator configured to receive at least the comparison signal and generate a modulation signal, and a gate driver configured to receive the modulation signal and output a drive signal to a switch, the switch being configured to affect the primary current flowing through the primary winding. The drive signal is associated with at least a plurality of switching periods, each of the plurality of switching periods includes at least an on-time period for the switch and a demagnetization period for a demagnetization process, and the first current signal represents the primary current at the end of the on-time period. For each of the plurality of switching periods, the first current signal discharges or charges the capacitor during only the demagnetization period, and the second current signal charges or discharges the capacitor during the switching period. Over the plurality of switching periods, accumulatively, the switching period multiplied by the second current signal is equal to the demagnetization period multiplied by the first current signal in magnitude.

According to yet another embodiment, a method for regulating a power converter includes receiving at least a sensed signal. The sensed signal is associated with a primary current flowing through a primary winding coupled to a secondary winding for a power converter. Additionally, the method includes processing information associated with the sensed signal, generating a first current signal based on at least information associated with the sensed signal, generating a second current signal, processing information associated with the first current signal and the second current signal, generating a voltage signal, by at least a capacitor, based on at least information associated with the first current signal and the second current signal, and processing information associated with the voltage signal and an input signal. The input signal is related to the primary winding. Moreover, the method includes generating a multiplication signal based on at least information associated with the voltage signal and the input signal, receiving the multiplication signal and the sensed signal, and generating a comparison signal based on at least information associated with the multiplication signal and the sensed signal. Also, the method includes receiving at least the comparison signal, generating a modulation signal based on at least information associated with the comparison signal, receiving the modulation signal, and outputting a drive signal based on at least information associated with the modulation signal to affect the primary current flowing through the primary winding. The drive signal is associated with at least a plurality of switching periods, each of the plurality of switching periods includes at least an on-time period and a demagnetization period, and the first current signal represents the primary current at the end of the on-time period. For each of the plurality of switching periods, the process for processing information associated with the first current signal and the second current signal includes discharging or charging the capacitor with the first current signal during only the demagnetization period, and charging or discharging the capacitor with the second current signal during the switching period. Over the plurality of switching periods, accumulatively, the switching period multiplied by the second current signal is equal to the demagnetization period multiplied by the first current signal in magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 5A:
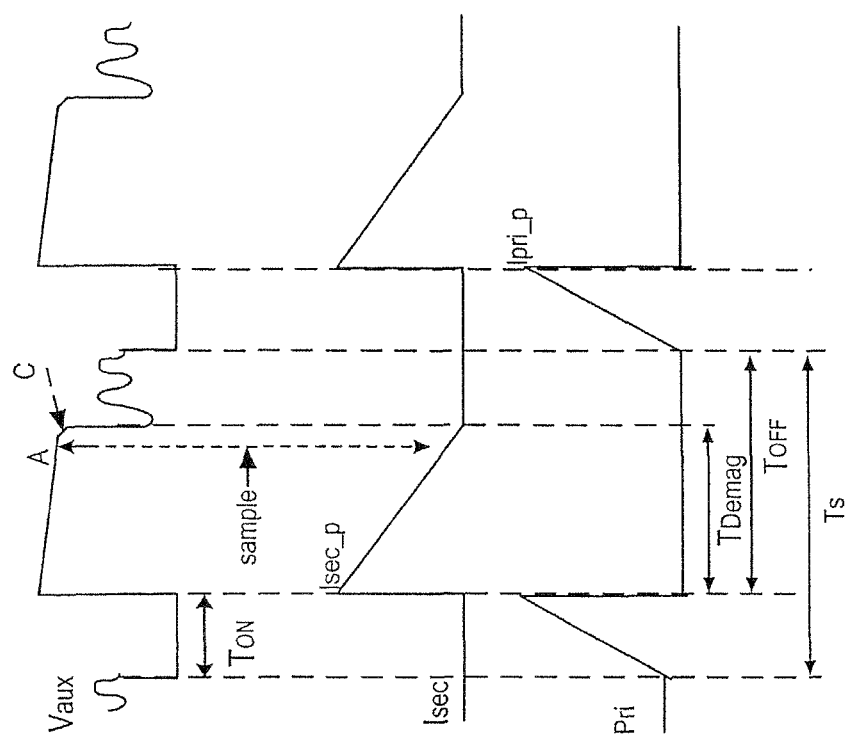

FIGS. 5(A), (B), and (C) are simplified diagrams showing certain conventional timing diagrams for a flyback power conversion system with primary-side sensing and regulation that operates in the discontinuous conduction mode (DCM), the continuous conduction mode (CCM), and the quasi-resonant (QR) mode, respectively.

Figure 6:
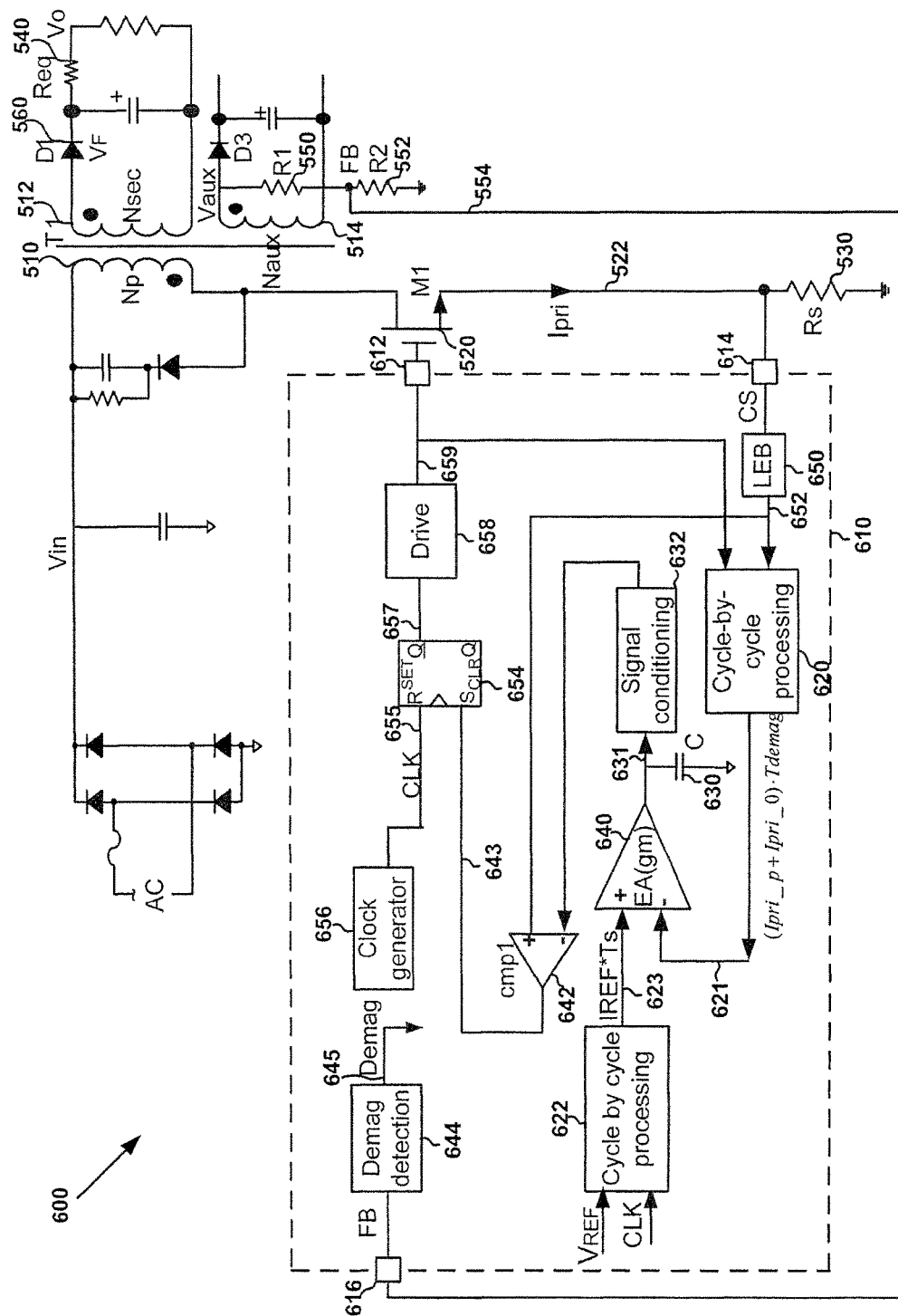

FIG. 6 is a simplified diagram for a switch-mode power conversion system with primary-side sensing and regulation according to an embodiment of the present invention.

Figure 7:
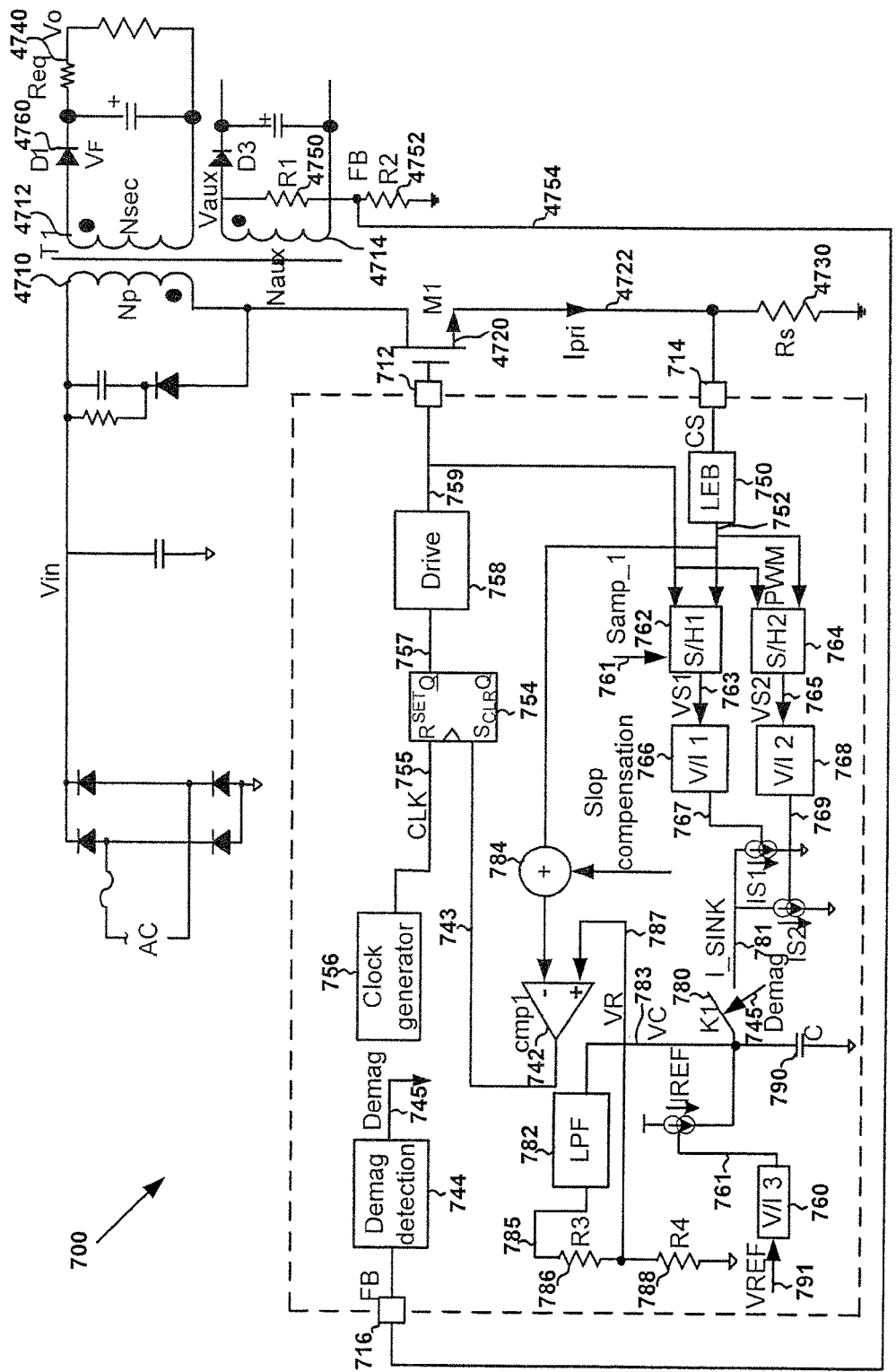

FIG. 7 is a simplified diagram for a switch-mode power conversion system with primary-side sensing and regulation according to another embodiment of the present invention.

Figure 8:
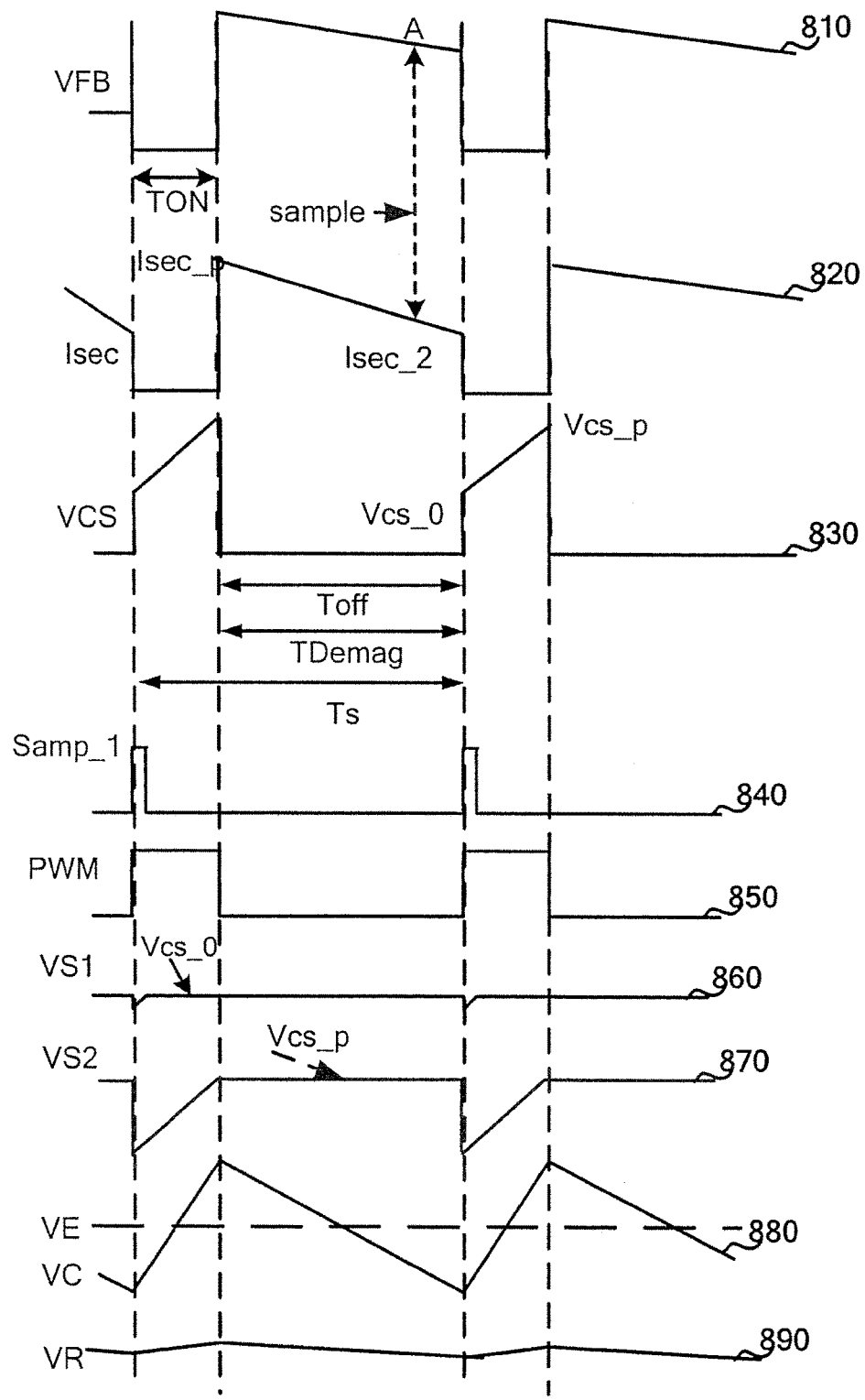

FIG. 8 is a simplified timing diagram for the switch-mode power conversion system with constant current control under CCM and DCM according to an embodiment of the present invention.

Figure 9:
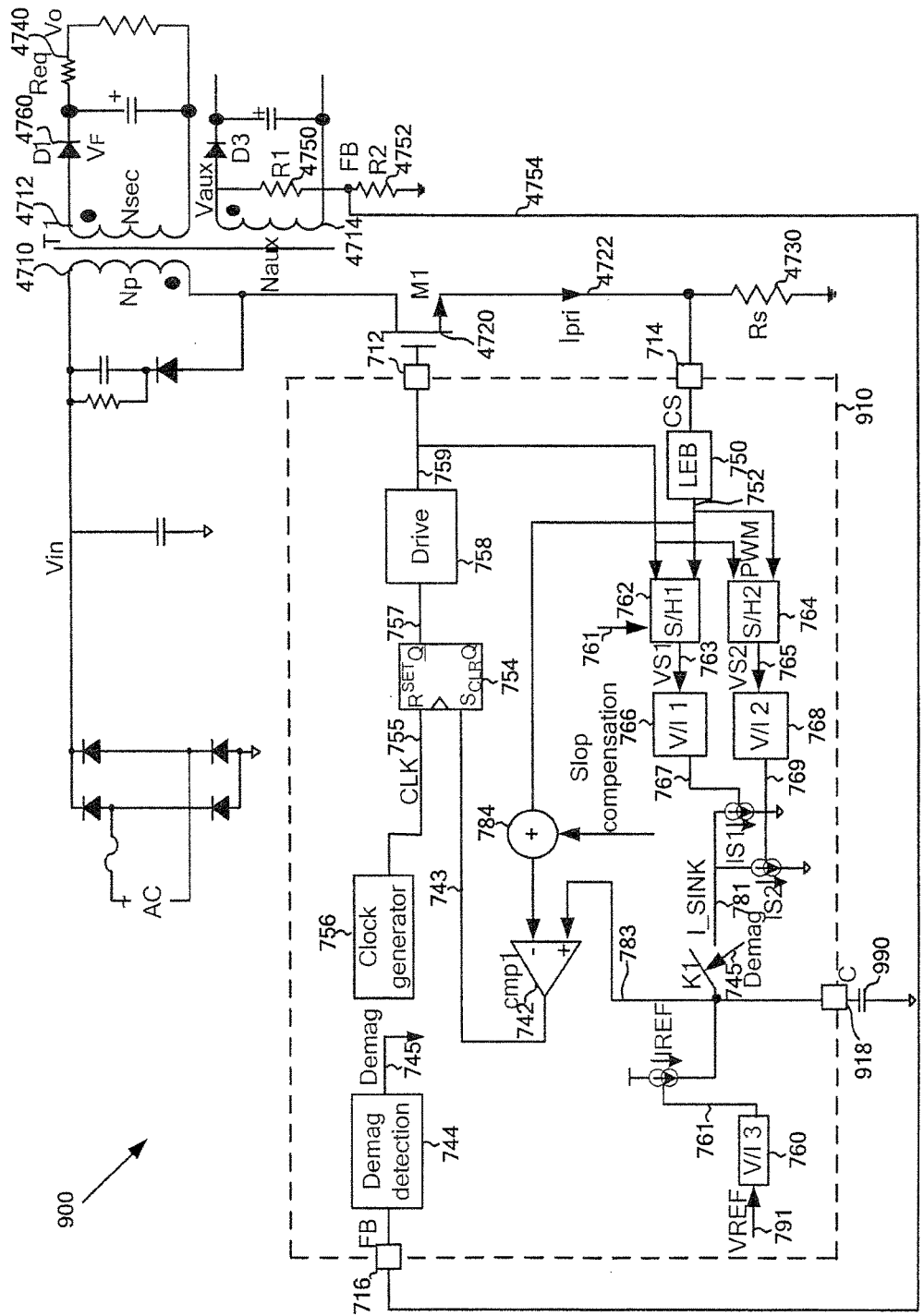

FIG. 9 is a simplified diagram for a switch-mode power conversion system with primary-side sensing and regulation according to yet another embodiment of the present invention.

Figure 10:
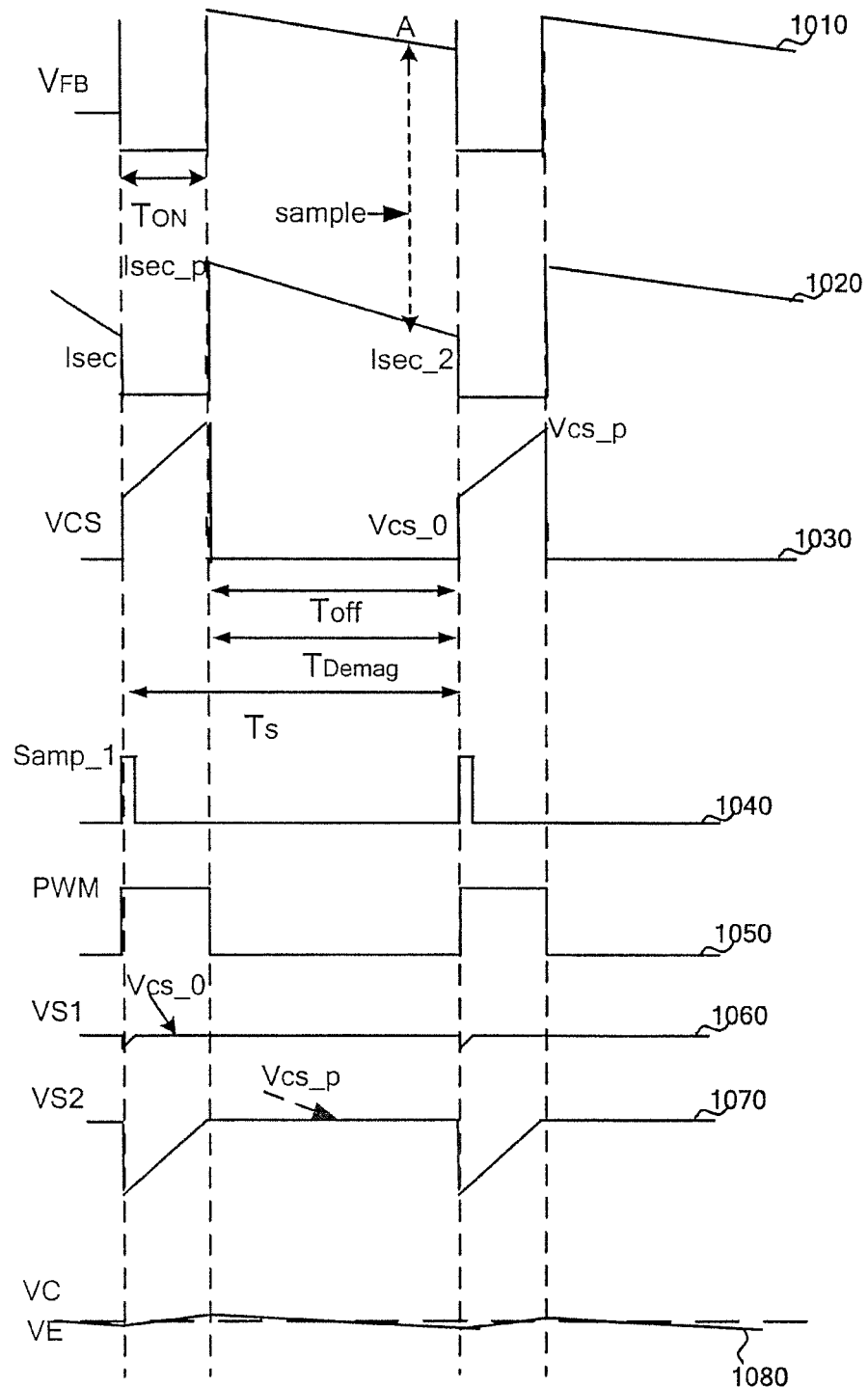

FIG. 10 is a simplified timing diagram for the switch-mode power conversion system with constant current control under CCM and DCM according to another embodiment of the present invention.

Figure 11:
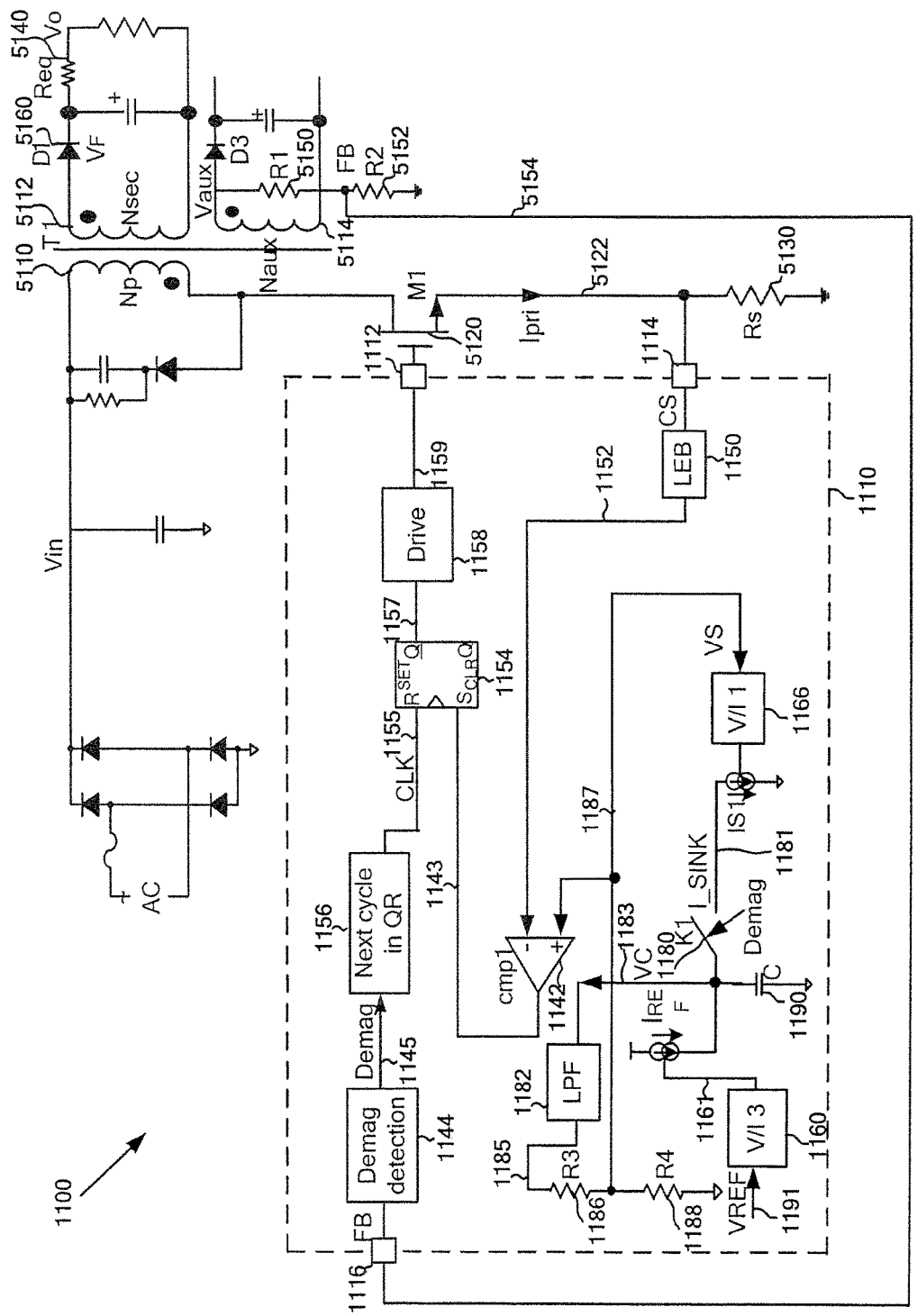

FIG. 11 is a simplified diagram for a switch-mode power conversion system with primary-side sensing and regulation according to yet another embodiment of the present invention.

Figure 12:
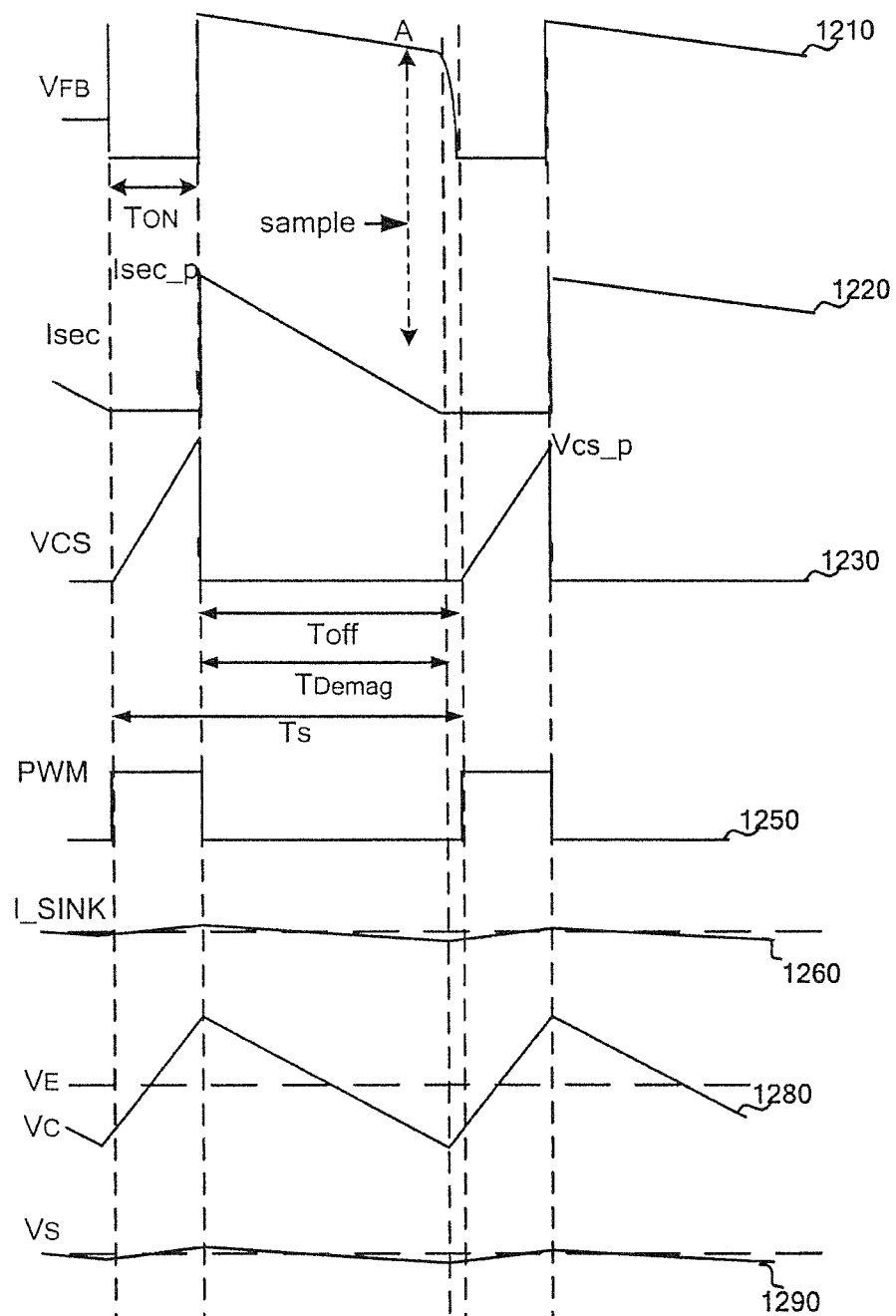

FIG. 12 is a simplified timing diagram for the switch-mode power conversion system with constant current control under the QR mode according to an embodiment of the present invention.

Figure 13:
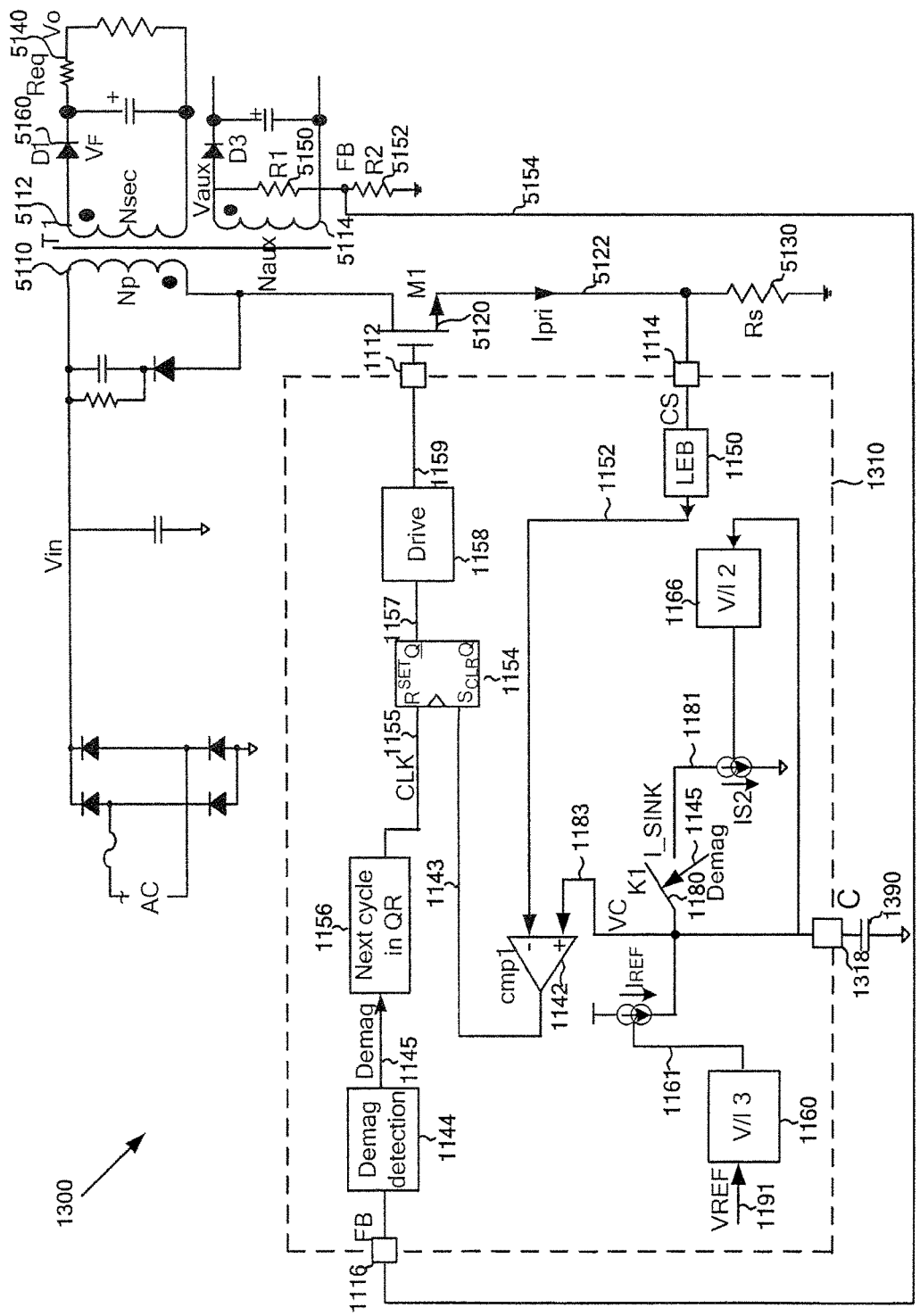

FIG. 13 is a simplified diagram for a switch-mode power conversion system with primary-side sensing and regulation according to yet another embodiment of the present invention.

Figure 14:
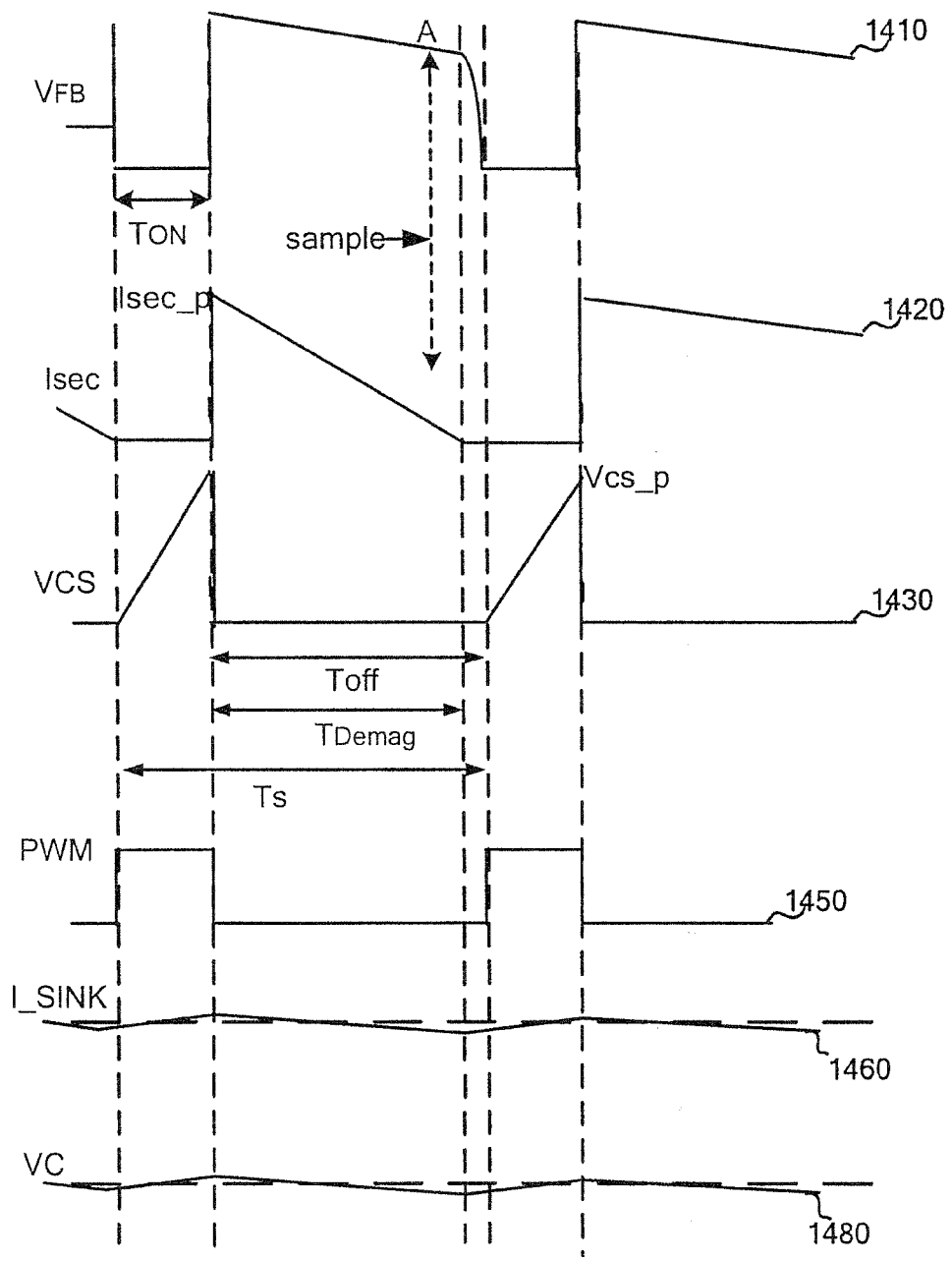

FIG. 14 is a simplified timing diagram for the switch-mode power conversion system with constant current control under the QR mode according to yet another embodiment of the present invention.

Figure 15:
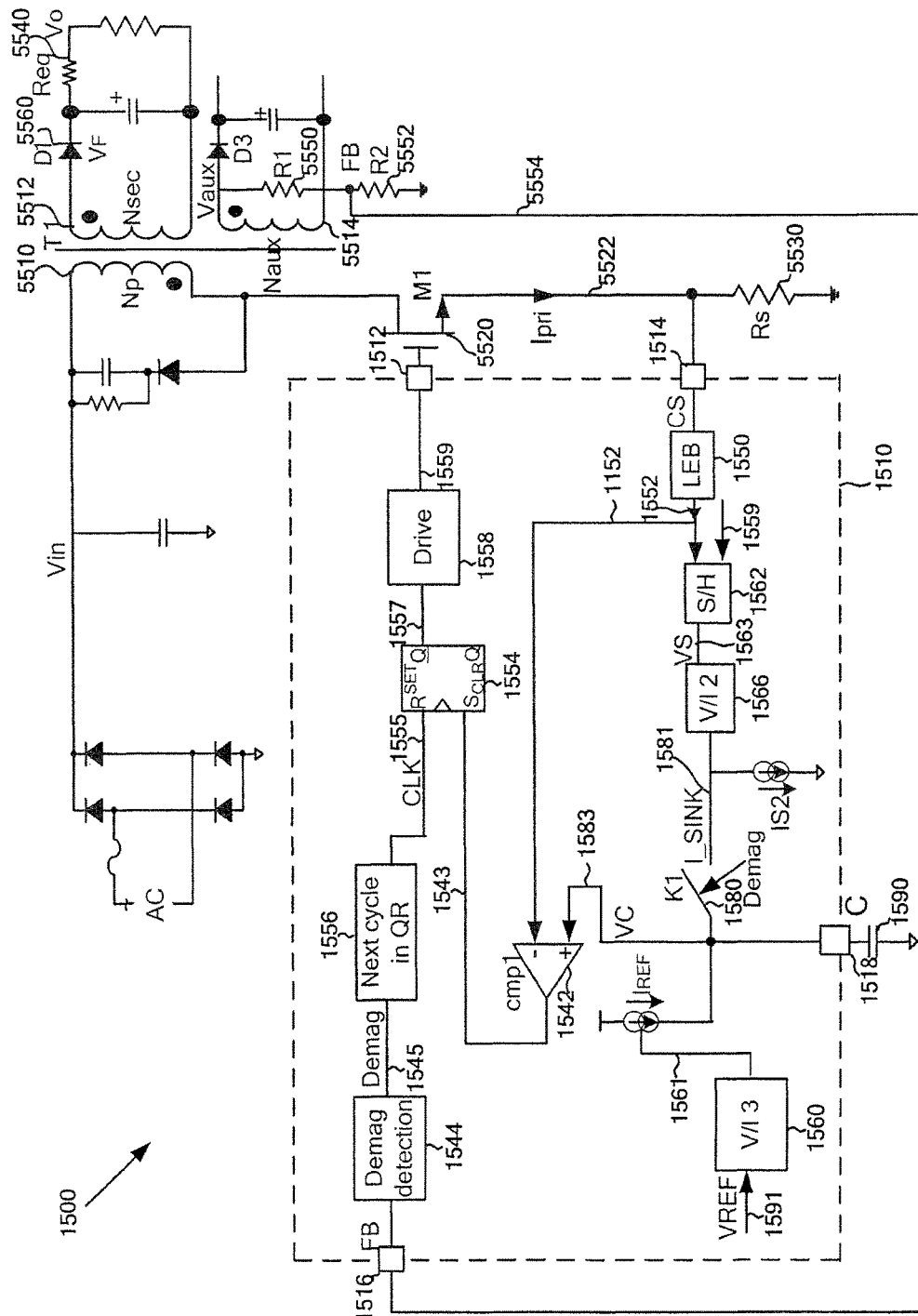

FIG. 15 is a simplified diagram for a switch-mode power conversion system with primary-side sensing and regulation according to yet another embodiment of the present invention.

Figure 16:
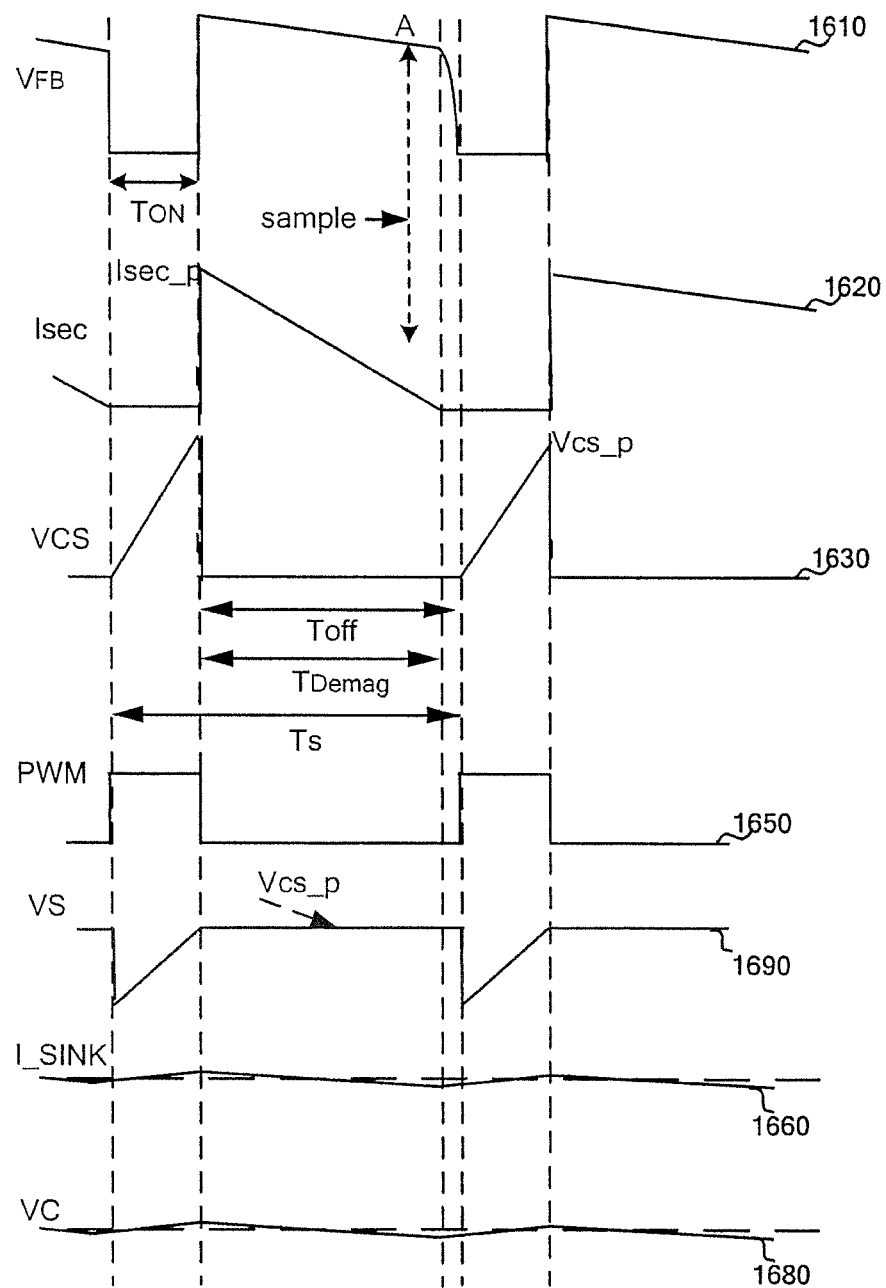

FIG. 16 is a simplified timing diagram for the switch-mode power conversion system with constant current control under the QR mode according to yet another embodiment of the present invention.

Figure 17:
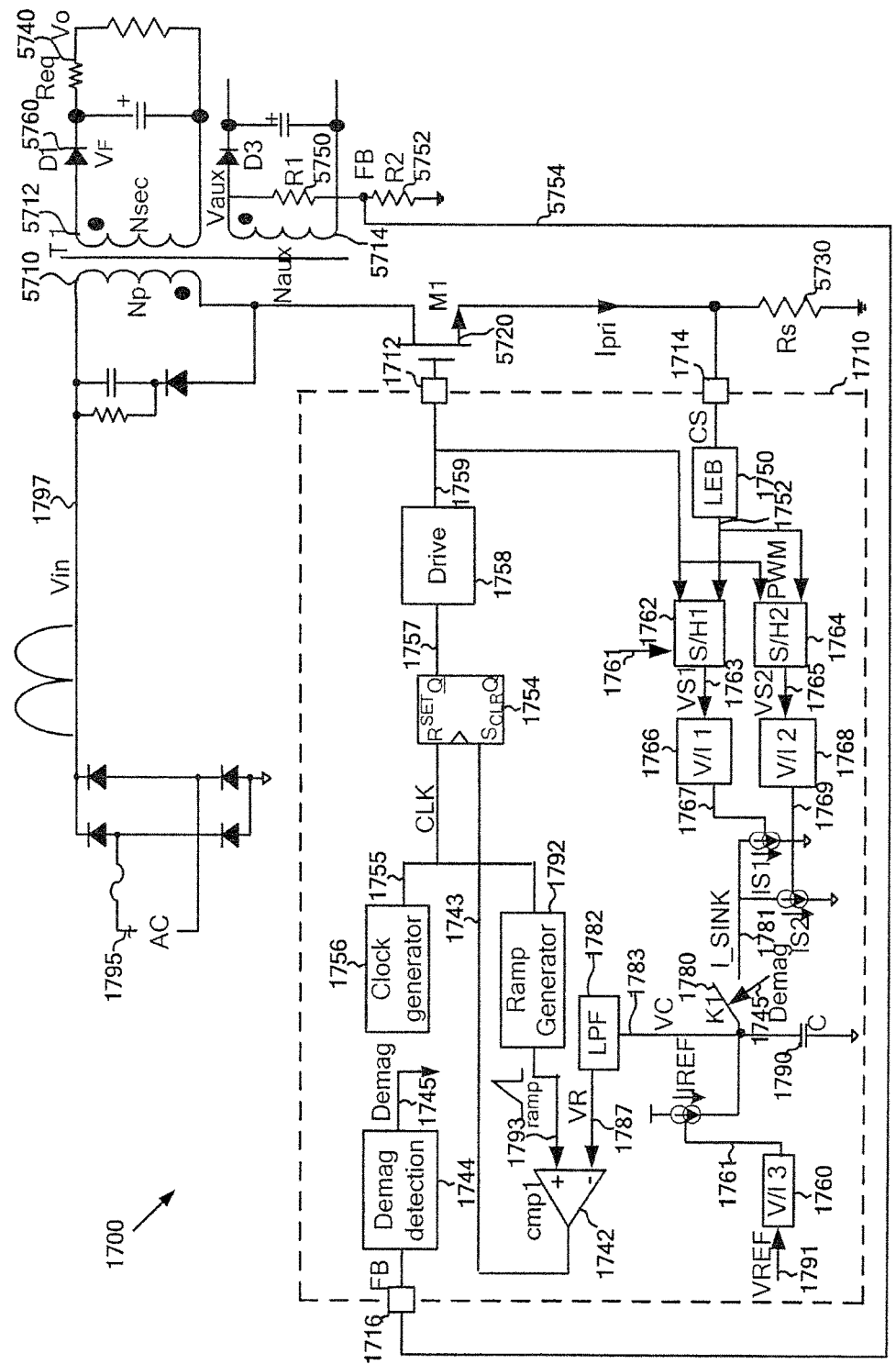

FIG. 17 is a simplified diagram for a switch-mode power conversion system with primary-side sensing and regulation according to yet another embodiment of the present invention.

Figure 18:
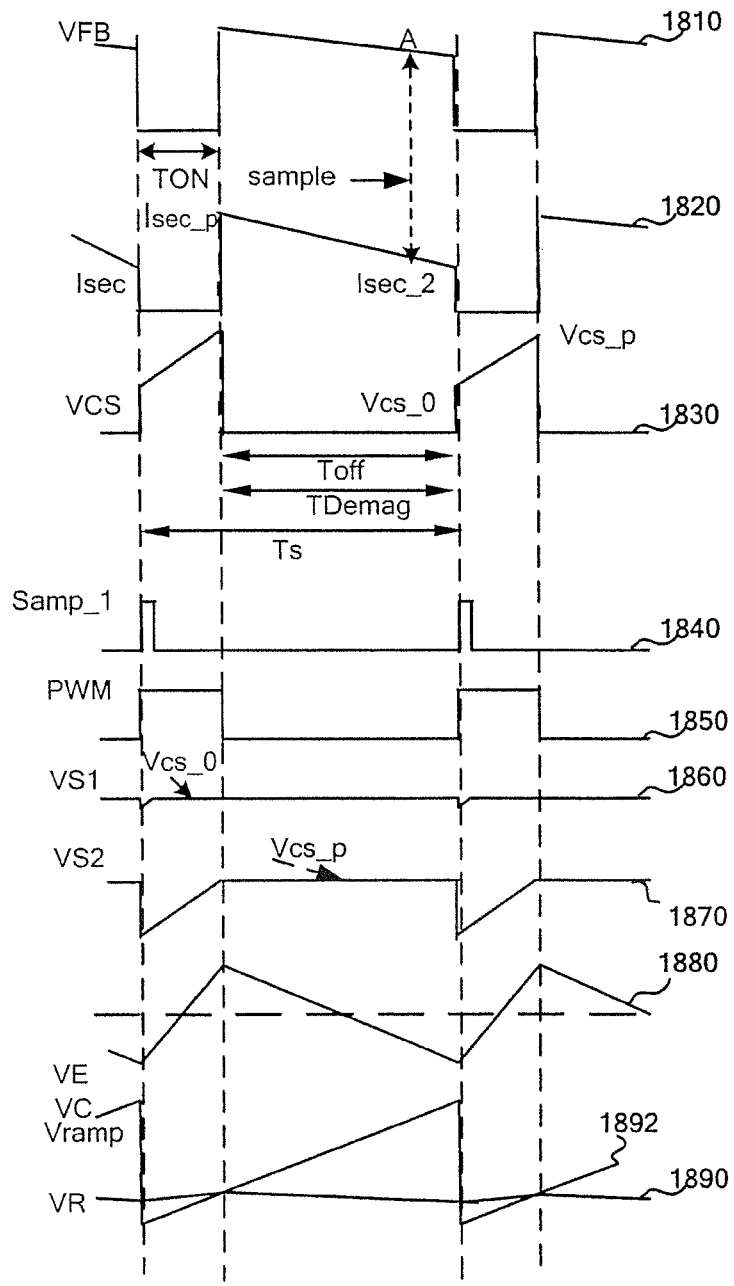

FIG. 18 is a simplified timing diagram for the switch-mode power conversion system with constant current control under CCM and DCM according to an embodiment of the present invention.

Figure 19:
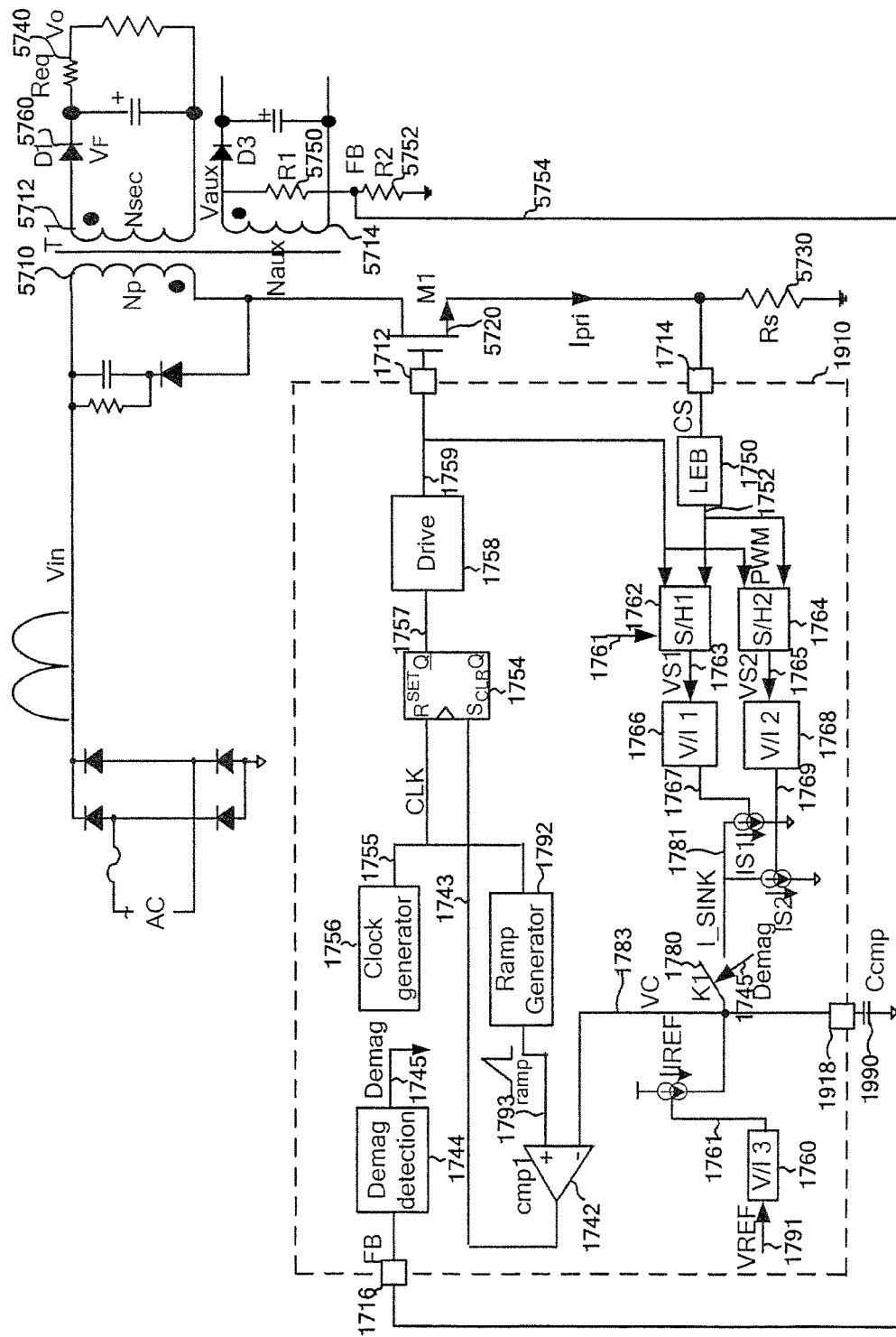

FIG. 19 is a simplified diagram for a switch-mode power conversion system with primary-side sensing and regulation according to yet another embodiment of the present invention.

Figure 20:
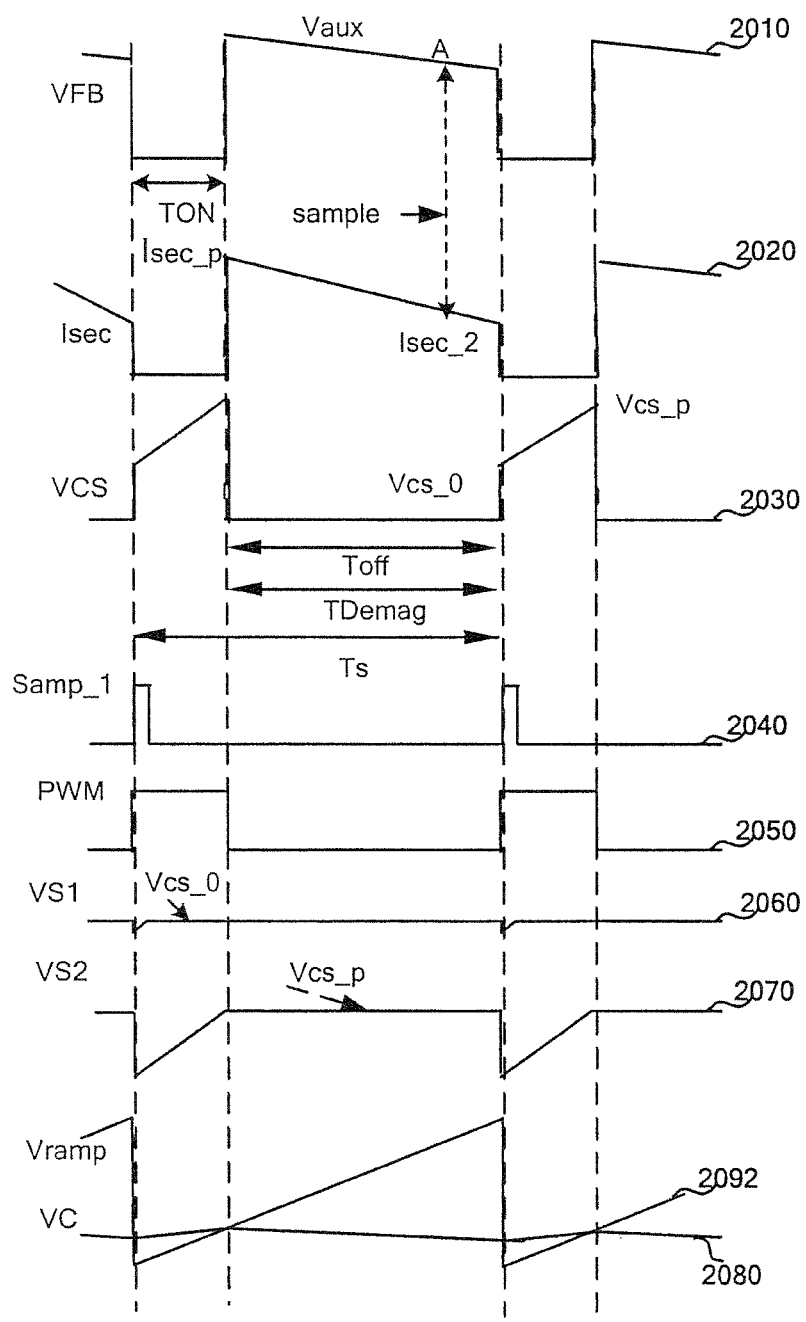

FIG. 20 is a simplified timing diagram for the switch-mode power conversion system with constant current control under CCM and DCM according to yet another embodiment of the present invention.

Figure 21:
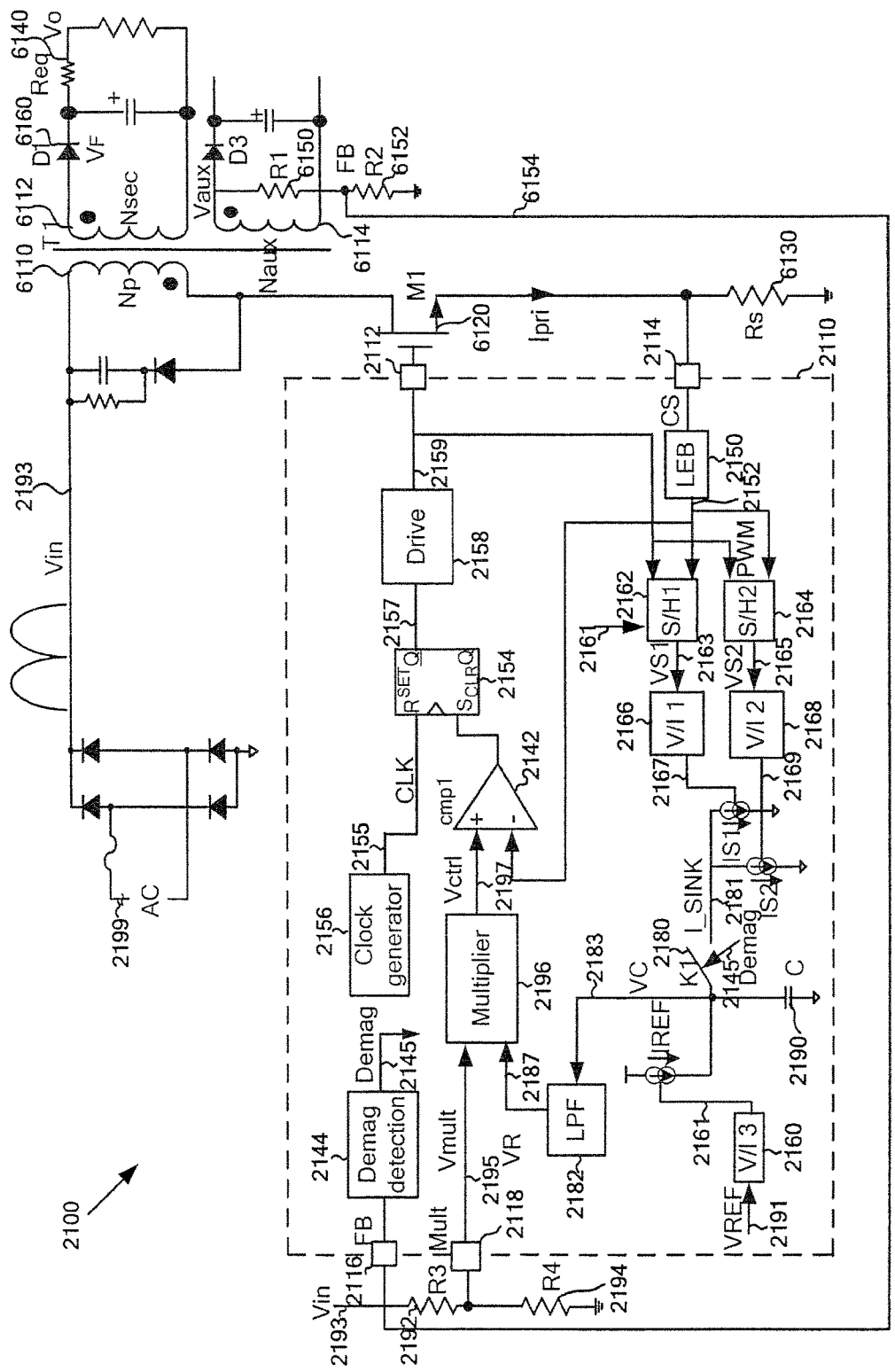

FIG. 21 is a simplified diagram for a switch-mode power conversion system with primary-side sensing and regulation according to yet another embodiment of the present invention.

Figure 22:
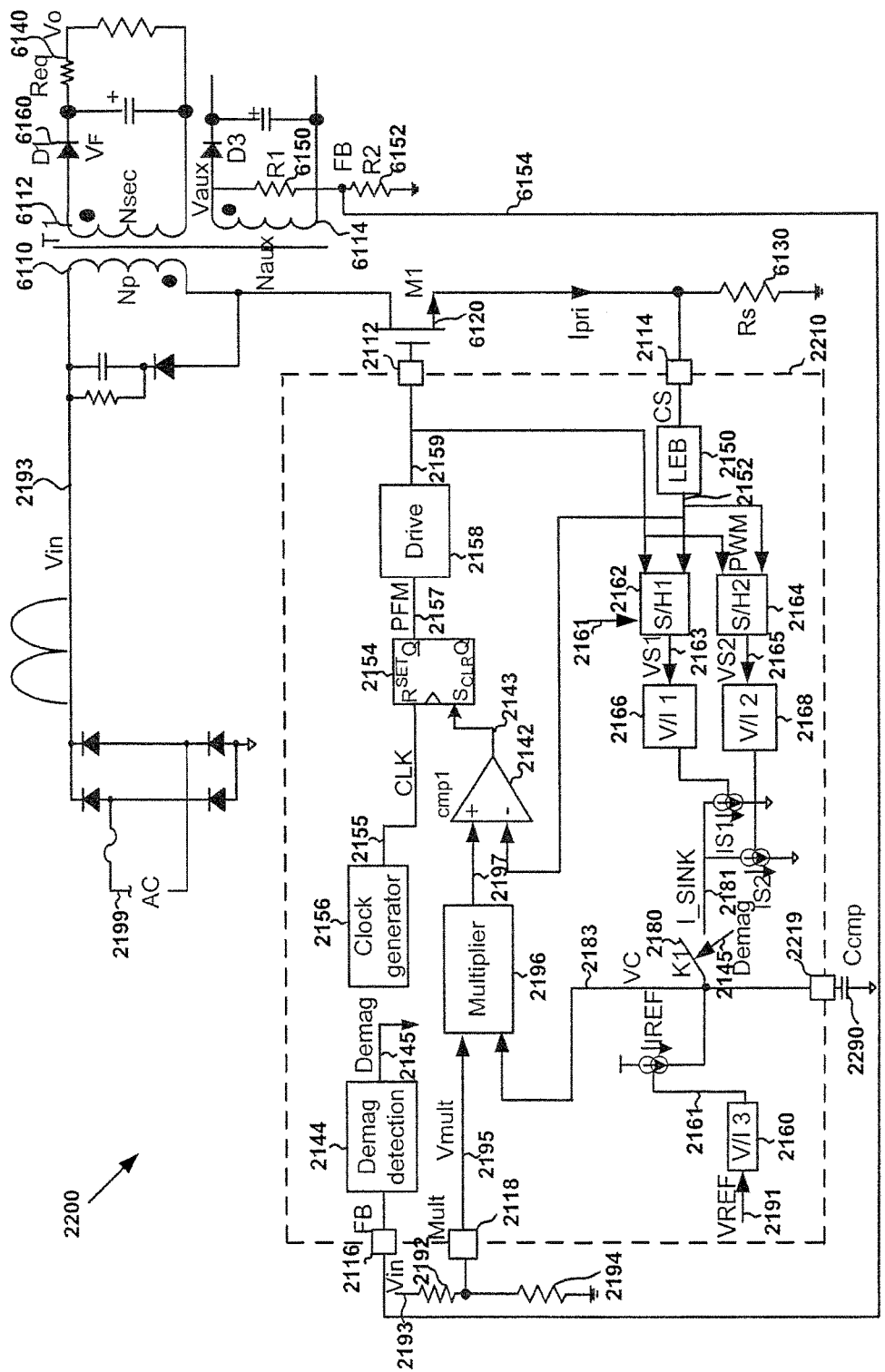

FIG. 22 is a simplified diagram for a switch-mode power conversion system with primary-side sensing and regulation according to yet another embodiment of the present invention.

Figure 23:
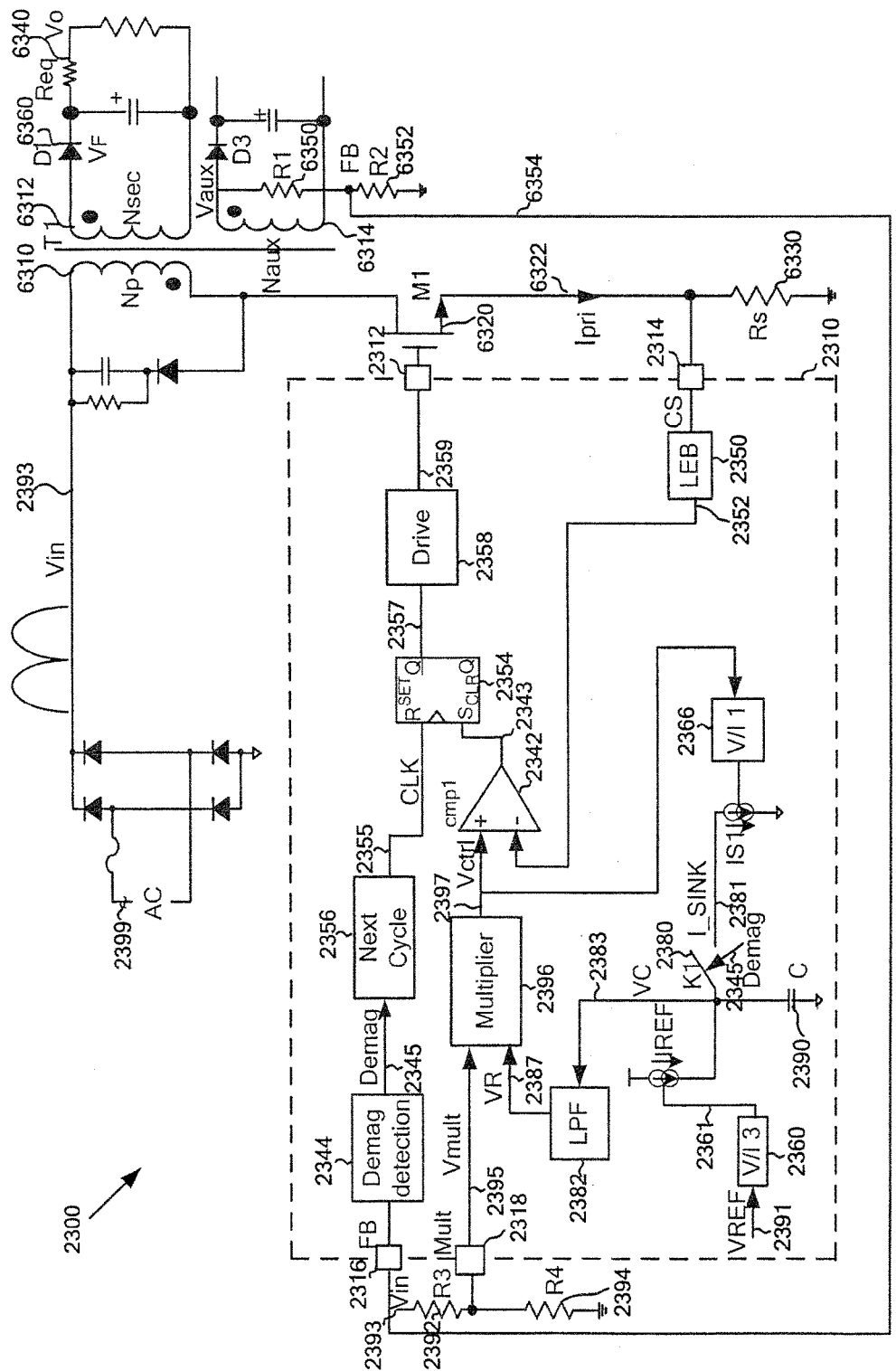

FIG. 23 is a simplified diagram for a switch-mode power conversion system with primary-side sensing and regulation according to yet another embodiment of the present invention.

Figure 24:
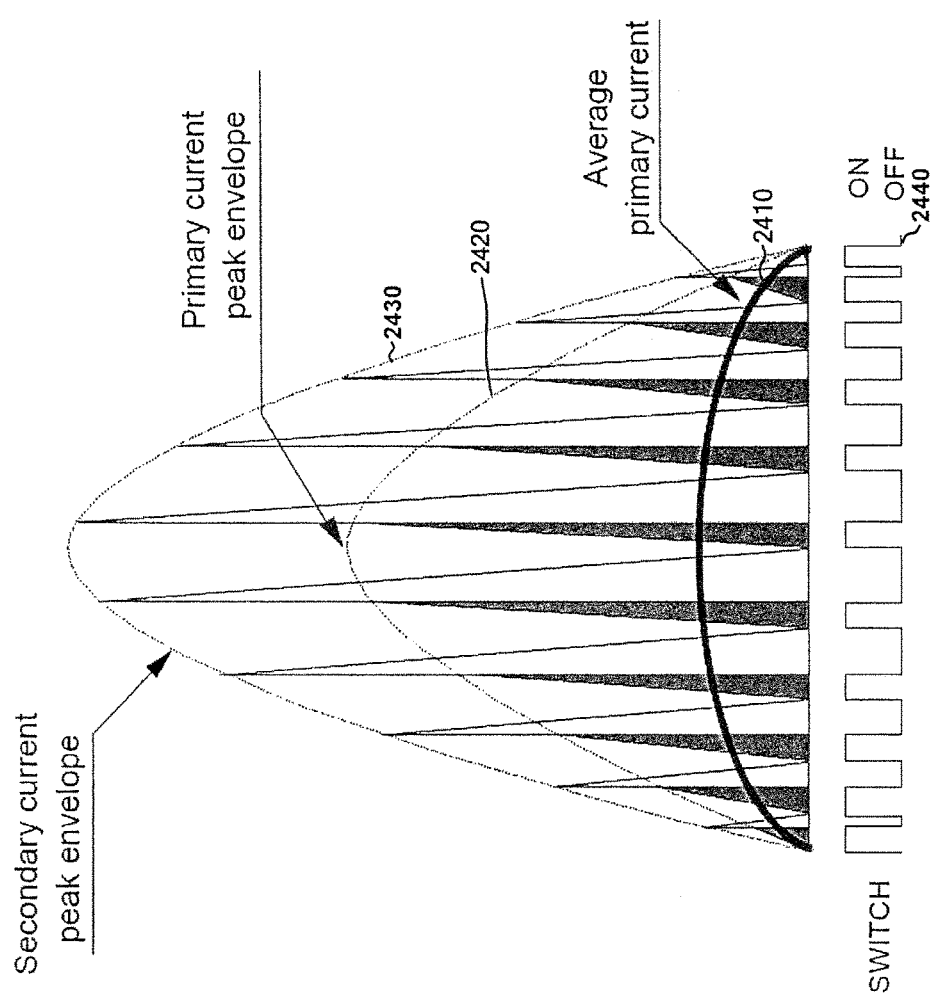

FIG. 24 is a simplified timing diagram for the switch-mode power conversion system with constant current control under the QR mode according to yet another embodiment of the present invention.

Figure 25:
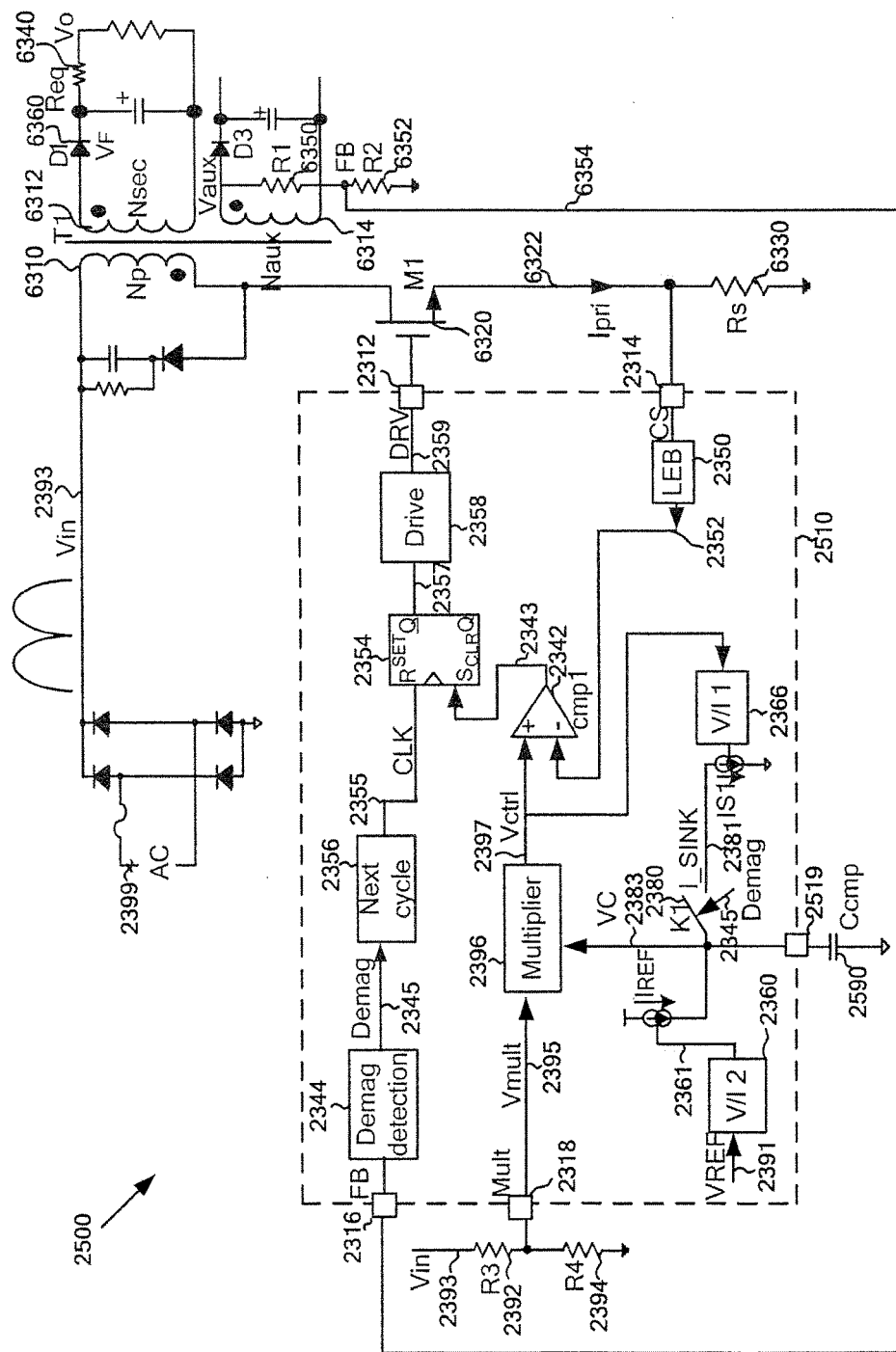

FIG. 25 is a simplified diagram for a switch-mode power conversion system with primary-side sensing and regulation according to yet another embodiment of the present invention.

Figure 26:
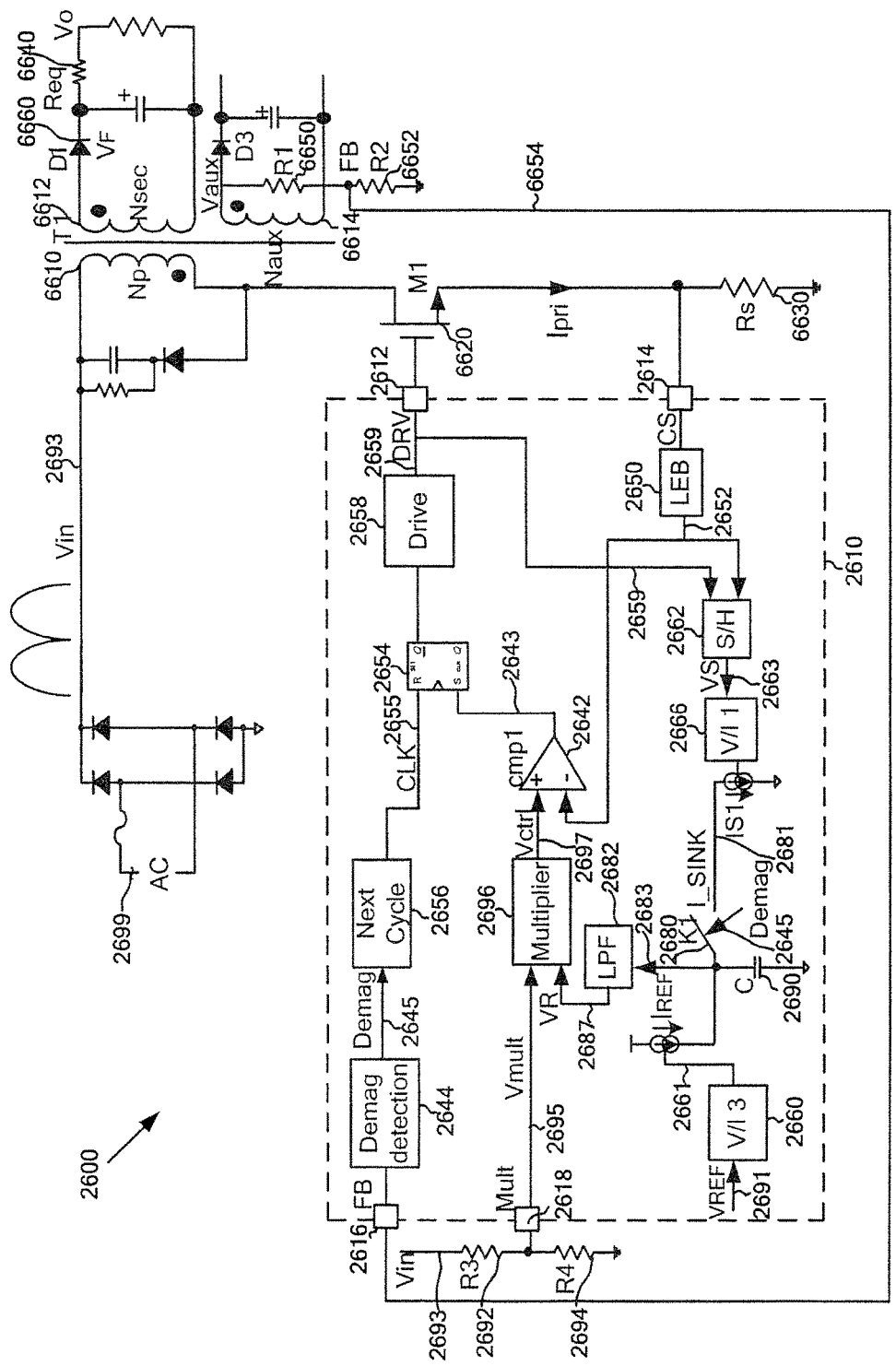

FIG. 26 is a simplified diagram for a switch-mode power conversion system with primary-side sensing and regulation according to yet another embodiment of the present invention.

Figure 27:
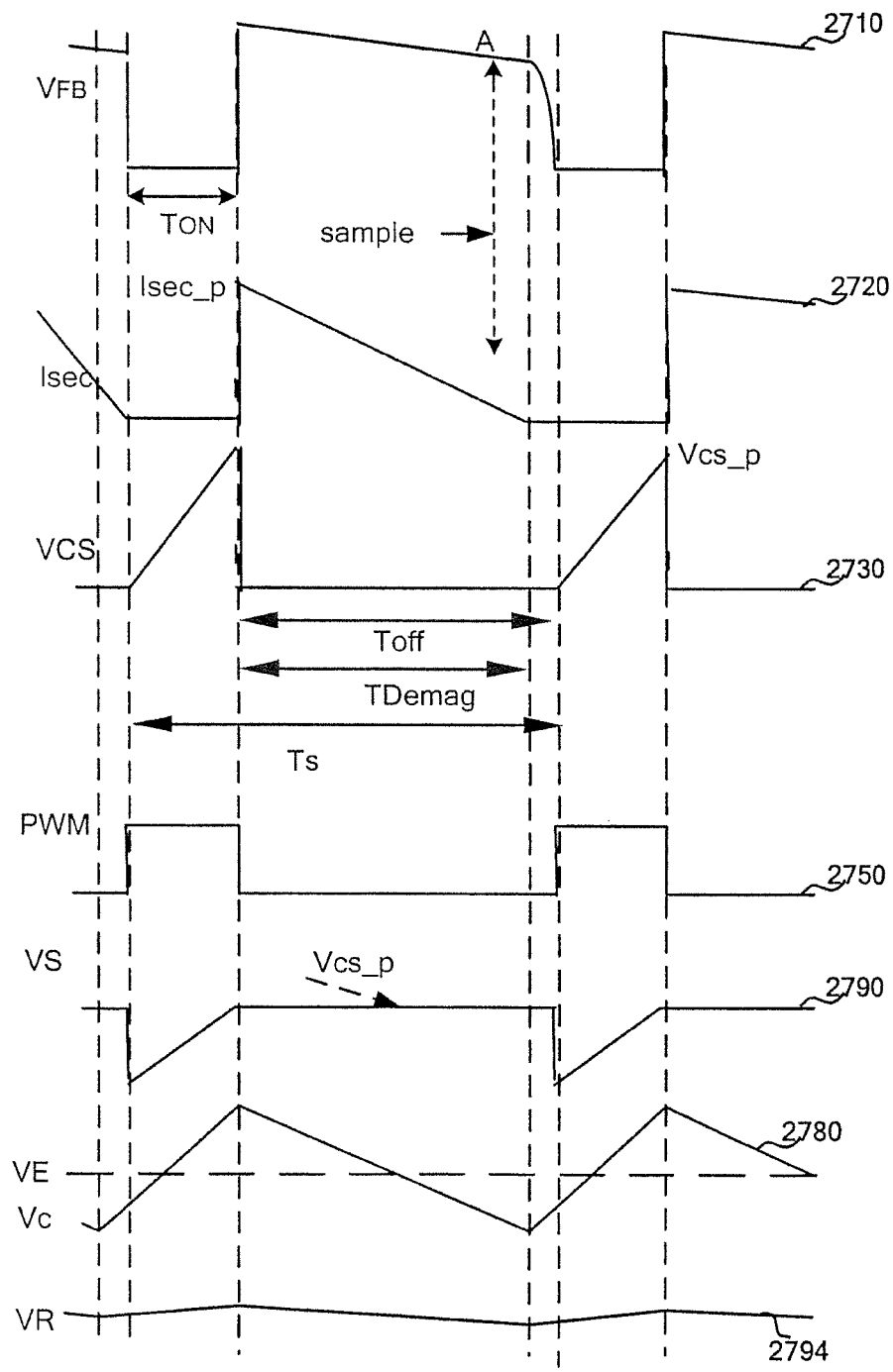

FIG. 27 is a simplified timing diagram for the switch-mode power conversion system with constant current control under the QR mode according to yet another embodiment of the present invention.

Figure 28:
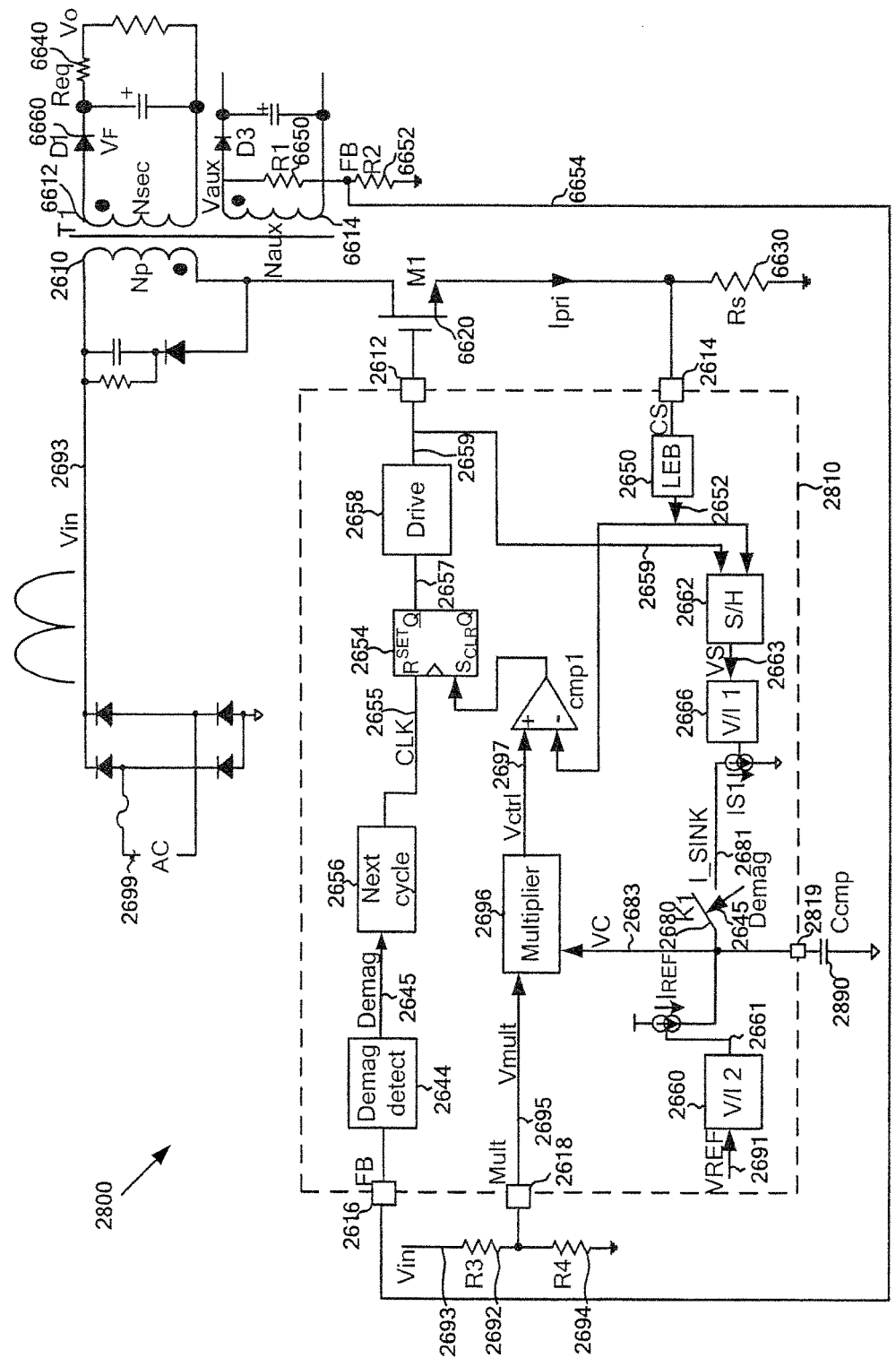

FIG. 28 is a simplified diagram for a switch-mode power conversion system with primary-side sensing and regulation according to yet another embodiment of the present invention.

5. DETAILED DESCRIPTION OF THE INVENTION

The present invention is directed to integrated circuits. More particularly, the invention provides systems and methods for constant current control with primary-side sensing and regulation in various operation modes. Merely by way of example, the invention has been applied to a flyback power converter. But it would be recognized that the invention has a much broader range of applicability.

Figure 1:
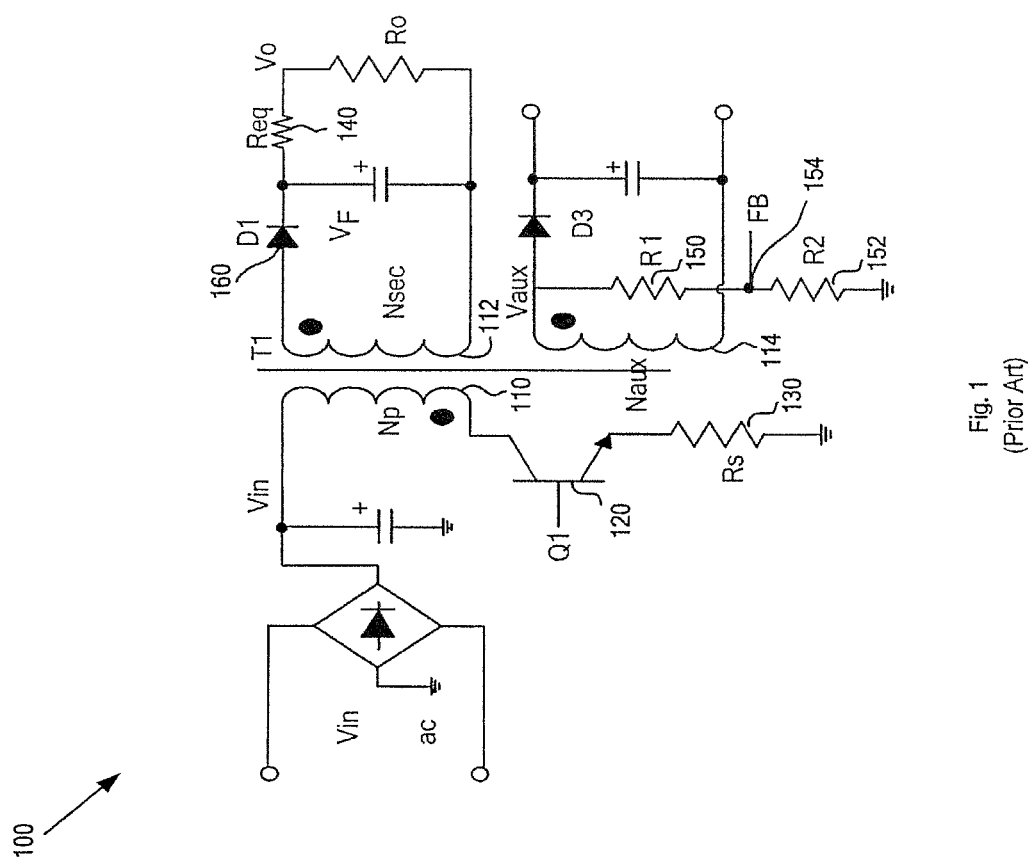
FIG. 1 is a simplified diagram showing a conventional flyback power conversion system with primary-side sensing and regulation.
Figure 2:
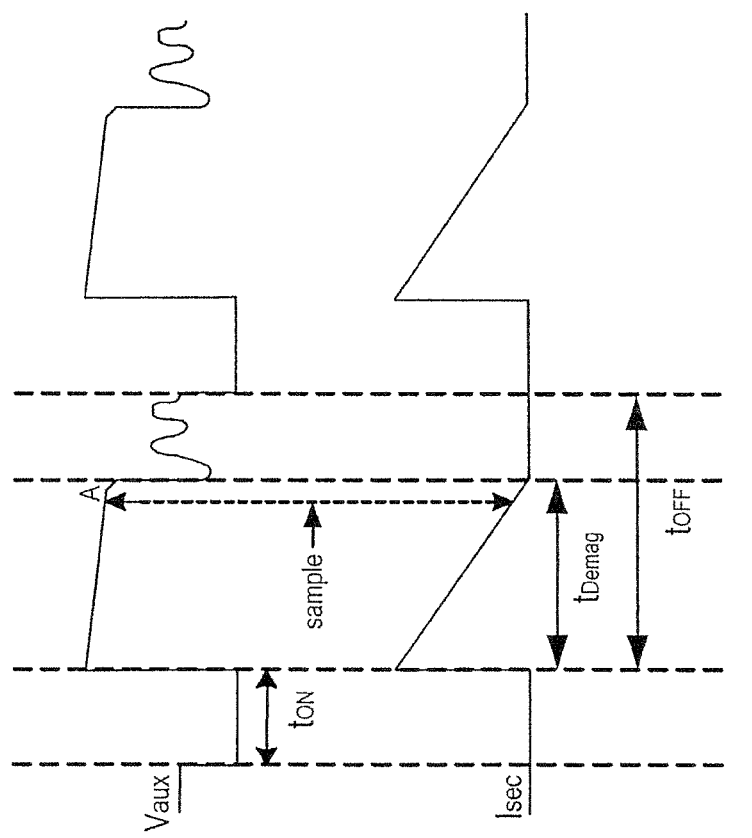
FIG. 2 is a simplified diagram showing a conventional operation mechanism for the flyback power conversion system.
Figure 3:
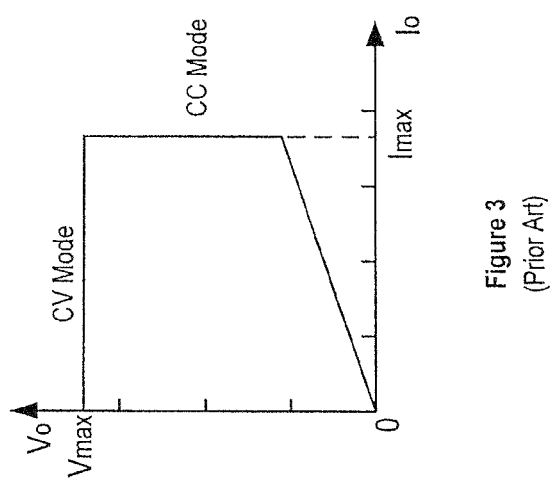
FIG. 3 is a simplified conventional diagram showing characteristics of output voltage and output current of a flyback power conversion system.
Figure 4:
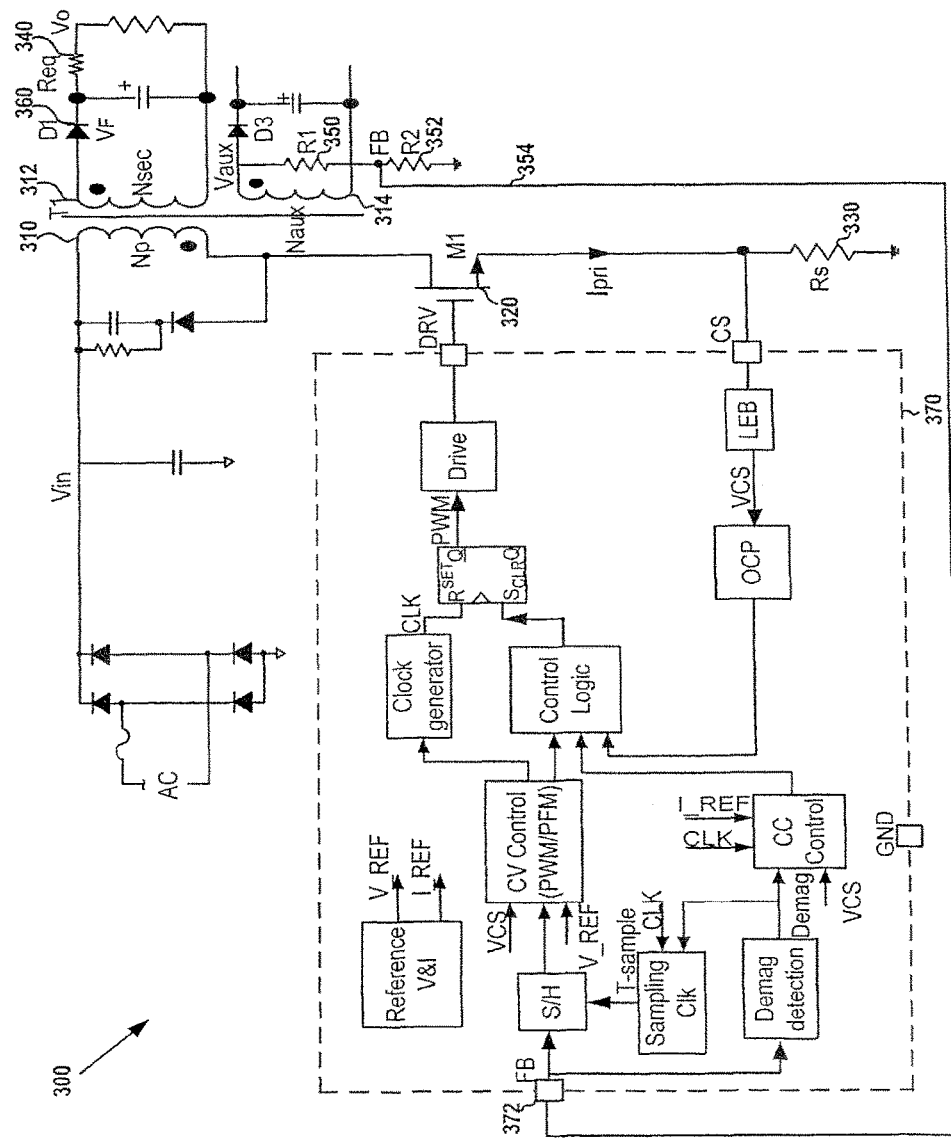
FIG. 4 is a simplified diagram showing a conventional flyback power conversion system with primary-side sensing and regulation.

Referring to FIG. 4, the output current that is delivered to the output load is the averaged magnitude of the secondary current ($I_{sec}$) in each switching cycle as follows:

$$I_{out} = \frac{1}{T} \times \int_0^T I_{sec}(t)\,dt \qquad \text{(Equation 6)}$$

where T represents an integration period, and $I_{sec}$ represents the secondary current that flows through the secondary winding 312. For example, T is equal to or larger than $T_s$, which represents the switching period.

According to one embodiment, in the CC mode, to achieve $$I_{out} = I_c \qquad \text{(Equation 7)}$$

the following can be obtained with Equation 6:

$$\int_0^T I_{sec}(t)\,dt = I_c \times T = \int_0^T I_c\,dt \qquad \text{(Equation 8)}$$

where $I_c$ represents a constant current magnitude.

In another embodiment, in practice, if $$|\int_0^T I_{sec}(t)\,dt - \int_0^T I_c\,dt| < C \qquad \text{(Equation 9)}$$

where C is a predetermined threshold, then the constant output current can be achieved or substantially achieved.

Referring to FIGS. 5(A) and (C), for each switching cycle (e.g., for each $T_s$), the output current for DCM and the QR mode is $$I_{out} = \frac{1}{2} \times I_{sec\_p} \times \frac{T_{demag}}{T_s} \qquad \text{(Equation 10)}$$

where $I_{sec\_p}$ represents the magnitude of the secondary current when the switch is turned off. Additionally, $T_{demag}$ represents the length of the demagnetization process, and $T_s$ represents the switching period.

Figure 5B:
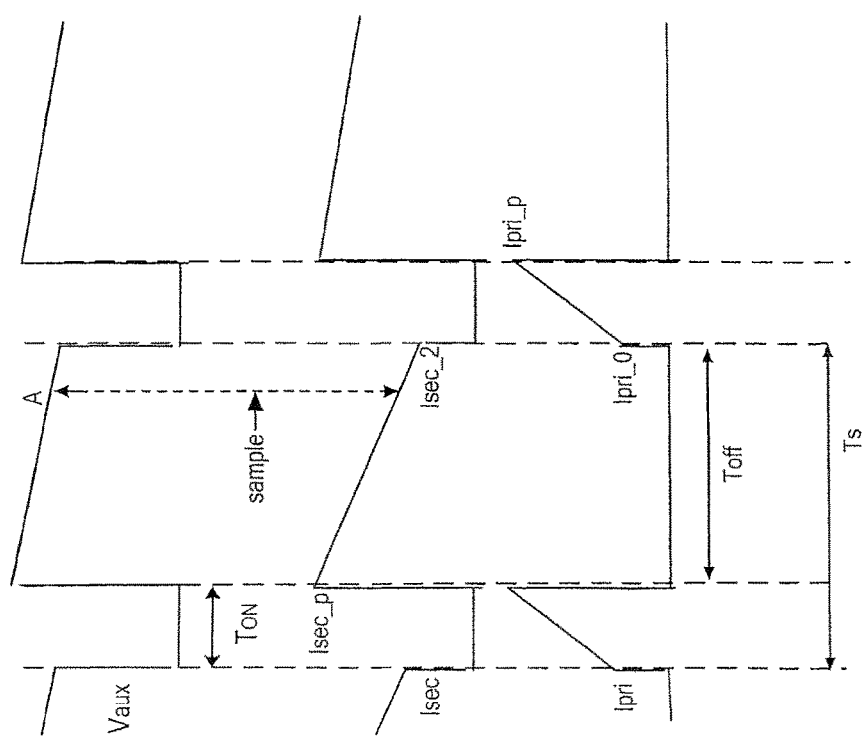
Figure 5C:
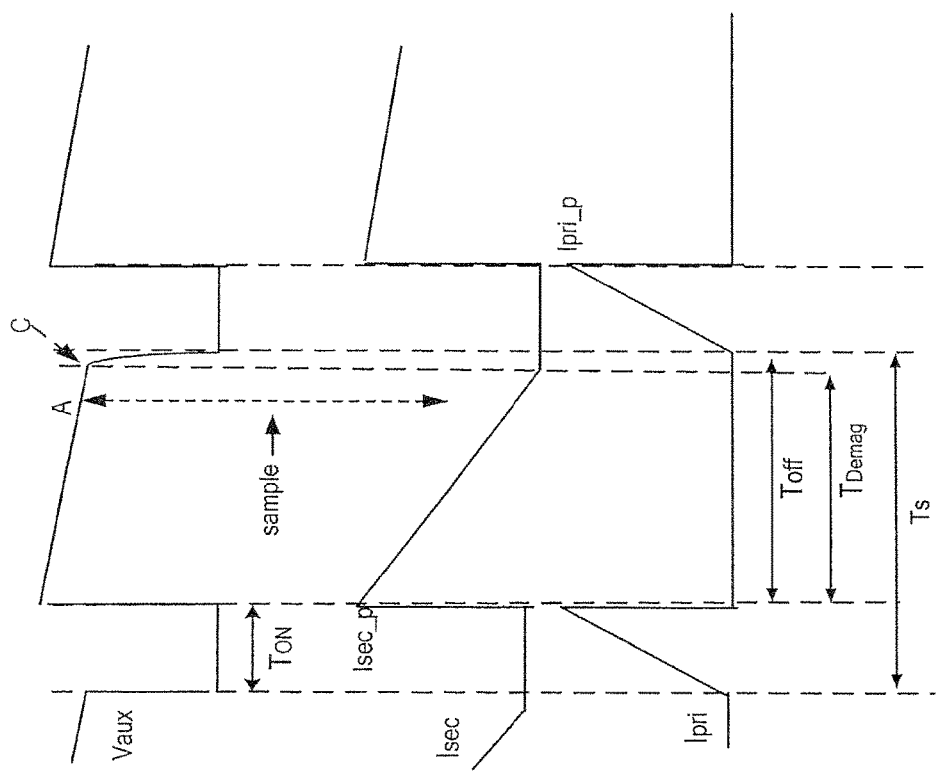

Moreover, referring to FIG. 5(B), for each switching cycle (e.g., for each $T_s$), the output current for CCM is $$I_{out} = \frac{1}{2} \times (I_{sec\_p} + I_{sec\_2}) \times \frac{T_{off}}{T_s} \qquad \text{(Equation 11)}$$

where $I_{sec\_2}$ represents the magnitude of the secondary current when the switch is turned on, and $T_{off}$ represents the off-time of the switch. Since in CCM, the next switching cycle starts before the demagnetization process is completed, the actual length of the demagnetization process before the next switching cycle starts is limited to the off-time of the switch; hence $T_{off}$ can be represented by $T_{demag}$ in CCM.

Hence, Equations 10 and 11 are both represented by:

$$I_{out} = \frac{1}{2} \times (I_{sec\_p} + I_{sec\_2}) \times \frac{T_{demag}}{T_s} \qquad \text{(Equation 12)}$$

For example, Equation 12 becomes Equation 10 if $I_{sec\_2}$ is set to zero. In another example, combining Equations 7 and 12, one can obtain:

$$\tfrac{1}{2}(I_{sec\_p}(i) + I_{sec\_2}(i)) \times T_{demag}(i) = I_c(i) \times T_s(i) \qquad \text{(Equation 13)}$$

where i corresponds to the $i^{th}$ switching cycle.

According to one embodiment, if $$\text{Limit}_{N \to \infty} \left\| \left( \sum_{i=0}^{N} \frac{1}{2}(I_{sec\_p}(i) + I_{sec\_2}(i)) \times T_{demag}(i) - \sum_{i=1}^{N} I_c(i) \times T_s(i) \right) \right\| < C \qquad \text{(Equation 14)}$$

where C is a predetermined threshold, then the constant output current can be achieved.

For example, Equation 14 is rewritten into an integration format as follows:

$$|\tfrac{1}{2}\int [I_{sec\_p}(i) + I_{sec\_2}(i)] \times [U(t - T_s(i)) - U(t - T_s(i) - T_{demag}(i))]\,dt - \int I_c(t)\,dt| < C \qquad \text{(Equation 15)}$$

where U(t) is the unit step function, and $I_c(t)$ is equal to a constant $I_{c\_ref}$. Hence, in the steady state, the following can be obtained:

$$\left|\int \frac{1}{2}[I_{sec\_p}(i)+I_{sec\_2}(i)]\times[U(t-T_s(i))-U(t-T_s(i)-T_{demag}(i))]dt - \int I_{c\_ref}dt\right| < C \quad \text{(Equation 16)}$$

According to another embodiment, since $$I_{sec\_p} = N \times I_{pri\_p} \quad \text{(Equation 17)}$$

and $I_{sec\_2} = N \times I_{pri\_0}$ (Equation 18)

then Equation 12 becomes:

$$I_{out} = \frac{1}{2} \times N \times (I_{pri\_p} + I_{pri\_0}) \times \frac{T_{demag}}{T_s} \quad \text{(Equation 19)}$$

where $I_{pri\_p}$ represents the peak magnitude of the primary current when the switch is turned off, and $I_{pri\_0}$ represents the magnitude of the primary current when the switch is turned on. Additionally, N represents the turns ratio between the primary winding and the secondary winding. Moreover, $T_{demag}$ represents the duration of the demagnetization process within each switching period, and $T_s$ represents the switching period.

According to yet another embodiment, if the output current is maintained at a constant level, e.g., $$I_{out} = \frac{1}{2} \times N \times I_{ref} \quad \text{(Equation 20)}$$

then $$(I_{pri\_p} + I_{pri\_0}) \times \frac{T_{Demag}}{T_s} = I_{ref} \quad \text{(Equation 21)}$$

where $I_{ref}$ represents a constant current level. Hence, for example, $$(I_{pri\_p} + I_{pri\_0}) \times T_{demag} = I_{ref} \times T_s \quad \text{(Equation 22)}$$

In another example, since the switching period (e.g., $T_s$) and the demagnetization period ($T_{Demag}$) may vary from one switching cycle to another switching cycle, for the $i^{th}$ switching cycle, the following is obtained:

$$(I_{pri\_p}(i) + I_{pri\_0}(i)) \times T_{demag}(i) = I_{ref} \times T_s(i) \quad \text{(Equation 23)}$$

Hence, $$\text{Limit}_{N \to \infty} \quad \text{(Equation 24)}$$
$$\left|\left(\sum_{i=0}^{N}(I_{pri\_p}(i) + I_{pri\_0}(i)) \times T_{Demag}(i) - \sum_{i=0}^{N} I_{ref} \times T_s(i)\right)\right| < A$$

where A represents a predetermined threshold.

In yet another example, Equation 24 is rewritten into the integration format as follows:

$$\left|\int [I_{pri\_p}(i)+I_{pri\_0}(i)]\times[U(t-T_s(i))-U(t-T_s(i)-T_{demag}(i))]dt - \int I_{ref}dt\right| < A \quad \text{(Equation 25)}$$

where U(t) is the unit step function.

According to yet another embodiment, if Equations 22 through 25 are satisfied, the output current is maintained at a constant level, regardless of the output voltage, the inductance of the primary winding, and/or the input voltage.

FIG. 6 is a simplified diagram for a switch-mode power conversion system with primary-side sensing and regulation according to an embodiment of the present invention. This diagram is merely an example, which should not unduly limit the scope of the claims. One of ordinary skill in the art would recognize many variations, alternatives, and modifications. The power conversion system 600 includes a primary winding 510, a secondary winding 512, an auxiliary winding 514, a switch 520, a sensing resistor 530, an equivalent resistor 540 for an output cable, resistors 550 and 552, and a rectifying diode 560. Additionally, the system 600 also includes cycle-by-cycle processing components 620 and 622, a capacitor 630, a signal conditioning component 632, a transconductance amplifier 640, a comparator 642, a demagnetization detection component 644, a leading-edge blanking component 650, a flip-flop component 654, a clock generator 656, and a driver component 658.

For example, the primary winding 510, the secondary winding 512, the auxiliary winding 514, the switch 520, the sensing resistor 530, the equivalent resistor 540, the resistors 550 and 552, and the rectifying diode 560 are the same as the primary winding 310, the secondary winding 312, the auxiliary winding 314, the switch 320, the sensing resistor 330, the equivalent resistor 340, the resistors 350 and 352, and the rectifying diode 360, respectively. In another example, the cycle-by-cycle processing components 620 and 622, the capacitor 630, the signal conditioning component 632, the transconductance amplifier 640, the comparator 642, the demagnetization detection component 644, the leading-edge blanking component 650, the flip-flop component 654, the clock generator 656, and the driver component 658 are located on a chip 610. In yet another example, the chip 610 includes terminals 612, 614, and 616.

As shown in FIG. 6, a current 522 that flows through the primary winding 510 is sensed by the resistor 530. For example, the resistor 530 generates, through the terminal 614 and with the leading-edge blanking component 650, a current sensing signal 652. In another example, the current sensing signal 652 is $$V_{cs} = I_{pri} \times R_s \quad \text{(Equation 26)}$$

where $V_{cs}$ represents the current sensing signal 652, $I_{pri}$ represents the current 522, and $R_s$ represents the resistance of the resistor 530. In yet another example, combining Equations 25 and 26, the following is obtained:

$$\left|\frac{1}{R_s}\int [V_{cs\_p}(i) + V_{cs\_0}(i)] \times [U(t-T_s(i)) - U(t-T_s(i)-T_{Demag}(i))]dt - \int I_{ref}dt\right| < A \quad \text{(Equation 27)}$$

According to one embodiment, the current sensing signal 652 is received by the cycle-by-cycle processing component 620. For example, for each switching cycle, the processing component 620 generates a signal 621 that is equal to $(I_{pri\_p}+I_{pri\_0}) \times T_{Demag}$. In another example, for each switching cycle, the processing component 622 generates a signal 623 that is equal to $I_{ref} \times T_s$, and $I_{ref}$ represents a predetermined referenced current. In yet another example, the demagnetization detection component 644 receives a feedback signal 554 from the resistors 550 and 552, and generates a Demag signal 645. The Demag signal 645 has a pulse width of $T_{Demag}$ for each switching cycle.

According to another embodiment, the signals 623 and 621 are received by the transconductance amplifier 640. For example, the magnitude difference of $I_{ref} \times T_s (I_{pri\_p} + I_{pri\_0}) \times T_{Demag}$ is amplified and integrated by the transconductance amplifier 640 and the capacitor 630 as part of the practical implementation of Equation 27. In another example, the transconductance amplifier 640 and the capacitor 630 form an integrator, which generates a signal 631 that is received by the comparator 642 directly or indirectly through the signal conditioning component 632.

According to yet another embodiment, the comparator 642 also receives the current sensing signal 652, and in response generates a comparison signal 643. For example, the comparison signal 643 is received by the flip-flop component 654, and the flip-flop component 654 also receives a clock signal 655 from the clock generator 656 and generates a modulation signal 657. In another example, the modulation signal 657 is received by the driver component 658, which in response generates the drive signal 659.

In one embodiment, the drive signal 659 is sent to the switch 520 through the terminal 612, and is also received by the cycle-by-cycle processing component 620. In another embodiment, the signal 631 is used to adjust the pulse width of the drive signal 659 with pulse-width modulation. In yet another embodiment, in the CC mode, Equation 24 is satisfied.

As discussed above and further emphasized here, FIG. 6 is merely an example, which should not unduly limit the scope of the claims. One of ordinary skill in the art would recognize many variations, alternatives, and modifications. For example, the signal conditioning component 632 is removed, and the signal 631 is received directly by the comparator 642. In another example, the leading-edge blanking component 650 is removed, and the signal 652 is received directly from the terminal 614.

FIG. 7 is a simplified diagram for a switch-mode power conversion system with primary-side sensing and regulation according to another embodiment of the present invention. This diagram is merely an example, which should not unduly limit the scope of the claims. One of ordinary skill in the art would recognize many variations, alternatives, and modifications. The power conversion system 700 includes a primary winding 4710, a secondary winding 4712, an auxiliary winding 4714, a switch 4720, a sensing resistor 4730, an equivalent resistor 4740 for an output cable, resistors 4750 and 4752, and a rectifying diode 4760. Additionally, the system 700 also includes a comparator 742, a demagnetization detection component 744, a leading-edge blanking component 750, a flip-flop component 754, a clock generator 756, and a driver component 758. Moreover, the system 700 also includes sampling-and-holding components 762 and 764, voltage-to-current converters 760, 766 and 768, a switch 780, a low-pass filter 782, resistors 786 and 788, and a capacitor 790.

For example, the primary winding 4710, the secondary winding 4712, the auxiliary winding 4714, the switch 4720, the sensing resistor 4730, the equivalent resistor 4740, the resistors 4750 and 4752, and the rectifying diode 4760 are the same as the primary winding 310, the secondary winding 312, the auxiliary winding 314, the switch 320, the sensing resistor 330, the equivalent resistor 340, the resistors 350 and 352, and the rectifying diode 360, respectively. In another example, the comparator 742, the demagnetization detection component 744, the leading-edge blanking component 750, the flip-flop component 754, the clock generator 756, the driver component 758, the sampling-and-holding components 762 and 764, the voltage-to-current converters 760, 766 and 768, the switch 780, the low-pass filter 782, the resistors 786 and 788, and the capacitor 790 are located on a chip 710. In yet another example, the chip 710 includes terminals 712, 714, and 716.

FIG. 8 is a simplified timing diagram for the switch-mode power conversion system 700 with constant current control under CCM and DCM according to an embodiment of the present invention. This diagram is merely an example, which should not unduly limit the scope of the claims. One of ordinary skill in the art would recognize many variations, alternatives, and modifications.

As shown in FIG. 8, the waveform 810 represents a feedback signal 4754 (e.g., $V_{FB}$) as a function of time, the waveform 820 represents a secondary current (that flows through the secondary winding 4712) as a function of time, and the waveform 830 represents a current sensing signal 752 (e.g., $V_{cs}$) as a function of time. Additionally, the waveform 840 represents a sampling control signal 761 as a function of time, the waveform 850 represents a drive signal 759 as a function of time, the waveform 860 represents a voltage signal 763 (e.g., $V_{s1}$) as a function of time, and the waveform 870 represents a voltage signal 765 (e.g., $V_{s2}$) as a function of time. Moreover, the waveform 880 represents a signal 783 (e.g., $V_C$) as a function of time, and the waveform 890 represents a signal 787 (e.g., $V_R$) as a function of time.

According to one embodiment, in CCM, $V_{cs\_0}$ is not equal to zero, and the next switching cycle starts before the demagnetization process is completed. For example, the actual length of the demagnetization process before the next switching cycle starts is limited to the off-time of the switch 4720; hence $T_{off}$ can be represented by $T_{Demag}$ in the CCM mode of operation. According to another embodiment, in the DCM mode of operation, $V_{cs\_0}$ is equal to zero, and the off-time of the switch, $T_{off}$, is much longer than the demagnetization period, $T_{Demag}$.

As shown in FIGS. 7 and 8, the sampling-and-holding component 762 receives at least the drive signal 759 (corresponding to the waveform 850) and the control signal 761 (corresponding to the waveform 840) according to one embodiment. For example, the control signal 761 includes, for each switching cycle, a pulse that has a rising edge at the beginning of the on-time of the switch 4720 (e.g., at the rising edge of the drive signal 759). In another example, during the pulse, the current sensing signal 752 (e.g., $V_{cs}$ corresponding to the waveform 830) is sampled and held as the voltage signal 763 (e.g., $V_{s1}$ corresponding to the waveform 860). In another example, after the falling edge of the pulse, the voltage signal 763 remains constant (e.g., being equal to $V_{cs\_0}$) until the next pulse of the control signal 761. In one embodiment, the pulse of the control signal 761 is so narrow that $V_{cs\_0}$ equals approximately and thus represents the current sensing signal 752 at the beginning of the on-time of the switch 4720.

According to another embodiment, the sampling-and-holding component 764 receives at least the drive signal 759 (corresponding to the waveform 850), which includes, for each switching cycle, a pulse that has a width corresponding to the on-time of the switch 4720 (e.g., $T_{ON}$). For example, during the pulse of the drive signal 759, the current sensing signal 752 (e.g., $V_{cs}$ corresponding to the waveform 830) is sampled and held as the voltage signal 765 (e.g., $V_{s2}$ corresponding to the waveform 870). In another example, after the falling edge of the pulse, the voltage signal 765 remains constant (e.g., being equal to $V_{cs\_p}$) until the next pulse of the drive signal 759.

As shown in FIG. 7, the voltage signals 763 and 765 are received by the voltage-to-current converters 766 and 768, which in response generate current signals 767 and 769, respectively, according to one embodiment. For example, the current signal 767 is represented by $I_{s1}$, and the current signal 769 is represented by $I_{s2}$. In another example, the sum of the current signals 767 and 769 forms a sinking current 781 (e.g., $I_{sink}$), which is used to discharge the capacitor 790 if the switch 780 is closed.

According to another embodiment, the switch 780 is controlled by a Demag signal 745, which is generated by the demagnetization detection component 744. For example, if the Demag signal 745 is at the logic high level, the switch 780 is closed. In another example, the switch 780 is closed during the demagnetization period and is open during the rest of the switching period. In yet another example, the sinking current 781 discharges the capacitor 790 during the demagnetization period (e.g., during $T_{Demag}$). According to yet another embodiment, the voltage-to-current converter 760 receives a predetermined voltage signal 791 (e.g., $V_{ref}$), and in response generates a charging current 761 (e.g., $T_{ref}$). For example, the charging current 761 charges the capacitor 790 during the switching period (e.g., during $T_s$).

According to yet another embodiment, the signal 783 (e.g., $V_C$ corresponding to the waveform 880) is generated by the charging current 761 (e.g., $I_{ref}$) and the discharging current 781 (e.g., $I_{sink}$) for the capacitor 790. For example, the signal 783 (e.g., $V_C$ corresponding to the waveform 880) decreases with time during the demagnetization period (e.g., during $T_{Demag}$) at a slope of $-(I_{sink}-I_{ref})/C$, and increases with time during the rest of the switching period (e.g., during the rest of $T_s$) at a slope of $I_{ref}/C$. The negative slope indicates the signal 783 decreases with time in magnitude, and C represents the capacitance of the capacitor 790. In another example, for each switching cycle, the amplitude change of the signal 783 during the charging phase and the amplitude change of the signal 783 during the discharging phase are the same in order to keep the output current at a constant level in the CC mode.

As shown in FIG. 7, the capacitor 790 outputs the signal 783 (e.g., $V_C$) to the low-pass filter 782 according to one embodiment. For example, the signal 783 is processed by the low-pass filter 782 and becomes a filtered signal 785. In another example, the filtered signal 785 is substantially the same as the expected DC signal (e.g., $V_E$) for the signal 783 (e.g., $V_C$) in order to achieve the constant output current. In yet another example, the low-pass filter 782 also serves as a buffer to the signal 783. In yet another example, the filtered signal 785 is received by the resistor 786, which, together with the resistor 788, generates the signal 787 (e.g., $V_R$ corresponding to the waveform 890).

In another embodiment, the comparator 742 receives the signal 787 (e.g., $V_R$) and also receives the current sensing signal 752 through the slope compensation component 784. For example, in response, the comparator 742 generates a comparison signal 743, which is received by the flip-flop component 754. In another example, the flip-flop component 754 also receives a clock signal 755 from the clock generator 756 and generates a modulation signal 757. In yet another example, the modulation signal 757 is received by the driver component 758, which in response outputs the drive signal 759 to the switch 4720 and the sampling-and-holding components 762 and 764.

According to one embodiment, for CCM and DCM, $$I_{s1} = \alpha \times V_{cs\_0} = \alpha \times I_{pri\_0} \times R_s \quad \text{(Equation 28)}$$

and $I_{s2} = \alpha \times V_{cs\_p} = \alpha \times I_{pri\_p} \times R_s$ (Equation 29)

Hence $I_{sink} = I_{s1} + I_{s2} = \alpha \times I_{pri\_0} \times R_s + \alpha \times I_{pri\_p} \times R_s$ (Equation 30)

where α is a constant related to the voltage-to-current converters 766 and 768, and $R_s$ is the resistance of the sensing resistor 4730. According to another embodiment, if, within each switching cycle, the charging and the discharging of the capacitor 790 are equal, the power conversion system 700 reaches the equilibrium (e.g., the steady state), as follows:

$$I_{ref} \times T_s = I_{sink} \times T_{Demag} \quad \text{(Equation 31)}$$

Combining Equations 30 and 31, the following can be obtained:

$$I_{ref} = \alpha \times R_s \times (I_{pri\_0} + I_{pri\_p}) \times \frac{T_{Demag}}{T_s} \quad \text{(Equation 32)}$$

If $I_{ref} = \beta \times V_{ref}$ (Equation 33)

$$(I_{pri\_0} + I_{pri\_p}) \times \frac{T_{Demag}}{T_s} = \frac{\beta \times V_{ref}}{\alpha \times R_s} \quad \text{(Equation 34)}$$

where β is a constant related to the voltage-to-current converter 760.

Since $$I_{out} = \frac{1}{2} \times N \times (I_{pri\_p} + I_{pri\_0}) \times \frac{T_{Demag}}{T_s} \quad \text{(Equation 35)}$$

then $$I_{out} = N \times \frac{\beta}{2 \times \alpha \times R_s} \times V_{ref} \quad \text{(Equation 36)}$$

where $T_{Demag}$ represents the duration of the demagnetization process, and $T_s$ represents the switching period. Additionally, $I_{out}$ represents the output current and N represents the turns ratio between the primary winding 4710 and the secondary winding 4712. According to yet another embodiment, α, β, N, $R_s$, and $V_{ref}$ are all constants, so the constant output current is achieved.

According to another embodiment, α, β, N and $V_{ref}$ are all constants, so the constant output current is achieved.

As discussed above and further emphasized here, FIG. 7 is an example, which should not unduly limit the scope of the claims. One of ordinary skill in the art would recognize many variations, alternatives, and modifications. For example, the low-pass filter 782 also serves as a buffer. In another example, the leading-edge blanking component 750 is removed, and the signal 752 is received directly from the terminal 714. In yet another example, the resistors 786 and 788 are removed, and the filtered signal 785 is received directly by the comparator 742.

In yet another example, for DCM, $V_{cs\_0}$ is equal to zero, so the sampling-and-holding component 762 and the voltage-to-current converter 766 are removed if the power conversion system 700 does not need to operate in the CCM mode for CC. In yet another example, the capacitor 790 is moved off the chip 710, and the low-pass filter 782 and the resistors 786 and 788 are removed from the power conversion system 700 so that the signal 783 is received directly by the comparator 742, as shown in FIGS. 9 and 10.

FIG. 9 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 900 includes the primary winding 4710, the secondary winding 4712, the auxiliary winding 4714, the switch 4720, the sensing resistor 4730, the equivalent resistor 4740 for the output cable, the resistors 4750 and 4752, and the rectifying diode 4760. Additionally, the system 900 also includes the comparator 742, the demagnetization detection component 744, the leading-edge blanking component 750, the flip-flop component 754, the clock generator 756, and the driver component 758. Moreover, the system 900 also includes the sampling-and-holding components 762 and 764, the voltage-to-current converters 760, 766 and 768, the switch 780, and a capacitor 990.

For example, the comparator 742, the demagnetization detection component 744, the leading-edge blanking component 750, the flip-flop component 754, the clock generator 756, the sampling-and-holding components 762 and 764, the voltage-to-current converters 760, 766 and 768, and the switch 780 are located on a chip 910, and the capacitor 990 is located off the chip 910. In another example, the chip 910 includes the terminals 712, 714 and 716, and a terminal 918.

FIG. 10 is a simplified timing diagram for the switch-mode power conversion system 900 with constant current control under CCM and DCM according to another embodiment of the present invention. This diagram is merely an example, which should not unduly limit the scope of the claims. One of ordinary skill in the art would recognize many variations, alternatives, and modifications.

As shown in FIG. 10, the waveform 1010 represents the feedback signal 4754 (e.g., $V_{FB}$) as a function of time, the waveform 1020 represents the secondary current (that flows through the secondary winding 4712) as a function of time, and the waveform 1030 represents the current sensing signal 752 (e.g., $V_{cs}$) as a function of time. Additionally, the waveform 1040 represents the sampling control signal 761 as a function of time, the waveform 1050 represents the drive signal 759 as a function of time, the waveform 1060 represents the voltage signal 763 (e.g., $V_{s1}$) as a function of time, and the waveform 1070 represents the voltage signal 765 (e.g., $V_{s2}$) as a function of time. Moreover, the waveform 1080 represents the signal 783 (e.g., $V_C$) as a function of time.

For example, the waveforms 1010, 1020, 1030, 1040, 1050, 1060, and 1070 are the same as the waveforms 810, 820, 830, 840, 850, 860, and 870, respectively. In another example, the capacitor 990 has a capacitance value that is large enough so that the signal 783 (e.g., $V_C$ corresponding to the waveform 1080) has little fluctuations (e.g., ripples), and the dedicated low pass filter 782 and the resistors 786 and 788 are not needed.

FIG. 11 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 1100 includes a primary winding 5110, a secondary winding 5112, an auxiliary winding 5114, a switch 5120, a sensing resistor 5130, an equivalent resistor 5140 for an output cable, resistors 5150 and 5152, and a rectifying diode 5160. Additionally, the system 1100 also includes a comparator 1142, a demagnetization detection component 1144, a leading-edge blanking component 1150, a flip-flop component 1154, a pulse signal generator 1156, and a driver component 1158. Moreover, the system 1100 also includes voltage-to-current converters 1160 and 1166, a switch 1180, a low-pass filter 1182, resistors 1186 and 1188, and a capacitor 1190.

For example, the primary winding 5110, the secondary winding 5112, the auxiliary winding 5114, the switch 5120, the sensing resistor 5130, the equivalent resistor 5140, the resistors 5150 and 5152, and the rectifying diode 5160 are the same as the primary winding 310, the secondary winding 312, the auxiliary winding 314, the switch 320, the sensing resistor 330, the equivalent resistor 340, the resistors 350 and 352, and the rectifying diode 360, respectively. In another example, the comparator 1142, the demagnetization detection component 1144, the leading-edge blanking component 1150, the flip-flop component 1154, the pulse signal generator 1156, the driver component 1158, the voltage-to-current converters 1160 and 1166, the switch 1180, the low-pass filter 1182, the resistors 1186 and 1188, and the capacitor 1190 are located on a chip 1110. In yet another example, the chip 1110 includes terminals 1112, 1114, and 1116.

FIG. 12 is a simplified timing diagram for the switch-mode power conversion system 1100 with constant current control under the QR mode according to an embodiment of the present invention. This diagram is merely an example, which should not unduly limit the scope of the claims. One of ordinary skill in the art would recognize many variations, alternatives, and modifications.

As shown in FIG. 12, the waveform 1210 represents a feedback signal 5154 (e.g., $V_{FB}$) as a function of time, the waveform 1220 represents a secondary current (that flows through the secondary winding 5112) as a function of time, and the waveform 1230 represents a current sensing signal 1152 (e.g., $V_{cs}$) as a function of time. Additionally, the waveform 1250 represents a drive signal 1159 as a function of time, and the waveform 1260 represents a current signal 1181 (e.g., $I_{sink}$) as a function of time. Moreover, the waveform 1280 represents a signal 1183 (e.g., $V_C$) as a function of time, and the waveform 1290 represents a signal 1187 (e.g., $V_S$) as a function of time.

As shown in FIGS. 11 and 12, the comparator 1142 receives the signal 1187 (e.g., $V_S$ corresponding to the waveform 1290) and the current sensing signal 1152 (e.g., $V_{cs}$ corresponding to the waveform 1230) according to one embodiment. For example, in response, the comparator 1142 generates a comparison signal 1143, which is received by the flip-flop component 1154. In another example, the flip-flop component 1154 also receives a pulse signal 1155 from the pulse signal generator 1156 and generates a modulation signal 1157. In yet another example, the modulation signal 1157 is received by the driver component 1158, which in response outputs the drive signal 1159 to the switch 5120.

According to another embodiment, the switch 5120 is turned off if the current sensing signal 1152 (e.g., $V_{cs}$) becomes equal to or larger than the signal 1187 (e.g., $V_S$) in magnitude. For example, at the end of the on-time of the switch 5120 (e.g., at the end of $T_{on}$), the signal 1187 (e.g., $V_s$) is equal to the current sensing signal 1152 (e.g., $V_{cs}$). In another example, at the end of $T_{on}$, $V_s$ is equal to $V_{cs\_p}$ as shown by the waveforms 1290 and 1230 with internal propagation delay of the chip 1110 omitted. In yet another example, $$V_{cs\_p} = I_{pri\_p} \times R_s \quad \text{(Equation 37)}$$

where $V_{cs\_p}$ represents the peak magnitude of the current sensing signal 1152, and $I_{pri\_p}$ represents the peak magnitude of the primary current 5122 that flows through the primary winding 5110. Additionally, $R_s$ represents the resistance of the sensing resistor 5130.

As shown in FIG. 11, the signal 1187 (e.g., $V_s$) is also received by the voltage-to-current converter 1166, which in response generates a current signal 1181 according to one embodiment. For example, the current signal 1181 is represented by $I_{sink}$ and used to discharge the capacitor 1190 if the switch 1180 is closed. According to another embodiment, the switch 1180 is controlled by a Demag signal 1145. For example, if the Demag signal 1145 is at the logic high level, the switch 1180 is closed. In another example, the switch 1180 is closed during the demagnetization period and is open during the rest of the switching period. In yet another example, the sinking current 1181 discharges the capacitor 1190 during the demagnetization period (e.g., during $T_{Demag}$).

According to yet another embodiment, the Demag signal 1145 is generated by the demagnetization detection component 1144, which is also received by the pulse signal generator 1156. For example, in response to pulses of the Demag signal 1145, the pulse signal generator 1156 generates pulses of the pulse signal 1155. In another example, different pulses of the pulse signal 1155 correspond to different switching cycles.

In one embodiment, the voltage-to-current converter 1160 receives a predetermined voltage signal 1191 (e.g., $V_{ref}$), and in response generates a charging current 1161 (e.g., $I_{ref}$). For example, the charging current 1161 charges the capacitor 1190 during the switching period (e.g., during $T_s$).

In another embodiment, the signal 1183 (e.g., $V_C$ corresponding to the waveform 1280) is generated by the charging current 1161 (e.g., $I_{ref}$) and the discharging current 1181 (e.g., $I_{sink}$) for the capacitor 1190.

For example, the signal 1183 (e.g., $V_C$ corresponding to the waveform 1280) decreases with time during the demagnetization period (e.g., during $T_{Demag}$) at a slope of $-(I_{sink}-I_{ref})/C$, and increases with time during the rest of the switching period (e.g., during the rest of $T_s$) at a slope of $I_{ref}/C$. The negative slope indicates the signal 1183 decreases with time in magnitude, and C represents the capacitance of the capacitor 1190. In another example, for each switching cycle, the amplitude change of the signal 1183 during the charging phase and the amplitude change of the signal 1183 during the discharging phase are the same in order to keep the output current at a constant level in the QR mode of operation.

As shown in FIG. 11, the capacitor 1190 outputs the signal 1183 (e.g., $V_C$) to the low-pass filter 1182 according to one embodiment. For example, the signal 1183 is processed by the low-pass filter 1182 and becomes a filtered signal 1185. In another example, the filtered signal 1185 is substantially the same as the expected DC signal (e.g., $V_E$) for the signal 1183 (e.g., $V_C$) in order to achieve the constant output current. In yet another example, the low-pass filter 1182 also serves as a buffer to the signal 1183. In yet another example, the filtered signal 1185 is received by the resistor 1186, which, together with the resistor 1188, generates the signal 1187 (e.g., $V_S$ corresponding to the waveform 1290). The signal 1187 is received by the voltage-to-current converter 1166 and the comparator 1142 according to one embodiment.

According to another embodiment, for the QR mode, $$I_{sink} = \alpha \times V_s = \alpha \times I_{pri\_p} \times R_s \quad \text{(Equation 38)}$$

where $\alpha$ is a constant related to the voltage-to-current converter 1166, and $R_s$ is the resistance of the sensing resistor 5130. According to yet another embodiment, if, within each switching cycle, the charging and the discharging of the capacitor 1190 are equal, the power conversion system 1100 reaches the equilibrium (e.g., the steady state), as follows:

$$I_{ref} \times T_s = I_{sink} \times T_{Demag} \quad \text{(Equation 39)}$$

Combining Equations 38 and 39, the following can be obtained:

$$I_{ref} = \alpha \times R_s \times I_{pri\_p} \times \frac{T_{Demag}}{T_s} \quad \text{(Equation 40)}$$

$$\text{If } I_{ref} = \beta \times V_{ref} \quad \text{(Equation 41)}$$

$$I_{pri\_p} \times \frac{T_{Demag}}{T_s} = \frac{\beta \times V_{ref}}{\alpha \times R_s} \quad \text{(Equation 42)}$$

where $\beta$ is a constant related to the voltage-to-current converter 1160.

Since, for the QR mode, $$I_{out} = \frac{1}{2} \times N \times I_{pri\_p} \times \frac{T_{Demag}}{T_s} \quad \text{(Equation 43)}$$

then $$I_{out} = N \times \frac{\beta}{2 \times \alpha \times R_s} \times V_{ref} \quad \text{(Equation 44)}$$

where $T_{Demag}$ represents the duration of the demagnetization process, and $T_s$ represents the switching period. Additionally, $I_{out}$ represents the output current and N represents the turns ratio between the primary winding 5110 and the secondary winding 5112. According to yet another embodiment, $\alpha$, $\beta$, N, $R_s$, and $V_{ref}$ are all constants, so the constant output current is achieved.

As discussed above and further emphasized here, FIG. 11 is an example, which should not unduly limit the scope of the claims. One of ordinary skill in the art would recognize many variations, alternatives, and modifications. For example, the low-pass filter 1182 also serves as a buffer. In another example, the leading-edge blanking component 1150 is removed, and the signal 1152 is received directly from the terminal 1114. In yet another example, the resistors 1186 and 1188 are removed, and the filtered signal 1185 is received directly by the comparator 1142. In yet another example, the capacitor 1190 is moved off the chip 1110, and the low-pass filter 1182 and the resistors 1186 and 1188 are removed from the power conversion system 1100 so that the signal 1183 is received directly by the comparator 1142, as shown in FIGS. 13 and 14.

FIG. 13 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 1300 includes the primary winding 5110, the secondary winding 5112, the auxiliary winding 5114, the switch 5120, the sensing resistor 5130, the equivalent resistor 5140 for the output cable, the resistors 5150 and 5152, and the rectifying diode 5160. Additionally, the system 1300 also includes the comparator 1142, the demagnetization detection component 1144, the leading-edge blanking component 1150, the flip-flop component 1154, the pulse signal generator 1156, the driver component 1158, the voltage-to-current converters 1160 and 1166, the switch 1180, and a capacitor 1390.

For example, the comparator 1142, the demagnetization detection component 1144, the leading-edge blanking component 1150, the flip-flop component 1154, the pulse signal generator 1156, the voltage-to-current converters 1160 and 1166, the switch 1180 are located on a chip 1310, and the capacitor 1390 is located off the chip 1310. In another example, the chip 1310 includes the terminals 1112, 1114 and 1116, and a terminal 1318.

FIG. 14 is a simplified timing diagram for the switch-mode power conversion system 1300 with constant current control under the QR mode according to yet another embodiment of the present invention. This diagram is merely an example, which should not unduly limit the scope of the claims. One of ordinary skill in the art would recognize many variations, alternatives, and modifications.

As shown in FIG. 14, the waveform 1410 represents the feedback signal 5154 (e.g., $V_{FB}$) as a function of time, the waveform 1420 represents the secondary current (that flows through the secondary winding 5112) as a function of time, and the waveform 1430 represents the current sensing signal 1152 (e.g., $V_{cs}$) as a function of time. Additionally, the waveform 1450 represents the drive signal 1159 as a function of time, the waveform 1460 represents the current signal 1181 (e.g., $I_{sink}$) as a function of time, and the waveform 1480 represents the signal 1183 (e.g., $V_C$) as a function of time.

For example, the waveforms 1410, 1420, 1430, 1450, and 1460 are the same as the waveforms 1210, 1220, 1230, 1250, and 1260, respectively. In another example, the capacitor 1390 has a capacitance value that is large enough so that the signal 1183 (e.g., $V_C$ corresponding to the waveform 1480) has little fluctuations (e.g., ripples), and the dedicated low pass filter 1182 and the resistors 1186 and 1188 are not needed.

FIG. 15 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 1500 includes a primary winding 5510, a secondary winding 5512, an auxiliary winding 5514, a switch 5520, a sensing resistor 5530, an equivalent resistor 5540 for an output cable, resistors 5550 and 5552, and a rectifying diode 5560. Additionally, the system 1500 also includes a comparator 1542, a demagnetization detection component 1544, a leading-edge blanking component 1550, a flip-flop component 1554, a pulse signal generator 1556, and a driver component 1558. Moreover, the system 1500 also includes a sampling-and-holding component 1562, voltage-to-current converters 1560 and 1566, a switch 1580, and a capacitor 1590.

For example, the primary winding 5510, the secondary winding 5512, the auxiliary winding 5514, the switch 5520, the sensing resistor 5530, the equivalent resistor 5540, the resistors 5550 and 5552, and the rectifying diode 5560 are the same as the primary winding 310, the secondary winding 312, the auxiliary winding 314, the switch 320, the sensing resistor 330, the equivalent resistor 340, the resistors 350 and 352, and the rectifying diode 360, respectively. In another example, the comparator 1542, the demagnetization detection component 1544, the leading-edge blanking component 1550, the flip-flop component 1554, the pulse signal generator 1556, the driver component 1558, the sampling-and-holding component 1562, the voltage-to-current converters 1560 and 1566, and the switch 1580 are located on a chip 1510, and the capacitor 1590 is located off the chip 1510. In yet another example, the chip 1510 includes terminals 1512, 1514, 1516, and 1518.

FIG. 16 is a simplified timing diagram for the switch-mode power conversion system 1500 with constant current control under the QR mode according to yet another embodiment of the present invention. This diagram is merely an example, which should not unduly limit the scope of the claims. One of ordinary skill in the art would recognize many variations, alternatives, and modifications.

As shown in FIG. 16, the waveform 1610 represents a feedback signal 5554 (e.g., $V_{FB}$) as a function of time, the waveform 1620 represents a secondary current (that flows through the secondary winding 5512) as a function of time, and the waveform 1630 represents a current sensing signal 1552 (e.g., $V_{cs}$) as a function of time. Additionally, the waveform 1650 represents a drive signal 1559 as a function of time, and the waveform 1660 represents a current signal 1581 (e.g., $I_{sink}$) as a function of time. Moreover, the waveform 1680 represents a signal 1583 (e.g., $V_C$) as a function of time, and the waveform 1690 represents a signal 1563 (e.g., $V_S$) as a function of time.

As shown in FIGS. 15 and 16, the sampling-and-holding component 1562 receives at least the drive signal 1559 (corresponding to the waveform 1650), which includes, for each switching cycle, a pulse that has a width corresponding to the on-time of the switch 5520 (e.g., $T_{ON}$). For example, during the pulse of the drive signal 1559, the current sensing signal 1552 (e.g., $V_{cs}$ corresponding to the waveform 1630) is sampled and held as the voltage signal 1563 (e.g., $V_s$ corresponding to the waveform 1690). In another example, after the falling edge of the pulse, the voltage signal 1563 remains constant (e.g., being equal to $V_{cs\_p}$) until the next pulse of the drive signal 1559.

According to another embodiment, the voltage signal 1563 is received by the voltage-to-current converter 1566, which in response generate a current signal 1581. For example, the current signal 1581 is represented by $I_{sink}$ and used to discharge the capacitor 1590 if the switch 1580 is closed. According to yet another embodiment, the switch 1580 is controlled by a Demag signal 1545. For example, if the Demag signal 1545 is at the logic high level, the switch 1580 is closed. In another example, the sinking current 1581 discharges the capacitor 1590 during the demagnetization period (e.g., during $T_{Demag}$).

As shown in FIG. 15, the Demag signal 1545 is generated by the demagnetization detection component 1544, which is also received by the pulse signal generator 1556. For example, in response to pulses of the Demag signal 1545, the pulse signal generator 1556 generates pulses of the pulse signal 1555. In another example, different pulses of the pulse signal 1555 correspond to different switching cycles.

In one embodiment, the voltage-to-current converter 1560 receives a predetermined voltage signal 1591 (e.g., $V_{ref}$), and in response generates a charging current 1561 (e.g., $I_{ref}$). For example, the charging current 1561 charges the capacitor 1590 during the switching period (e.g., during $T_s$).

In another embodiment, the signal 1583 (e.g., $V_C$ corresponding to the waveform 1680) is generated by the charging current 1561 (e.g., $I_{ref}$) and the discharging current 1581 (e.g., $I_{sink}$) for the capacitor 1590. For example, the signal 1583 is received directly by the comparator 1542. In another example, the capacitor 1590 has a capacitance value that is large enough so that the signal 1583 (e.g., $V_C$ corresponding to the waveform 1680) has little fluctuations (e.g., ripples).

In yet another embodiment, the comparator 1542 receives the signal 1583 (e.g., $V_C$) and also receives the current sensing signal 1552. For example, in response, the comparator 1542 generates a comparison signal 1143, which is received by the flip-flop component 1554. In another example, the flip-flop component 1554 also receives the pulse signal 1555 from the pulse signal generator 1556 and generates a modulation signal 1557. In yet another example, the modulation signal 1557 is received by the driver component 1558, which in response outputs the drive signal 1559 to the switch 5520 and the sampling-and-holding component 1562.

According to one embodiment, for the QR mode, $$I_{sink} = \alpha \times V_S = \alpha \times I_{pri\_p} \times R_s \quad \text{(Equation 45)}$$

where $\alpha$ is a constant related to the voltage-to-current converter 1566, and $R_s$ is the resistance of the sensing resistor 5530. According to another embodiment, if, within each switching cycle, the charging and the discharging of the capacitor 1590 are equal, the power conversion system 1500 reaches the equilibrium (e.g., the steady state), as follows:

$$I_{ref} \times T_s = I_{sink} \times T_{Demag} \quad \text{(Equation 46)}$$

Combining Equations 45 and 46, the following can be obtained:

$$I_{ref} = \alpha \times R_s \times I_{pri\_p} \times \frac{T_{Demag}}{T_s} \quad \text{(Equation 47)}$$

If $I_{ref} = \beta \times V_{ref}$ \quad (Equation 48)

$$I_{pri\_p} \times \frac{T_{Demag}}{T_s} = \frac{\beta \times V_{ref}}{\alpha \times R_s} \quad \text{(Equation 49)}$$

where $\beta$ is a constant related to the voltage-to-current converter 1560.

Since, for the QR mode, $$I_{out} = \frac{1}{2} \times N \times I_{pri\_p} \times \frac{T_{Demag}}{T_s} \quad \text{(Equation 50)}$$

then $$I_{out} = N \times \frac{\beta}{2 \times \alpha \times R_s} \times V_{ref} \quad \text{(Equation 51)}$$

where $T_{Demag}$ represents the duration of the demagnetization process, and $T_s$ represents the switching period. Additionally, $I_{out}$ represents the output current and N represents the turns ratio between the primary winding 5510 and the secondary winding 5512. According to yet another embodiment, $\alpha$, $\beta$, N, $R_s$, and $V_{ref}$ are all constants, so the constant output current is achieved.

According to certain embodiments, for each switching period, the power conversion system 1500, at the end of on-time of the switch 5520 (e.g., $T_{on}$), samples and holds the peak magnitude of the current sensing signal 1552 (e.g., $V_{cs\_p}$). According to some embodiments, the power conversion system 1500 significantly reduces the effect of internal propagation delay of the controller on the regulation accuracy of the output current, in comparison with the power conversion systems 1100 and 1300.

As discussed above and further emphasized here, FIG. 15 is an example, which should not unduly limit the scope of the claims. One of ordinary skill in the art would recognize many variations, alternatives, and modifications. For example, the leading-edge blanking component 1550 is removed, and the signal 1552 is received directly from the terminal 1514.

FIG. 17 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 1700 includes a primary winding 5710, a secondary winding 5712, an auxiliary winding 5714, a switch 5720, a sensing resistor 5730, an equivalent resistor 5740 for an output cable, resistors 5750 and 5752, and a rectifying diode 5760. Additionally, the system 1700 also includes a comparator 1742, a demagnetization detection component 1744, a leading-edge blanking component 1750, a flip-flop component 1754, a clock generator 1756, and a driver component 1758. Moreover, the system 1700 also includes sampling-and-holding components 1762 and 1764, voltage-to-current converters 1760, 1766 and 1768, a switch 1780, a low-pass filter 1782, a capacitor 1790, and a ramping signal generator 1792.

For example, the primary winding 5710, the secondary winding 5712, the auxiliary winding 5714, the switch 5720, the sensing resistor 5730, the equivalent resistor 5740, the resistors 5750 and 5752, and the rectifying diode 5760 are the same as the primary winding 310, the secondary winding 312, the auxiliary winding 314, the switch 320, the sensing resistor 330, the equivalent resistor 340, the resistors 350 and 352, and the rectifying diode 360, respectively. In another example, the comparator 1742, the demagnetization detection component 1744, the leading-edge blanking component 1750, the flip-flop component 1754, the clock generator 1756, the driver component 1758, the sampling-and-holding components 1762 and 1764, the voltage-to-current converters 1760, 1766 and 1768, the switch 1780, the low-pass filter 1782, the capacitor 1790, and a ramping signal generator 1792 are located on a chip 1710. In yet another example, the chip 1710 includes terminals 1712, 1714, and 1716.

FIG. 18 is a simplified timing diagram for the switch-mode power conversion system 1700 with constant current control under CCM and DCM according to an embodiment of the present invention. This diagram is merely an example, which should not unduly limit the scope of the claims. One of ordinary skill in the art would recognize many variations, alternatives, and modifications.

As shown in FIG. 18, the waveform 1810 represents a feedback signal 5754 (e.g., $V_{FB}$) as a function of time, the waveform 1820 represents a secondary current (that flows through the secondary winding 5712) as a function of time, and the waveform 1830 represents a current sensing signal 1752 (e.g., $V_{cs}$) as a function of time. Additionally, the waveform 1840 represents a sampling control signal 1761 as a function of time, the waveform 1850 represents a drive signal 1759 as a function of time, the waveform 1860 represents a voltage signal 1763 (e.g., $V_{S1}$) as a function of time, and the waveform 1870 represents a voltage signal 1765 (e.g., $V_{S2}$) as a function of time. Moreover, the waveform 1880 represents a signal 1783 (e.g., $V_C$) as a function of time, the waveform 1890 represents a signal 1787 (e.g., $V_R$) as a function of time, and the waveform 1892 represents a ramping signal 1793 as a function of time.

According to one embodiment, in CCM, $V_{cs\_0}$ is not equal to zero, and the next switching cycle starts before the demagnetization process is completed. For example, the actual length of the demagnetization process before the next switching cycle starts is limited to the off-time of the switch 5720; hence $T_{off}$ can be represented by $T_{Demag}$ in CCM. According to another embodiment, in DCM, $V_{cs\_0}$ is equal to zero, and the off-time of the switch, $T_{off}$, is much longer than the demagnetization period, $T_{Demag}$.

As shown in FIGS. 17 and 18, the sampling-and-holding component 1762 receives at least the drive signal 1759 (corresponding to the waveform 1850) and the control signal 1761 (corresponding to the waveform 1840) according to one embodiment. For example, the control signal 1761 includes, for each switching cycle, a pulse that has a rising edge at the beginning of the on-time of the switch 5720 (e.g., at the rising edge of the drive signal 1759). In another example, during the pulse, the current sensing signal 1752 (e.g., $V_{cs}$ corresponding to the waveform 1830) is sampled and held as the voltage signal 1763 (e.g., $V_{S1}$ corresponding to the waveform 1860). In another example, after the falling edge of the pulse, the voltage signal 1763 remains constant (e.g., being equal to $V_{cs\_0}$) until the next pulse of the control signal 1761. In one embodiment, the pulse of the control signal 1761 is so narrow that $V_{cs\_0}$ equals approximately and thus represents the current sensing signal 1752 at the beginning of the on-time of the switch 5720.

According to another embodiment, the sampling-and-holding component 1764 receives at least the drive signal 1759 (corresponding to the waveform 1850), which includes, for each switching cycle, a pulse that has a width corresponding to the on-time of the switch 5720 (e.g., $T_{ON}$). For example, during the pulse of the drive signal 1759, the current sensing signal 1752 (e.g., $V_{cs}$ corresponding to the waveform 1830) is sampled and held as the voltage signal 1765 (e.g., $V_{S2}$ corresponding to the waveform 1870). In another example, after the falling edge of the pulse, the voltage signal 1765 remains constant (e.g., being equal to $V_{cs\_p}$) until the next pulse of the drive signal 1759.

As shown in FIG. 17, the voltage signals 1763 and 1765 are received by the voltage-to-current converters 1766 and 1768, which in response generate current signals 1767 and 1769, respectively, according to one embodiment. For example, the current signal 1767 is represented by $I_{s1}$, and the current signal 1769 is represented by $I_{s2}$. In another example, the sum of the current signals 1767 and 1769 forms a sinking current 1781 (e.g., $I_{sink}$), which is used to discharge the capacitor 1790 if the switch 1780 is closed.

According to another embodiment, the switch 1780 is controlled by a Demag signal 1745, which is generated by the demagnetization detection component 1744. For example, if the Demag signal 1745 is at the logic high level, the switch 1780 is closed. In another example, the switch 1780 is closed during the demagnetization period and is open during the rest of the switching period. In yet another example, the sinking current 1781 discharges the capacitor 1790 during the demagnetization period (e.g., during $T_{Demag}$). According to yet another embodiment, the voltage-to-current converter 1760 receives a predetermined voltage signal 1791 (e.g., $V_{ref}$), and in response generates a charging current 1761 (e.g., $I_{ref}$). For example, the charging current 1761 charges the capacitor 1790 during the switching period (e.g., during $T_s$).

According to yet another embodiment, the signal 1783 (e.g., $V_C$ corresponding to the waveform 1880) is generated by the charging current 1761 (e.g., $I_{ref}$) and the discharging current 1781 (e.g., $I_{sink}$) for the capacitor 1790. For example, the signal 1783 (e.g., $V_C$ corresponding to the waveform 1880) decreases with time during the demagnetization period (e.g., during $T_{Demag}$) at a slope of $-(I_{sink}-I_{ref})/C$, and increases with time during the rest of the switching period (e.g., during the rest of $T_s$) at a slope of $I_{ref}/C$. The negative slope indicates the signal 1783 decreases with time in magnitude, and C represents the capacitance of the capacitor 1790. In another example, over a plurality of switching periods (e.g., over one period of the signal 1797), the amplitude change of the signal 1783 during the charging phase and the amplitude change of the signal 1783 during the discharging phase are the same in order to keep the output current at a constant level in the CC mode.

As shown in FIG. 17, the capacitor 1790 outputs the signal 1783 (e.g., $V_C$) to the low-pass filter 1782 according to one embodiment. For example, the signal 1783 is processed by the low-pass filter 1782 and becomes a signal 1787 (e.g., $V_R$ corresponding to the waveform 1890). In another example, the signal 1787 is substantially the same as the expected DC signal (e.g., $V_E$) for the signal 1783 (e.g., $V_C$) in order to achieve the constant output current. In yet another yet example, the low-pass filter 1782 also serves as a buffer to the signal 1783.

In another embodiment, the comparator 1742 receives the signal 1787 (e.g., $V_R$) and also receives the ramping signal 1793 (corresponding to the waveform 1892). For example, the ramping signal 1793 is generated by the ramping signal generator 1792 in response to the clock signal 1755. In another example, in response, the comparator 1742 generates a comparison signal 1743, which is received by the flip-flop component 1754. In yet another example, the flip-flop component 1754 also receives the clock signal 1755 from the clock generator 1756 and generates a modulation signal 1757. In yet another example, the modulation signal 1757 is received by the driver component 1758, which in response outputs the drive signal 1759 to the switch 5720 and the sampling-and-holding components 1762 and 1764.

According to certain embodiments, the signal 1787 (e.g., $V_R$ corresponding to the waveform 1890) is compared with the fixed ramping signal 1793 (corresponding to the waveform 1892); thus a constant on-time of the switch 5720 (e.g., $T_{on}$) is achieved for each switching cycle. According to some embodiments, the on-time of the switch 5720 (e.g., $T_{on}$) is $$T_{on} = \frac{V_R}{\gamma} \qquad \text{(Equation 52)}$$

where $T_{on}$ represents the on-time of the switch 5720, and $V_R$ represents the magnitude of the signal 1787. Additionally, $\gamma$ represents the ramping-up slope of the ramping signal 1793. With $T_{on}$ being constant, $T_{on}$ is determined by $V_R$ according to one embodiment. For example, $V_R$ (corresponding to the waveform 1890) is substantially constant over time, so $T_{on}$ also remains substantially constant.

According to some embodiments, for given input and output loading, $$V_{in} = \sqrt{2} \times V_{AC} \times |\sin \omega t| \qquad \text{(Equation 53)}$$

where $V_{in}$ represents an input rectified signal 1797. Additionally, $V_{AC}$ represents the magnitude of an input AC signal 1795, and $\omega$ represents the angular frequency of the input AC signal 1795. For example, the envelop for the peak magnitude of the primary current that flows though the primary winding 5710 is $$I_{pri\_p}(t) = \qquad \text{(Equation 54)}$$
$$\frac{V_{in}}{L} \times T_{on} + I_{pri\_0}(t) = \frac{\sqrt{2} \times V_{AC} \times |\sin \omega t|}{L} \times T_{on} + I_{pri\_0}(t)$$

where $I_{pri\_p}(t)$ represents the envelop for the peak magnitude of the primary current that flows though the primary winding 5710, and $I_{pri\_0}(t)$ represents the envelop for the magnitude of the primary current at the beginning of the on-time of the switch 5720. Additionally, L represents the inductance of the primary winding 5710.

In another example, for a fixed switching frequency, in DCM, the envelop for the average magnitude of the primary current that flows though the primary winding 5710 follows the envelope for the input rectified signal 1797 as shown below:

$$\hat{I}_{in}(t) = f \times T_{on} \times \frac{\sqrt{2} \times V_{AC} \times |\sin \omega t|}{2 \times L} \times T_{on} \qquad \text{(Equation 55)}$$

where $\hat{I}_{in}(t)$ represents the envelop for the average magnitude of the primary current that flows though the primary winding 5710, and f represents the switching frequency. In one embodiment, for DCM, the power conversion system 1700 has power factor of 1 in the CC mode. For example, the high power factor and precise control of constant output current are simultaneously achieved by the power conversion system 1700.

In another example, in CCM, the envelop for the average magnitude of the primary current that flows though the primary winding 5710 is $$\hat{I}_{in}(t) = \qquad \text{(Equation 56)}$$
$$f \times T_{on} \times \frac{\sqrt{2} \times V_{AC} \times |\sin \omega t|}{2 \times L} \times T_{on} + f \times T_{on} \times I_{pri\_0}(t)$$

where $\hat{I}_{in}(t)$ represents the envelop for the average magnitude of the primary current that flows though the primary winding 5710, and $I_{pri\_0}(t)$ represents the envelop for the magnitude of the primary current at the beginning of the on-time of the switch 5720. Additionally, f represents the switching frequency. In one embodiment, for the CCM mode of operation, the magnitude of the primary current at the beginning of the on-time of the switch 5720 is much smaller than the peak magnitude of the primary current, and the envelop for the magnitude of the primary current at the beginning of the on-time of the switch 5720 follows the envelope for the input rectified signal 1797. In another embodiment, for the CCM mode of operation, the power conversion system 1700 has power factor that is equal to or larger than 0.9 in the CC mode. For example, the high power factor and precise control of constant output current are simultaneously achieved by the power conversion system 1700.

As discussed above and further emphasized here, FIG. 17 is an example, which should not unduly limit the scope of the claims. One of ordinary skill in the art would recognize many variations, alternatives, and modifications. For example, the low-pass filter 1782 also serves as a buffer. In another example, the leading-edge blanking component 1750 is removed, and the signal 1752 is received directly from the terminal 1714. In yet another example, for the DCM mode of operation, $V_{cs\_0}$ is equal to zero, so the sampling-and-holding component 1762 and the voltage-to-current converter 1766 are removed if the power conversion system 1700 does not need to operate in the CCM mode for CC. In yet another example, the capacitor 1790 is moved off the chip 1710, and the low-pass filter 1782 is removed from the power conversion system 1700 so that the signal 1783 is received directly by the comparator 1742, as shown in FIGS. 19 and 20.

FIG. 19 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 1900 includes the primary winding 5710, the secondary winding 5712, the auxiliary winding 5714, the switch 5720, the sensing resistor 5730, the equivalent resistor 5740 for the output cable, the resistors 5750 and 5752, and the rectifying diode 5760. Additionally, the system 1900 also includes the comparator 1742, the demagnetization detection component 1744, the leading-edge blanking component 1750, the flip-flop component 1754, the clock generator 1756, and the driver component 1758. Moreover, the system 1900 also includes the sampling-and-holding components 1762 and 1764, the voltage-to-current converters 1760, 1766 and 1768, the switch 1780, the ramping signal generator 1792, and a capacitor 1990.

For example, the comparator 1742, the demagnetization detection component 1744, the leading-edge blanking component 1750, the flip-flop component 1754, the clock generator 1756, the driver component 1758, the sampling-and-holding components 1762 and 1764, the voltage-to-current converters 1760, 1766 and 1768, the switch 1780, and the ramping signal generator 1792 are located on a chip 1910, and the capacitor 1990 is located off the chip 1910. In another example, the chip 1910 includes the terminals 1712, 1714 and 1716, and a terminal 1918.

FIG. 20 is a simplified timing diagram for the switch-mode power conversion system 1900 with constant current control under CCM and DCM according to yet another embodiment of the present invention. This diagram is merely an example, which should not unduly limit the scope of the claims. One of ordinary skill in the art would recognize many variations, alternatives, and modifications.

As shown in FIG. 20, the waveform 2010 represents the feedback signal 5754 (e.g., $V_{FB}$) as a function of time, the waveform 2020 represents the secondary current (that flows through the secondary winding 5712) as a function of time, and the waveform 2030 represents the current sensing signal 1752 (e.g., $V_{cs}$) as a function of time. Additionally, the waveform 2040 represents the sampling control signal 1761 as a function of time, the waveform 2050 represents the drive signal 1759 as a function of time, the waveform 2060 represents the voltage signal 1763 (e.g., $V_{s1}$) as a function of time, and the waveform 2070 represents the voltage signal 1765 (e.g., $V_{s2}$) as a function of time. Moreover, the waveform 2080 represents the signal 1783 (e.g., $V_C$) as a function of time, and the waveform 2092 represents the ramping signal 1793 as a function of time.

For example, the waveforms 2010, 2020, 2030, 2040, 2050, 2060, 2070, and 2092 are the same as the waveforms 1810, 1820, 1830, 1840, 1850, 1860, 1870, and 1892 respectively. In another example, the capacitor 1990 has a capacitance value that is large enough so that the signal 1783 (e.g., $V_C$ corresponding to the waveform 2080) has little fluctuations (e.g., ripples), and the dedicated low pass filter 1782 is not needed.

FIG. 21 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 2100 includes a primary winding 6110, a secondary winding 6112, an auxiliary winding 6114, a switch 6120, a sensing resistor 6130, an equivalent resistor 6140 for an output cable, resistors 6150 and 6152, and a rectifying diode 6160. Additionally, the system 2100 also includes a comparator 2142, a demagnetization detection component 2144, a leading-edge blanking component 2150, a flip-flop component 2154, a clock generator 2156, and a driver component 2158. Moreover, the system 2100 also includes sampling-and-holding components 2162 and 2164, voltage-to-current converters 2160, 2166 and 2168, a switch 2180, a low-pass filter 2182, a capacitor 2190, a multiplier component 2196, and resistors 2192 and 2194.

For example, the primary winding 6110, the secondary winding 6112, the auxiliary winding 6114, the switch 6120, the sensing resistor 6130, the equivalent resistor 6140, the resistors 6150 and 6152, and the rectifying diode 6160 are the same as the primary winding 310, the secondary winding 312, the auxiliary winding 314, the switch 320, the sensing resistor 330, the equivalent resistor 340, the resistors 350 and 352, and the rectifying diode 360, respectively. In another example, the comparator 2142, the demagnetization detection component 2144, the leading-edge blanking component 2150, the flip-flop component 2154, the clock generator 2156, the driver component 2158, the sampling-and-holding components 2162 and 2164, the voltage-to-current converters 2160, 2166 and 2168, the switch 2180, the low-pass filter 2182, the capacitor 2190, and the multiplier component 2196 are located on a chip 2110. In yet another example, the chip 2110 includes terminals 2112, 2114, 2116, and 2118.

As shown in FIG. 21, the sampling-and-holding component 2162 receives at least a drive signal 2159 and a control signal 2161 according to one embodiment. For example, the control signal 2161 includes, for each switching cycle, a pulse that has a rising edge at the beginning of the on-time of the switch 6120 (e.g., at the rising edge of the drive signal 2159). In another example, during the pulse, the current sensing signal 2152 (e.g., $V_{cs}$) is sampled and held as the voltage signal 2163 (e.g., $V_{s1}$). In another example, after the falling edge of the pulse, the voltage signal 2163 remains constant (e.g., being equal to $V_{cs\_0}$) until the next pulse of the control signal 2161. In one embodiment, the pulse of the control signal 2161 is so narrow that $V_{cs\_0}$ equals approximately and thus represents the current sensing signal 2152 at the beginning of the on-time of the switch 6120.

According to another embodiment, the sampling-and-holding component 2164 receives at least the drive component 2159, which includes, for each switching cycle, a pulse that has a width corresponding to the on-time of the switch 6120 (e.g., $T_{ON}$). For example, during the pulse of the drive signal 2159, the current sensing signal 2152 (e.g., $V_{cs}$) is sampled and held as the voltage signal 2165 (e.g., $V_{s2}$). In another example, after the falling edge of the pulse, the voltage signal 2165 remains constant (e.g., being equal to $V_{cs\_p}$) until the next pulse of the drive signal 2159.

As shown in FIG. 21, the voltage signals 2163 and 2165 are received by the voltage-to-current converters 2166 and 2168, which in response generate current signals 2167 and 2169, respectively, according to one embodiment. For example, the current signal 2167 is represented by $I_{s1}$, and the current signal 2169 is represented by $I_{s2}$. In another example, the sum of the current signals 2167 and 2169 forms a sinking current 2181 (e.g., $I_{sink}$), which is used to discharge the capacitor 2190 if the switch 2180 is closed.

According to another embodiment, the switch 2180 is controlled by a Demag signal 2145, which is generated by the demagnetization detection component 2144. For example, if the Demag signal 2145 is at the logic high level, the switch 2180 is closed. In another example, the switch 2180 is closed during the demagnetization period and is open during the rest of the switching period. In yet another example, the sinking current 2181 discharges the capacitor 2190 during the demagnetization period (e.g., during $T_{Demag}$). According to yet another embodiment, the voltage-to-current converter 2160 receives a predetermined voltage signal 2191 (e.g., $V_{ref}$), and in response generates a charging current 2161 (e.g., $I_{ref}$). For example, the charging current 2161 charges the capacitor 2190 during the switching period (e.g., during $T_s$).

According to yet another embodiment, the signal 2183 (e.g., $V_C$) is generated by the charging current 2161 (e.g., $I_{ref}$) and the discharging current 2181 (e.g., $I_{sink}$) for the capacitor 2190. For example, the signal 2183 (e.g., $V_C$) decreases with time during the demagnetization period (e.g., during $T_{Demag}$) at a slope of $-(I_{sink}-I_{ref})/C$, and increases with time during the rest of the switching period (e.g., during the rest of $T_s$) at a slope of $I_{ref}/C$. The negative slope indicates the signal 2183 decreases with time in magnitude, and C represents the capacitance of the capacitor 2190. In another example, over a plurality of switching periods (e.g., over one period of the signal 2193), the amplitude change of the signal 2183 during the charging phase and the amplitude change of the signal 2183 during the discharging phase are the same in order to keep the output current at a constant level in the CC mode.

As shown in FIG. 21, the capacitor 2190 outputs the signal 2183 (e.g., $V_C$) to the low-pass filter 2182 according to one embodiment. For example, the signal 2183 is processed by the low-pass filter 2182 and becomes a signal 2187 (e.g., $V_R$). In another example, the signal 2187 is substantially the same as the expected DC signal (e.g., $V_E$) for the signal 2183 (e.g., $V_C$) in order to achieve the constant output current. In yet another yet example, the low-pass filter 2182 also serves as a buffer to the signal 2183.

In another embodiment, the resistor 2192 receives an input rectified signal 2193, and together with the resistor 2194, generates a signal 2195. For example, the signal 2195 is received by the multiplier component 2196 through the terminal 2118. In another example, the multiplier component 2196 also receives the signal 2187 (e.g., $V_R$) and generates a control signal 2197 based on at least information associated with the signals 2195 and 2187.

According to one embodiment, in response, the comparator 2142 generates a comparison signal 2143, which is received by the flip-flop component 2154. For example, the flip-flop component 2154 also receives the clock signal 2155 from the clock generator 2156 and generates a modulation signal 2157. In another example, the modulation signal 2157 is received by the driver component 2158, which in response outputs the drive signal 2159 to the switch 6120 and the sampling-and-holding components 2162 and 2164.

According to certain embodiments, the signal 2187 (e.g., $V_R$) is multiplied with the signal 2195 to generate the control signal 2197 as follows:

$$V_{ctrl} = \qquad\qquad\qquad\text{(Equation 57)}$$
$$\delta \times V_R \times V_{mult} = \delta \times V_R \times \frac{R_4}{R_3 + R_4} \times \left(\sqrt{2} \times V_{AC} \times |\sin\omega t|\right)$$

where $V_{ctrl}$ represents the magnitude of the control signal 2197, $V_R$ represents the magnitude of the signal 2187, and $V_{mult}$ represents the magnitude of the signal 2195. Additionally, $\delta$ represents a constant related to the multiplier component 2196, and $R_3$ and $R_4$ represent resistance values of the resistors 2192 and 2194, respectively. Moreover, $V_{AC}$ represents the magnitude of an input AC signal 2199, and $\omega$ represents the angular frequency of the input AC signal 2199.

According to some embodiments, the control signal 2197 is compared with the current sensing signal 2152. For example, if the current sensing signal 2152 reaches or exceeds the control signal 2197 in magnitude, the switch 6120 is turned off. In another example, the signal 2187 (e.g., $V_R$) is substantially constant during one or more AC periods of the input AC signal 2199; hence the envelop for the peak magnitude of the primary current that flows though the primary winding 6110 is $$I_{pri\_p}(t) = \delta \times \frac{R_4}{R_3 + R_4} \times \frac{V_{in}}{R_s} \times V_R + I_{pri\_0}(t) = \qquad\text{(Equation 58)}$$
$$\delta \times \frac{R_4}{R_3 + R_4} \times \frac{\sqrt{2} \times V_{AC} \times |\sin\omega t|}{R_s} \times V_R + I_{pri\_0}(t)$$

where $I_{pri\_p}(t)$ represents the envelop for the peak magnitude of the primary current that flows though the primary winding 6110, and $I_{pri\_0}(t)$ represents the envelop for the magnitude of the primary current at the beginning of the on-time of the switch 6120.

For example, for a fixed switching frequency, in DCM, the envelop for the average magnitude of the primary current that flows though the primary winding 6110 follows the envelope for the input rectified signal 2193 as shown below:

$$\hat{I}_{in}(t) = \delta^2 \times \left(\frac{R_4}{R_3 + R_4}\right)^2 \times \frac{\sqrt{2} \times V_{AC} \times |\sin\omega t|}{R_s} \times V_R^2 \times f \qquad\text{(Equation 59)}$$

where $\hat{I}_m(t)$ represents the envelop for the average magnitude of the primary current that flows though the primary winding 6110, and f represents the switching frequency. In one embodiment, for DCM, the power conversion system 2100 has power factor of 1 in the CC mode. For example, the high power factor and precise control of constant output current are simultaneously achieved by the power conversion system 2100.

In another example, in CCM, the envelop for the average magnitude of the primary current that flows though the primary winding 6110 is $$\hat{I}_{in}(t) = \delta^2 \times \left(\frac{R_4}{R_3 + R_4}\right)^2 \times \frac{\sqrt{2} \times V_{AC} \times |\sin\omega t|}{R_s} \times V_R^2 \times f + \qquad\text{(Equation 60)}$$
$$I_{pri\_0}(t) \times \delta \times \frac{R_4}{R_3 + R_4} \times V_R \times f$$

where $\hat{I}_m(t)$ represents the envelop for the average magnitude of the primary current that flows though the primary winding 6110, and $I_{pri\_0}(t)$ represents the envelop for the magnitude of the primary current at the beginning of the on-time of the switch 6120. Additionally, f represents the switching frequency. In one embodiment, for the CCM mode of operation, the magnitude of the primary current at the beginning of the on-time of the switch 6120 is much smaller than the peak magnitude of the primary current, and the envelop for the magnitude of the primary current at the beginning of the on-time of the switch 6120 follows the envelope for the input rectified signal 2199. In another embodiment, for the CCM mode of operation, the power conversion system 2100 has power factor that is equal to or larger than 0.9 in the CC mode. For example, the high power factor and precise control of constant output current are simultaneously achieved by the power conversion system 2100.

As discussed above and further emphasized here, FIG. 21 is an example, which should not unduly limit the scope of the claims. One of ordinary skill in the art would recognize many variations, alternatives, and modifications. For example, the low-pass filter 2182 also serves as a buffer. In another example, the leading-edge blanking component 2150 is removed, and the signal 2152 is received directly from the terminal 2114. In yet another example, for DCM, $V_{cs\_0}$ is equal to zero, so the sampling-and-holding component 2162 and the voltage-to-current converter 2166 are removed if the power conversion system 2100 does not need to operate in the CCM mode for CC. In yet another example, the capacitor 2190 is moved off the chip 2110, and the low-pass filter 2182 is removed from the power conversion system 2100 so that the signal 2183 is received directly by the multiplier component 2196, as shown in FIG. 22.

FIG. 22 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 2200 includes the primary winding 6110, the secondary winding 6112, the auxiliary winding 6114, the switch 6120, the sensing resistor 6130, the equivalent resistor 6140 for the output cable, the resistors 6150 and 6152, and the rectifying diode 6160. Additionally, the system 2200 also includes the comparator 2142, the demagnetization detection component 2144, the leading-edge blanking component 2150, the flip-flop component 2154, the clock generator 2156, and the driver component 2158. Moreover, the system 2200 also includes the sampling-and-holding components 2162 and 2164, the voltage-to-current converters 2160, 2166 and 2168, the switch 2180, the multiplier component 2196, the resistors 2192 and 2194, and a capacitor 2290.

For example, the comparator 2142, the demagnetization detection component 2144, the leading-edge blanking component 2150, the flip-flop component 2154, the clock generator 2156, the driver component 2158, the sampling-and-holding components 2162 and 2164, the voltage-to-current converters 2160, 2166 and 2168, the switch 2180, and the multiplier component 2196 are located on a chip 2210, and the capacitor 2290 is located off the chip 2210. In another example, the chip 2210 includes the terminals 2112, 2114, 2116 and 2118, and a terminal 2219. In another example, the capacitor 2290 has a capacitance value that is large enough so that the signal 2183 (e.g., $V_C$) has little fluctuations (e.g., ripples), and the dedicated low pass filter 2182 is not needed.

FIG. 23 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 2300 includes a primary winding 6310, a secondary winding 6312, an auxiliary winding 6314, a switch 6320, a sensing resistor 6330, an equivalent resistor 6340 for an output cable, resistors 6350 and 6352, and a rectifying diode 6360. Additionally, the system 2300 also includes a comparator 2342, a demagnetization detection component 2344, a leading-edge blanking component 2350, a flip-flop component 2354, a pulse signal generator 2356, and a driver component 2358. Moreover, the system 2300 also includes voltage-to-current converters 2360 and 2366, a switch 2380, a low-pass filter 2382, a capacitor 2390, a multiplier component 2396, and resistors 2392 and 2394.

For example, the primary winding 6310, the secondary winding 6312, the auxiliary winding 6314, the switch 6320, the sensing resistor 6330, the equivalent resistor 6340, the resistors 6350 and 6352, and the rectifying diode 6360 are the same as the primary winding 310, the secondary winding 312, the auxiliary winding 314, the switch 320, the sensing resistor 330, the equivalent resistor 340, the resistors 350 and 352, and the rectifying diode 360, respectively. In another example, the comparator 2342, the demagnetization detection component 2344, the leading-edge blanking component 2350, the flip-flop component 2354, the pulse signal generator 2356, the driver component 2358, the voltage-to-current converters 2360 and 2366, the switch 2380, the low-pass filter 2382, the capacitor 2390, and the multiplier component 2396 are located on a chip 2310. In yet another example, the chip 2310 includes terminals 2312, 2314, 2316 and 2318.

As shown in FIG. 23, the comparator 2342 receives a control signal 2397 (e.g., $V_{ctrl}$) and a current sensing signal 2352 (e.g., $V_{cs}$) according to one embodiment. For example, in response, the comparator 2342 generates a comparison signal 2343, which is received by the flip-flop component 2354. In another example, the flip-flop component 2354 also receives a pulse signal 2355 from the pulse signal generator 2356 and generates a modulation signal 2357. In yet another example, the modulation signal 2357 is received by the driver component 2358, which in response outputs the drive signal 2359 to the switch 6320.

According to another embodiment, the switch 6320 is turned off if the current sensing signal 2352 (e.g., $V_{cs}$) becomes equal to or larger than the control signal 2397 (e.g., $V_{ctrl}$) in magnitude. For example, at the end of the on-time of the switch 6320 (e.g., at the end of $T_{on}$), the control signal 2397 (e.g., $V_{ctrl}$) is equal to the current sensing signal 2352 (e.g., $V_{cs}$). In another example, at the end of $T_{on}$, $V_{ctrl}$ is equal to $V_{cs\_p}$ with internal propagation delay of the chip 2310 omitted. In yet another example, $$V_{cs\_p} = I_{pri\_p} \times R_s \qquad \text{(Equation 61)}$$

where $V_{cs\_p}$ represents the peak magnitude of the current sensing signal 2352, and $I_{pri\_p}$ represents the peak magnitude of the primary current 6322 that flows through the primary winding 6310. Additionally, $R_s$ represents the resistance of the sensing resistor 6330.

As shown in FIG. 23, the control signal 2397 (e.g., $V_{ctrl}$) is also received by the voltage-to-current converter 2366, which in response generates a current signal 2381 according to one embodiment. For example, the current signal 2381 is represented by $I_{sink}$ and used to discharge the capacitor 2390 if the switch 2380 is closed. According to another embodiment, the switch 2380 is controlled by a Demag signal 2345. For example, if the Demag signal 2345 is at the logic high level, the switch 2380 is closed. In another example, the switch 2380 is closed during the demagnetization period and is open during the rest of the switching period. In yet another example, the sinking current 2381 discharges the capacitor 2390 during the demagnetization period (e.g., during $T_{Demag}$).

According to yet another embodiment, the Demag signal 2345 is generated by the demagnetization detection component 2344, which is also received by the pulse signal generator 2356. For example, in response to pulses of the Demag signal 2345, the pulse signal generator 2356 generates pulses of the pulse signal 2355. In another example, different pulses of the pulse signal 2355 correspond to different switching cycles.

In one embodiment, the voltage-to-current converter 2360 receives a predetermined voltage signal 2391 (e.g., $V_{ref}$), and in response generates a charging current 2361 (e.g., $I_{ref}$). For example, the charging current 2361 charges the capacitor 2390 during the switching period (e.g., during $T_s$).

In another embodiment, the signal 2383 (e.g., $V_C$) is generated by the charging current 2361 (e.g., $I_{ref}$) and the discharging current 2381 (e.g., $I_{sink}$) for the capacitor 2390.

For example, the signal 2383 (e.g., $V_C$) decreases with time during the demagnetization period (e.g., during $T_{Demag}$) at a slope of $-(I_{sink}-I_{ref})/C$, and increases with time during the rest of the switching period (e.g., during the rest of $T_s$) at a slope of $I_{ref}/C$. The negative slope indicates the signal 2383 decreases with time in magnitude, and C represents the capacitance of the capacitor 2390. In another example, over a plurality of switching periods (e.g., over one period of the signal 2393), the amplitude change of the signal 2383 during the charging phase and the amplitude change of the signal 2383 during the discharging phase are the same in order to keep the output current at a constant level in the QR mode of operation.

As shown in FIG. 23, the capacitor 2390 outputs the signal 2383 (e.g., $V_C$) to the low-pass filter 2382 according to one embodiment. For example, the signal 2383 is processed by the low-pass filter 2382 and becomes a filtered signal 2387 (e.g., $V_R$). In another example, the filtered signal 2387 is substantially the same as the expected DC signal (e.g., $V_E$) for the signal 2383 (e.g., $V_C$) in order to achieve the constant output current. In another yet example, the low-pass filter 2382 also serves as a buffer to the signal 2383.

In another embodiment, the resistor 2392 receives an input rectified signal 2393, and together with the resistor 2394, generates a signal 2395. For example, the signal 2395 is received by the multiplier component 2396 through the terminal 2318. In another example, the multiplier component 2396 also receives the signal 2387 (e.g., $V_R$) and generates the control signal 2397 based on at least information associated with the signals 2395 and 2387.

According to certain embodiments, the signal 2387 (e.g., $V_R$) is multiplied with the signal 2395 to generate the control signal 2397 as follows:

$$V_{ctrl} = \qquad\qquad\text{(Equation 62)}$$
$$\delta \times V_R \times V_{mult} = \delta \times V_R \times \frac{R_4}{R_3 + R_4} \times \left(\sqrt{2} \times V_{AC} \times |\sin\omega t|\right)$$

where $V_{ctrl}$ represents the magnitude of the control signal 2397, $V_R$ represents the magnitude of the signal 2387, and $V_{mult}$ represents the magnitude of the signal 2395. Additionally, $\delta$ represents a constant related to the multiplier component 2396, and $R_3$ and $R_4$ represent resistance values of the resistors 2392 and 2394, respectively. Moreover, $V_{AC}$ represents the magnitude of an input AC signal 2399, and $\omega$ represents the angular frequency of the input AC signal 2399.

According to some embodiments, the control signal 2397 is compared with the current sensing signal 2352. For example, if the current sensing signal 2352 reaches or exceeds the control signal 2397 in magnitude, the switch 6320 is turned off. In another example, the signal 2387 (e.g., $V_R$) is substantially constant during one or more AC periods of the input AC signal 2399; hence the envelop for the peak magnitude of the primary current that flows though the primary winding 6310 is $$I_{pri\_p}(t) = \delta \times \frac{R_4}{R_3 + R_4} \times \frac{V_{in}}{R_s} \times V_R = \qquad\text{(Equation 63)}$$
$$\delta \times \frac{R_4}{R_3 + R_4} \times \frac{\sqrt{2} \times V_{AC} \times |\sin\omega t|}{R_s} \times V_R$$

where $I_{pri\_p}(t)$ represents the envelop for the peak magnitude of the primary current that flows though the primary winding 6310.

According to certain embodiments, in the QR mode, the switching frequency is determined by $$f = \frac{1}{T_{on} + T_{Demag}} \qquad\text{(Equation 64)}$$

where $$T_{Demag} = \frac{I_{pri\_p} \times L_p}{N \times V_o} \text{ and} \qquad\text{(Equation 65)}$$

$$T_{on} = \delta \times \frac{R_4}{R_3 + R_4} \times \frac{L_p}{R_s} \times V_R \qquad\text{(Equation 66)}$$

wherein f represents the switching frequency of the power conversion system 2300. Additionally, $T_{Demag}$ represents the duration of the demagnetization process, and $T_{on}$ represents the on-time of the switch 6320. Moreover, represents the peak magnitude of the primary current that flows though the primary winding 6310, and $V_o$ represents the output voltage of the power conversion system 2300. Also, N represents the turns ratio between the primary winding 6310 and the secondary winding 6312, and $L_p$ represents the inductance of the primary winding 6310.

For example, the on-time of the switch 6320 is constant regardless of the input rectified signal 2393 (e.g., $V_{in}$). In another example, in the QR mode, the envelop for the average magnitude of the primary current that flows though the primary winding 6310 is shown below:

$$\hat{I}_{in}(t) = \frac{I_{pri\_p} \times T_{on}}{2} \times f = \delta^2 \times \left(\frac{R_4}{R_3 + R_4}\right)^2 \times \frac{V_{in}}{2R_s} \times \qquad\text{(Equation 67)}$$
$$V_R^2 \times \frac{1}{\frac{\delta \times R_4 \times V_R}{(R_3 + R_4) \times R_s} + \frac{\delta \times R_4 \times V_{in} \times V_R}{(R_3 + R_4) \times R_s \times N \times V_o}}$$

Hence $$\hat{I}_{in}(t) = \delta^2 \times \left(\frac{R_4}{R_3 + R_4}\right)^2 \times \frac{\sqrt{2} \times V_{AC} \times |\sin\omega t|}{2R_s} \times V_R^2 \times \qquad\text{(Equation 68)}$$
$$\frac{1}{\frac{\delta \times R_4 \times V_R}{(R_3 + R_4) \times R_s} + \frac{\delta \times R_4 \times \sqrt{2} \times V_{AC} \times |\sin\omega t| \times V_R}{(R_3 + R_4) \times R_s \times N \times V_o}}$$

where $\hat{I}_{in}(t)$ represents the envelop for the average magnitude of the primary current that flows though the primary winding 6310.

FIG. 24 is a simplified timing diagram for the switch-mode power conversion system 2300 with constant current control under the QR mode according to yet another embodiment of the present invention. This diagram is merely an example, which should not unduly limit the scope of the claims. One of ordinary skill in the art would recognize many variations, alternatives, and modifications.

As shown in FIG. 24, the waveform 2410 represents the envelop for the average magnitude of the primary current that flows though the primary winding 6310, and the waveform 2420 represents the envelop for the peak magnitude of the primary current that flows though the primary winding 6310. Additionally, the waveform 2430 represents the envelop for the peak magnitude of the secondary current that flows though the secondary winding 6312. Moreover, the waveform 2440 represents the drive signal 2359 as a function of time. For example, the envelop 2410 does not follow perfectly the input rectified signal 2393, but a high power factor can still be obtained. In another example, for the QR mode of operation, the power conversion system 2300 has a power factor that is equal to or larger than 0.9. In yet another example, the high power factor and precise control of constant output current are simultaneously achieved by the power conversion system 2300.

As discussed above and further emphasized here, FIGS. 23 and 24 are merely examples, which should not unduly limit the scope of the claims. One of ordinary skill in the art would recognize many variations, alternatives, and modifications. For example, the low-pass filter 2382 also serves as a buffer. In another example, the leading-edge blanking component 2350 is removed, and the signal 2352 is received directly from the terminal 2314. In yet another example, the capacitor 2390 is moved off the chip 2310, and the low-pass filter 2382 is removed from the power conversion system 2300 so that the signal 2383 is received directly by the multiplier component 2396, as shown in FIG. 25.

FIG. 25 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 2500 includes the primary winding 6310, the secondary winding 6312, the auxiliary winding 6314, the switch 6320, the sensing resistor 6330, the equivalent resistor 6340 for the output cable, the resistors 6350 and 6352, and the rectifying diode 6360. Additionally, the system 2500 also includes the comparator 2342, the demagnetization detection component 2344, the leading-edge blanking component 2350, the flip-flop component 2354, the pulse signal generator 2356, and the driver component 2358. Moreover, the system 2500 also includes the voltage-to-current converters 2360 and 2366, the switch 2380, the multiplier component 2396, the resistors 2392 and 2394, and a capacitor 2590.

For example, the comparator 2342, the demagnetization detection component 2344, the leading-edge blanking component 2350, the flip-flop component 2354, the pulse signal generator 2356, the driver component 2358, the voltage-to-current converters 2360 and 2366, the switch 2380, the multiplier component 2396, and the resistors 2392 and 2394 are located on a chip 2510, and the capacitor 2590 is located off the chip 2510. In another example, the chip 2510 includes the terminals 2312, 2314, 2316 and 2318, and a terminal 2519. In another example, the capacitor 2590 has a capacitance value that is large enough so that the signal 2383 (e.g., $V_C$) has little fluctuations (e.g., ripples), and the dedicated low pass filter 2382 is not needed.

FIG. 26 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 2600 includes a primary winding 6610, a secondary winding 6612, an auxiliary winding 6614, a switch 6620, a sensing resistor 6630, an equivalent resistor 6640 for an output cable, resistors 6650 and 6652, and a rectifying diode 6660. Additionally, the system 2600 also includes a comparator 2642, a demagnetization detection component 2644, a leading-edge blanking component 2650, a flip-flop component 2654, a pulse signal generator 2656, and a driver component 2658. Moreover, the system 2600 also includes a sampling-and-holding component 2662, voltage-to-current converters 2660 and 2666, a switch 2680, a low-pass filter 2682, a capacitor 2690, a multiplier component 2696, and resistors 2692 and 2694.

For example, the primary winding 6610, the secondary winding 6612, the auxiliary winding 6614, the switch 6620, the sensing resistor 6630, the equivalent resistor 6640, the resistors 6650 and 6652, and the rectifying diode 6660 are the same as the primary winding 310, the secondary winding 312, the auxiliary winding 314, the switch 320, the sensing resistor 330, the equivalent resistor 340, the resistors 350 and 352, and the rectifying diode 360, respectively. In another example, the comparator 2642, the demagnetization detection component 2644, the leading-edge blanking component 2650, the flip-flop component 2654, the pulse signal generator 2656, the driver component 2658, the sampling-and-holding component 2662, the voltage-to-current converters 2660 and 2666, the switch 2680, the low-pass filter 2682, the capacitor 2690, the multiplier component 2696, and the resistors 2692 and 2694 are located on a chip 2610. In yet another example, the chip 2610 includes terminals 2612, 2614, 2616 and 2618.

FIG. 27 is a simplified timing diagram for the switch-mode power conversion system 2600 with constant current control under the QR mode according to yet another embodiment of the present invention. This diagram is merely an example, which should not unduly limit the scope of the claims. One of ordinary skill in the art would recognize many variations, alternatives, and modifications.

As shown in FIG. 27, the waveform 2710 represents a feedback signal 6654 (e.g., $V_{FB}$) as a function of time, the waveform 2720 represents a secondary current (that flows through the secondary winding 6612) as a function of time, and the waveform 2730 represents a current sensing signal 2652 (e.g., $V_{cs}$) as a function of time. Additionally, the waveform 2750 represents a drive signal 2659 as a function of time, and the waveform 2780 represents a signal 2683 (e.g., $V_C$) as a function of time. Moreover, the waveform 2790 represents a signal 2663 (e.g., $V_S$) as a function of time, and the waveform 2794 represents a signal 2687 (e.g., $V_R$) as a function of time.

As shown in FIGS. 26 and 27, the comparator 2642 receives a control signal 2697 (e.g., $V_{ctrl}$) and a current sensing signal 2652 (e.g., $V_{cs}$ corresponding to the waveform 2730) according to one embodiment. For example, in response, the comparator 2642 generates a comparison signal 2643, which is received by the flip-flop component 2654. In another example, the flip-flop component 2654 also receives a pulse signal 2655 from the pulse signal generator 2656 and generates a modulation signal 2657. In yet another example, the modulation signal 2657 is received by the driver component 2658, which in response outputs the drive signal 2659 to the switch 6620 and the sampling-and-holding component 2662.

According to another embodiment, the sampling-and-holding component 2662 receives at least the drive signal 2659 (corresponding to the waveform 2750), which includes, for each switching cycle, a pulse that has a width corresponding to the on-time of the switch 6620 (e.g., $T_{ON}$). For example, during the pulse of the drive signal 2659, the current sensing signal 2652 (e.g., $V_{cs}$ corresponding to the waveform 2730) is sampled and held as the voltage signal 2663 (e.g., $V_s$ corresponding to the waveform 2790). In another example, after the falling edge of the pulse, the voltage signal 2663 remains constant (e.g., being equal to $V_{cs\_p}$) until the next pulse of the drive signal 2659.

As shown in FIG. 26, the voltage signal 2663 is received by the voltage-to-current converter 2666, which in response generates a current signal 2681 according to one embodiment. For example, the current signal 2681 is represented by $I_{sink}$ and used to discharge the capacitor 2690 if the switch 2680 is closed. According to yet another embodiment, the switch 2680 is controlled by a Demag signal 2645. For example, if the Demag signal 2645 is at the logic high level, the switch 2680 is closed. In another example, the switch 2680 is closed during the demagnetization period and is open during the rest of the switching period. In yet another example, the sinking current 2681 discharges the capacitor 2690 during the demagnetization period (e.g., during $T_{Demag}$).

According to yet another embodiment, the Demag signal 2645 is generated by the demagnetization detection component 2644, which is also received by the pulse signal generator 2656. For example, in response to pulses of the Demag signal 2645, the pulse signal generator 2656 generates pulses of the pulse signal 2655. In another example, different pulses of the pulse signal 2655 correspond to different switching cycles.

In one embodiment, the voltage-to-current converter 2660 receives a predetermined voltage signal 2691 (e.g., $V_{ref}$), and in response generates a charging current 2661 (e.g., $T_{ref}$). For example, the charging current 2661 charges the capacitor 2690 during the switching period (e.g., during $T_s$).

In another embodiment, the signal 2683 (e.g., $V_C$ corresponding to the waveform 2780) is generated by the charging current 2661 (e.g., $T_{ref}$) and the discharging current 2681 (e.g., $I_{sink}$) for the capacitor 2690. For example, the signal 2683 (e.g., $V_C$ corresponding to the waveform 2780) decreases with time during the demagnetization period (e.g., during $T_{Demag}$) at a slope of $-(I_{sink}-I_{ref})/C$, and increases with time during the rest of the switching period (e.g., during the rest of $T_s$) at a slope of $I_{ref}/C$. The negative slope indicates the signal 2683 decreases with time in magnitude, and C represents the capacitance of the capacitor 2690. In another example, over a plurality of switching periods (e.g., over one period of the signal 2693), the amplitude change of the signal 2683 during the charging phase and the amplitude change of the signal 2683 during the discharging phase are the same in order to keep the output current at a constant level in the QR mode of operation.

As shown in FIG. 26, the capacitor 2690 outputs the signal 2683 (e.g., $V_C$ corresponding to the waveform 2780) to the low-pass filter 2682 according to one embodiment. For example, the signal 2683 is processed by the low-pass filter 2682 and becomes a filtered signal 2687 (e.g., $V_R$). In another example, the filtered signal 2687 is substantially the same as the expected DC signal (e.g., $V_E$) for the signal 2683 (e.g., $V_C$) in order to achieve the constant output current. In another yet example, the low-pass filter 2682 also serves as a buffer to the signal 2683.

In another embodiment, the resistor 2692 receives an input rectified signal 2693, and together with the resistor 2694, generates a signal 2695. For example, the signal 2695 is received by the multiplier component 2696 through the terminal 2618. In another example, the multiplier component 2696 also receives the signal 2687 (e.g., $V_R$) and generates the control signal 2697 based on at least information associated with the signals 2695 and 2687.

According to some embodiments, the power conversion system 2600 significantly reduces the effect of internal propagation delay of the controller on the regulation accuracy of the output current, in comparison with the power conversion systems 2300 and 2500. According to certain embodiments, for the QR mode, the power conversion system 2600 has a power factor that is equal to or larger than 0.9. For example, the high power factor and precise control of constant output current are simultaneously achieved by the power conversion system 2600.

As discussed above and further emphasized here, FIGS. 26 and 27 are merely examples, which should not unduly limit the scope of the claims. One of ordinary skill in the art would recognize many variations, alternatives, and modifications. For example, the low-pass filter 2682 also serves as a buffer. In another example, the leading-edge blanking component 2650 is removed, and the signal 2652 is received directly from the terminal 2614. In yet another example, the capacitor 2690 is moved off the chip 2610, and the low-pass filter 2682 is removed from the power conversion system 2600 so that the signal 2683 is received directly by the multiplier component 2696, as shown in FIG. 28.

FIG. 28 is a simplified diagram for a switch-mode power conversion system with primary-side sensing and regulation according to yet another embodiment of the present invention. This diagram is merely an example, which should not unduly limit the scope of the claims. One of ordinary skill in the art would recognize many variations, alternatives, and modifications. The power conversion system 2800 includes the primary winding 6610, the secondary winding 6612, the auxiliary winding 6614, the switch 6620, the sensing resistor 6630, the equivalent resistor 6640 for the output cable, the resistors 6650 and 6652, and the rectifying diode 6660. Additionally, the system 2800 also includes the comparator 2642, the demagnetization detection component 2644, the leading-edge blanking component 2650, the flip-flop component 2654, the pulse signal generator 2656, and the driver component 2658. Moreover, the system 2800 also includes the sampling-and-holding component 2662, the voltage-to-current converters 2660 and 2666, the switch 2680, the multiplier component 2696, the resistors 2692 and 2694, and a capacitor 2890.

For example, the comparator 2642, the demagnetization detection component 2644, the leading-edge blanking component 2650, the flip-flop component 2654, the pulse signal generator 2656, the driver component 2658, the sampling-and-holding component 2662, the voltage-to-current converters 2660 and 2666, the switch 2680, the multiplier component 2696, and the resistors 2692 and 2694 are located on a chip 2810, and the capacitor 2890 is located off the chip 2810. In another example, the chip 2810 includes the terminals 2612, 2614, 2616 and 2618, and a terminal 2819. In another example, the capacitor 2890 has a capacitance value that is large enough so that the signal 2683 (e.g., $V_C$) has little fluctuations (e.g., ripples), and the dedicated low pass filter 2682 is not needed.

According to another embodiment, a system (e.g., as implemented according to FIG. 6) for regulating a power converter includes a first signal processing component (e.g., the component 620) configured to receive at least a sensed signal (e.g., the signal 652) and generate a first signal (e.g., the signal 621). The sensed signal is associated with a primary current flowing through a primary winding coupled to a secondary winding for a power converter. Additionally, the system includes a second signal processing component (e.g., the component 622) configured to generate a second signal (e.g., the signal 623), an integrator component (e.g., the components 630 and 640) configured to receive the first signal and the second signal and generate a third signal (e.g., the signal 631), and a comparator (e.g., the component 642) configured to process information associated with the third signal and the sensed signal and generate a comparison signal (e.g., the signal 643) based on at least information associated with the third signal and the sensed signal. Moreover, the system includes a signal generator (e.g., the component 654) configured to receive at least the comparison signal and generate a modulation signal (e.g., the signal 657), and a gate driver (e.g., the component 658) configured to receive the modulation signal and output a drive signal (e.g., the signal 659) to a switch. The switch is configured to affect the primary current flowing through the primary winding. The drive signal is associated with at least one or more switching periods, and each of the one or more switching periods (e.g., $T_s$) includes at least an on-time period (e.g., $T_{on}$) for the switch and a demagnetization period (e.g., $T_{Demag}$) for a demagnetization process. For each of the one or more switching periods, the first signal (e.g., the signal 621) represents the demagnetization period (e.g., $T_{Demag}$) multiplied by a sum of a first current magnitude and a second current magnitude, and the second signal represents the switching period (e.g., $T_s$) multiplied by a predetermined current magnitude. The first current magnitude represents the primary current at the beginning of the on-time period (e.g., $T_{on}$), and the second current magnitude represents the primary current at the end of the on-time period (e.g., $T_{on}$). The integrator component (e.g., the components 630 and 640) is further configured to integrate period-by-period differences between the first signal and the second signal for a plurality of switching periods, and the third signal represents the integrated period-by-period differences. The integrated period-by-period differences are smaller than a predetermined threshold in magnitude (e.g., as shown by Equation 24 and/or Equation 27).

According to yet another embodiment, a method (e.g., as implemented according to FIG. 6) for regulating a power converter includes receiving at least a sensed signal (e.g., the signal 652). The sensed signal is associated with a primary current flowing through a primary winding coupled to a secondary winding for a power converter. Additionally, the method includes processing information associated with the sensed signal, generating a first signal (e.g., the signal 621) based on at least information associated with the sensed signal, and generating a second signal (e.g., the signal 623). Moreover, the method includes receiving the first signal and the second signal, processing information associated with the first signal and the second signal, generating a third signal (e.g., the signal 631) based on at least information associated with the first signal and the second signal, processing information associated with the third signal and the sensed signal, and generating a comparison signal (e.g., the signal 643) based on at least information associated with the third signal and the sensed signal. Also, the method includes receiving at least the comparison signal, generating a modulation signal (e.g., the signal 657) based on at least information associated with the comparison signal, receiving the modulation signal, and outputting a drive signal (e.g., the signal 659) based on at least information associated with the modulation signal to affect the primary current flowing through the primary winding. The drive signal is associated with at least one or more switching periods, and each of the one or more switching periods (e.g., $T_s$) includes at least an on-time period (e.g., $T_{on}$) and a demagnetization period (e.g., $T_{Demag}$). For each of the one or more switching periods, the first signal (e.g., the signal 621) represents the demagnetization period (e.g., $T_{Demag}$) multiplied by a sum of a first current magnitude and a second current magnitude, and the second signal represents the switching period (e.g., $T_s$) multiplied by a predetermined current magnitude. The first current magnitude represents the primary current at the beginning of the on-time period (e.g., $T_{on}$), and the second current magnitude represents the primary current at the end of the on-time period (e.g., $T_{on}$). The process for processing information associated with the first signal and the second signal includes integrating period-by-period differences between the first signal and the second signal for a plurality of switching periods, and the third signal represents the integrated period-by-period differences. The integrated period-by-period differences are smaller than a predetermined threshold in magnitude (e.g., as shown by Equation 24 and/or Equation 27).

According to yet another embodiment, a system (e.g., as implemented according to FIG. 7 and/or FIG. 9) for regulating a power converter includes a first sampling-and-holding and voltage-to-current-conversion component (e.g., the components 762 and 766) configured to receive at least a sensed signal (e.g., the signal 752) and generate a first current signal (e.g., $I_{s1}$). The sensed signal is associated with a primary current flowing through a primary winding coupled to a secondary winding for a power converter. Additionally, the system includes a second sampling-and-holding and voltage-to-current-conversion component (e.g., the components 764 and 768) configured to receive at least the sensed signal (e.g., the signal 752) and generate a second current signal (e.g., $I_{s2}$), a current-signal generator (e.g., the component 760) configured to generate a third current signal (e.g., the signal 761), and a capacitor (e.g., the component 790 and/or the component 990) coupled to the current-signal generator (e.g., the component 760) and coupled, through a switch (e.g., the component 780), to the first sampling-and-holding and voltage-to-current-conversion component and the second sampling-and-holding and voltage-to-current-conversion component. The capacitor is configured to generate a voltage signal (e.g., the signal 783). Moreover, the system includes a comparator (e.g., the component 742) configured to process information associated with the voltage signal (e.g., the signal 783) and the sensed signal (e.g., the signal 752) and generate a comparison signal (e.g., the signal 743) based on at least information associated with the voltage signal and the sensed signal. Also, the system includes a modulation-signal generator (e.g., the component 754) configured to receive at least the comparison signal and generate a modulation signal (e.g., the signal 757), and a gate driver (e.g., the component 758) configured to receive the modulation signal and output a drive signal (e.g., the signal 759) to a switch. The switch is configured to affect the primary current flowing through the primary winding. The drive signal is associated with at least one or more switching periods, and each of the one or more switching periods (e.g., $T_s$) includes at least an on-time period (e.g., $T_{on}$) for the switch and a demagnetization period (e.g., $T_{Demag}$) for a demagnetization process. The first current signal represents the primary current at the beginning of the on-time period (e.g., $T_{on}$), and the second current signal represents the primary current at the end of the on-time period (e.g., $T_{on}$). For each of the one or more switching periods, the first current signal and the second current signal discharge or charge the capacitor during only the demagnetization period (e.g., $T_{Demag}$), the third current signal charges or discharges the capacitor during the switching period (e.g., $T_s$), and the switching period (e.g., $T_s$) multiplied by the third current signal is equal to the demagnetization period (e.g., $T_{Demag}$) multiplied by a sum of the first current signal and the second current signal in magnitude.

According to yet another embodiment, a method (e.g., as implemented according to FIG. 7 and/or FIG. 9) for regulating a power converter includes receiving at least a sensed signal (e.g., the signal 752). The sensed signal is associated with a primary current flowing through a primary winding coupled to a secondary winding for a power converter. Additionally, the method includes processing information associated with the sensed signal, generating a first current signal (e.g., $I_{s1}$) and a second current signal (e.g., $I_{s2}$) based on at least information associated with the sensed signal, generating a third current signal (e.g., the signal 761), and processing information associated with the first current signal, the second current signal and the third current signal. Moreover, the method includes generating a voltage signal (e.g., the signal 783), by at least a capacitor, based on at least information associated with the first current signal, the second current signal and the third current signal, processing information associated with the voltage signal (e.g., the signal 783) and the sensed signal (e.g., the signal 752), and generating a comparison signal (e.g., the signal 743) based on at least information associated with the voltage signal and the sensed signal. Also, the method includes receiving at least the comparison signal, generating a modulation signal (e.g., the signal 757) based on at least information associated with the comparison signal, receiving the modulation signal, and outputting a drive signal (e.g., the signal 759) based on at least information associated with the modulation signal to affect the primary current flowing through the primary winding. The drive signal is associated with at least one or more switching periods, and each of the one or more switching periods (e.g., $T_s$) includes at least an on-time period (e.g., $T_{on}$) and a demagnetization period (e.g., $T_{Demag}$). The first current signal represents the primary current at the beginning of the on-time period (e.g., $T_{on}$), and the second current signal represents the primary current at the end of the on-time period (e.g., $T_{on}$). For each of the one or more switching periods, the process for processing information associated with the first current signal, the second current signal and the third current signal includes discharging or charging the capacitor with the first current signal and the second current signal during only the demagnetization period (e.g., $T_{Demag}$), and charging or discharging the capacitor with the third current signal during the switching period (e.g., $T_s$). The switching period (e.g., $T_s$) multiplied by the third current signal is equal to the demagnetization period (e.g., $T_{Demag}$) multiplied by a sum of the first current signal and the second current signal in magnitude.

According to yet another embodiment, a system (e.g., as implemented according to FIG. 11 and/or FIG. 13) for regulating a power converter includes a voltage-to-current-conversion component (e.g., the component 1166) configured to generate a first current signal (e.g., the signal 1181), a current-signal generator (e.g., the component 1160) configured to generate a second current signal (e.g., the signal 1161), and a capacitor (e.g., the component 1190 and/or the component 1390) coupled to the current-signal generator (e.g., the component 1160) and coupled, through a switch (e.g., the component 1180), to the voltage-to-current-conversion component. The capacitor is configured to generate a voltage signal (e.g., the signal 1183). Additionally, the system includes a comparator (e.g., the component 1142) configured to process information associated with the voltage signal (e.g., the signal 1183) and a sensed signal (e.g., the signal 1152) and generate a comparison signal (e.g., the signal 1143) based on at least information associated with the voltage signal and the sensed signal. The sensed signal is associated with a primary current flowing through a primary winding coupled to a secondary winding for a power converter. Moreover, the system includes a modulation-signal generator (e.g., the component 1154) configured to receive at least the comparison signal and generate a modulation signal (e.g., the signal 1157), and a gate driver (e.g., the component 1158) configured to receive the modulation signal and output a drive signal (e.g., the signal 1159) to a switch. The switch is configured to affect the primary current flowing through the primary winding. The voltage-to-current-conversion component (e.g., the component 1166) is further configured to process information associated with the voltage signal (e.g., the signal 1183) and generate the first current signal (e.g., the signal 1181) based on at least information associated with the voltage signal. The drive signal is associated with at least one or more switching periods, and each of the one or more switching periods (e.g., $T_s$) includes at least an on-time period (e.g., $T_{on}$) for the switch and a demagnetization period (e.g., $T_{Demag}$) for a demagnetization process. The first current signal represents the primary current at the end of the on-time period (e.g., $T_{on}$). For each of the one or more switching periods, the first current signal discharges or charges the capacitor during only the demagnetization period (e.g., $T_{Demag}$), the second current signal charges or discharges the capacitor during the switching period (e.g., $T_s$), and the switching period (e.g., $T_s$) multiplied by the second current signal is equal to the demagnetization period (e.g., $T_{Demag}$) multiplied by the first current signal in magnitude.

According to yet another embodiment, a method (e.g., as implemented according to FIG. 11 and/or FIG. 13) for regulating a power converter includes generating a first current signal (e.g., the signal 1181) and a second current signal (e.g., the signal 1161), processing information associated with the first current signal and the second current signal, generating a voltage signal (e.g., the signal 1183), by at least a capacitor, based on at least information associated with the first current signal and the second current signal, and processing information associated with the voltage signal (e.g., the signal 1183) and a sensed signal (e.g., the signal 1152). The sensed signal is associated with a primary current flowing through a primary winding coupled to a secondary winding for a power converter. Additionally, the method includes generating a comparison signal (e.g., the signal 1143) based on at least information associated with the voltage signal and the sensed signal, receiving at least the comparison signal, and generating a modulation signal (e.g., the signal 1157) based on at least information associated with the comparison signal. Moreover, the method includes receiving the modulation signal, and outputting a drive signal (e.g., the signal 1159) based on at least information associated with the modulation signal to affect the primary current flowing through the primary winding. The process for generating a first current signal (e.g., the signal 1181) and a second current signal (e.g., the signal 1161) includes processing information associated with the voltage signal (e.g., the signal 1183) and generating the first current signal (e.g., the signal 1181) based on at least information associated with the voltage signal. The drive signal is associated with at least one or more switching periods, each of the one or more switching periods (e.g., $T_s$) includes at least an on-time period (e.g., $T_{on}$) and a demagnetization period (e.g., $T_{Demag}$), and the first current signal represents the primary current at the end of the on-time period (e.g., $T_{on}$). For each of the one or more switching periods, the process for processing information associated with the first current signal and the second current signal includes discharging or charging the capacitor with the first current signal during only the demagnetization period (e.g., $T_{Demag}$), and charging or discharging the capacitor with the second current signal during the switching period (e.g.; $T_s$). The switching period (e.g., $T_s$) multiplied by the second current signal is equal to the demagnetization period (e.g., $T_{Demag}$) multiplied by the first current signal in magnitude.

According to yet another embodiment, a system (e.g., as implemented according to FIG. 15) for regulating a power converter includes a sampling-and-holding and voltage-to-current-conversion component (e.g., the components 1562 and 1566) configured to receive at least a sensed signal (e.g., the signal 1552) and generate a first current signal (e.g., the signal 1581). The sensed signal is associated with a primary current flowing through a primary winding coupled to a secondary winding for a power converter. Additionally, the system includes a current-signal generator (e.g., the component 1560) configured to generate a second current signal (e.g., the signal 1561), and a capacitor (e.g., the component 1590) coupled to the current-signal generator (e.g., the component 1560) and coupled, through a switch (e.g., the component 1580), to the sampling-and-holding and voltage-to-current-conversion component. The capacitor is configured to generate a voltage signal (e.g., the signal 1583). Moreover, the system includes a comparator (e.g., the component 1542) configured to process information associated with the voltage signal (e.g., the signal 1583) and the sensed signal (e.g., the signal 1552) and generate a comparison signal (e.g., the signal 1543) based on at least information associated with the voltage signal and the sensed signal. Also, the system includes a modulation-signal generator (e.g., the component 1554) configured to receive at least the comparison signal and generate a modulation signal (e.g., the signal 1557), and a gate driver (e.g., the component 1558) configured to receive the modulation signal and output a drive signal (e.g., the signal 1559) to a switch. The switch is configured to affect the primary current flowing through the primary winding. The drive signal is associated with at least one or more switching periods, each of the one or more switching periods (e.g., $T_s$) includes at least an on-time period (e.g., $T_{on}$) for the switch and a demagnetization period (e.g., $T_{Demag}$) for a demagnetization process, and the first current signal represents the primary current at the end of the on-time period (e.g., $T_{on}$). For each of the one or more switching periods, the first current signal discharges or charges the capacitor during only the demagnetization period (e.g., $T_{Demag}$), and the second current signal charges or discharges the capacitor during the switching period (e.g., $T_s$). The switching period (e.g., $T_s$) multiplied by the second current signal is equal to the demagnetization period (e.g., $T_{Demag}$) multiplied by the first current signal in magnitude.

According to yet another embodiment, a method (e.g., as implemented according to FIG. 15) for regulating a power converter includes receiving at least a sensed signal (e.g., the signal 1552). The sensed signal is associated with a primary current flowing through a primary winding coupled to a secondary winding for a power converter. Additionally, the method includes processing information associated with the sensed signal, generating a first current signal (e.g., the signal 1581) based on at least information associated with the sensed signal, and generating a second current signal (e.g., the signal 1561). Moreover, the method includes processing information associated with the first current signal and the second current signal, generating a voltage signal (e.g., the signal 1583), by at least a capacitor, based on at least information associated with the first current signal and the second current signal, processing information associated with the voltage signal (e.g., the signal 1583) and the sensed signal (e.g., the signal 1552), and generating a comparison signal (e.g., the signal 1543) based on at least information associated with the voltage signal and the sensed signal. Also, the method includes receiving at least the comparison signal, generating a modulation signal (e.g., the signal 1557) based on at least information associated with the comparison signal, receiving the modulation signal, and outputting a drive signal (e.g., the signal 1559) based on at least information associated with the modulation signal to affect the primary current flowing through the primary winding. The drive signal is associated with at least one or more switching periods, each of the one or more switching periods (e.g., $T_s$) includes at least an on-time period (e.g., $T_{on}$) and a demagnetization period (e.g., $T_{Demag}$), and the first current signal represents the primary current at the end of the on-time period (e.g., $T_{on}$). For each of the one or more switching periods, the process for processing information associated with the first current signal and the second current signal includes discharging or charging the capacitor with the first current signal during only the demagnetization period (e.g., $T_{Demag}$), and charging or discharging the capacitor with the second current signal during the switching period (e.g., $T_s$). The switching period (e.g., $T_s$) multiplied by the second current signal is equal to the demagnetization period (e.g., $T_{Demag}$) multiplied by the first current signal in magnitude.

According to yet another embodiment, a system (e.g., as implemented according to FIG. 17 and/or FIG. 19) for regulating a power converter includes a first sampling-and-holding and voltage-to-current-conversion component (e.g., the components 1762 and 1766) configured to receive at least a sensed signal (e.g., the signal 1752) and generate a first current signal (e.g., $I_{s1}$). The sensed signal is associated with a primary current flowing through a primary winding coupled to a secondary winding for a power converter. Additionally, the system includes a second sampling-and-holding and voltage-to-current-conversion component (e.g., the components 1764 and 1768) configured to receive at least the sensed signal (e.g., the signal 1752) and generate a second current signal (e.g., $I_{s2}$), a current-signal generator (e.g., the component 1760) configured to generate a third current signal (e.g., the signal 1761), and a capacitor (e.g., the component 1790 and/or the component 1990) coupled to the current-signal generator (e.g., the component 1760) and coupled, through a switch (e.g., the component 1780), to the first sampling-and-holding and voltage-to-current-conversion component and the second sampling-and-holding and voltage-to-current-conversion component. The capacitor is configured to generate a voltage signal (e.g., the signal 1783). Moreover, the system includes a comparator (e.g., the component 1742) configured to process information associated with the voltage signal (e.g., the signal 1783) and a ramping signal (e.g., the signal 1793) and generate a comparison signal (e.g., the signal 1743) based on at least information associated with the voltage signal and the ramping signal, a modulation-signal generator (e.g., the component 1754) configured to receive at least the comparison signal and generate a modulation signal (e.g., the signal 1757), and a gate driver (e.g., the component 1758) configured to receive the modulation signal and output a drive signal (e.g., the signal 1759) to a switch, the switch being configured to affect the primary current flowing through the primary winding. The drive signal is associated with at least a plurality of switching periods, and each of the plurality of switching periods (e.g., $T_s$) includes at least an on-time period (e.g., $T_{on}$) for the switch and a demagnetization period (e.g., $T_{Demag}$) for a demagnetization process. The first current signal represents the primary current at the beginning of the on-time period (e.g., $T_{on}$), and the second current signal represents the primary current at the end of the on-time period (e.g., $T_{on}$). For each of the plurality of switching periods, the first current signal and the second current signal discharge or charge the capacitor during only the demagnetization period (e.g., $T_{Demag}$), and the third current signal charges or discharges the capacitor during the switching period (e.g., $T_s$). Over the plurality of switching periods, accumulatively, the switching period (e.g., $T_s$) multiplied by the third current signal is equal to the demagnetization period (e.g., $T_{Demag}$) multiplied by a sum of the first current signal and the second current signal in magnitude.

According to yet another embodiment, a method (e.g., as implemented according to FIG. 17 and/or FIG. 19) for regulating a power converter includes receiving at least a sensed signal (e.g., the signal 1752). The sensed signal is associated with a primary current flowing through a primary winding coupled to a secondary winding for a power converter. Additionally, the method includes processing information associated with the sensed signal, generating a first current signal (e.g., $I_{s1}$) and a second current signal (e.g., $I_{s2}$)

based on at least information associated with the sensed signal, and generating a third current signal (e.g., the signal 1761). Moreover, the method includes processing information associated with the first current signal, the second current signal and the third current signal, generating a voltage signal (e.g., the signal 1783), by at least a capacitor, based on at least information associated with the first current signal, the second current signal and the third current signal, processing information associated with the voltage signal (e.g., the signal 1783) and a ramping signal (e.g., the signal 1793), and generating a comparison signal (e.g., the signal 1743) based on at least information associated with the voltage signal and the ramping signal. Also, the method includes receiving at least the comparison signal, generating a modulation signal (e.g., the signal 1757) based on at least information associated with the comparison signal, receiving the modulation signal, and outputting a drive signal (e.g., the signal 1759) based on at least information associated with the modulation signal to affect the primary current flowing through the primary winding. The drive signal is associated with at least a plurality of switching periods, and each of the plurality of switching periods (e.g., $T_s$) includes at least an on-time period (e.g., $T_{on}$), a demagnetization period (e.g., $T_{Demag}$). The first current signal represents the primary current at the beginning of the on-time period (e.g., $T_{on}$), and the second current signal represents the primary current at the end of the on-time period (e.g., $T_{on}$). For each of the plurality of switching periods, the process for processing information associated with the first current signal, the second current signal and the third current signal includes discharging or charging the capacitor with the first current signal and the second current signal during only the demagnetization period (e.g., $T_{Demag}$), and charging or discharging the capacitor with the third current signal during the switching period (e.g., $T_s$). Over the plurality of switching periods, accumulatively, the switching period (e.g., $T_s$) multiplied by the third current signal is equal to the demagnetization period (e.g., $T_{Demag}$) multiplied by a sum of the first current signal and the second current signal in magnitude.

According to yet another embodiment, a system (e.g., as implemented according to FIG. 21 and/or FIG. 22) for regulating a power converter includes a first sampling-and-holding and voltage-to-current-conversion component (e.g., the components 2162 and 2166) configured to receive at least a sensed signal (e.g., the signal 2152) and generate a first current signal (e.g., $I_{s1}$). The sensed signal is associated with a primary current flowing through a primary winding coupled to a secondary winding for a power converter. Additionally, the system includes a second sampling-and-holding and voltage-to-current-conversion component (e.g., the components 2164 and 2168) configured to receive at least the sensed signal (e.g., the signal 2152) and generate a second current signal (e.g., $I_{s2}$), a current-signal generator (e.g., the component 2160) configured to generate a third current signal (e.g., the signal 2161), and a capacitor (e.g., the component 2190 and/or the component 2290) coupled to the current-signal generator (e.g., the component 2160) and coupled, through a switch (e.g., the component 2180), to the first sampling-and-holding and voltage-to-current-conversion component and the second sampling-and-holding and voltage-to-current-conversion component. The capacitor is configured to generate a voltage signal (e.g., the signal 2183). Moreover, the system includes a multiplier component (e.g., the component 2196) configured to process information associated with the voltage signal (e.g., the signal 2183) and an input signal (e.g., the signal 2193) and generate a multiplication signal (e.g., the signal 2197) based on at least information associated with the voltage signal and the input signal. The input signal is related to the primary winding. Also, the system includes a comparator (e.g., the component 2142) configured to receive the multiplication signal (e.g., the signal 2197) and the sensed signal (e.g., the signal 2152) and generate a comparison signal (e.g., the signal 2143) based on at least information associated with the multiplication signal and the sensed signal, a modulation-signal generator (e.g., the component 2154) configured to receive at least the comparison signal and generate a modulation signal (e.g., the signal 2157), and a gate driver (e.g., the component 2158) configured to receive the modulation signal and output a drive signal (e.g., the signal 2159) to a switch. The switch is configured to affect the primary current flowing through the primary winding. The drive signal is associated with at least a plurality of switching periods, and each of the plurality of switching periods (e.g., $T_s$) includes at least an on-time period (e.g., $T_{on}$) for the switch and a demagnetization period (e.g., $T_{Demag}$) for a demagnetization process. The first current signal represents the primary current at the beginning of the on-time period (e.g., $T_{on}$), and the second current signal represents the primary current at the end of the on-time period (e.g., $T_{on}$). For each of the plurality of switching periods, the first current signal and the second current signal discharge or charge the capacitor during only the demagnetization period (e.g., $T_{Demag}$), and the third current signal charges or discharges the capacitor during the switching period (e.g., $T_s$). Over the plurality of switching periods, accumulatively, the switching period (e.g., $T_s$) multiplied by the third current signal is equal to the demagnetization period (e.g., $T_{Demag}$) multiplied by a sum of the first current signal and the second current signal in magnitude.

According to yet another embodiment, a method (e.g., as implemented according to FIG. 21 and/or FIG. 22) for regulating a power converter includes receiving at least a sensed signal (e.g., the signal 2152). The sensed signal is associated with a primary current flowing through a primary winding coupled to a secondary winding for a power converter. Additionally, the method includes processing information associated with the sensed signal, generating a first current signal (e.g., $I_{s1}$) and a second current signal (e.g., $I_{s2}$) based on at least information associated with the sensed signal, generating a third current signal (e.g., the signal 2161), and processing information associated with the first current signal, the second current signal and the third current signal. Moreover, the method includes generating a voltage signal (e.g., the signal 2183), by at least a capacitor, based on at least information associated with the first current signal, the second current signal and the third current signal, and processing information associated with the voltage signal (e.g., the signal 2183) and an input signal (e.g., the signal 2193). The input signal is related to the primary winding. Also, the method includes generating a multiplication signal (e.g., the signal 2197) based on at least information associated with the voltage signal and the input signal, receiving the multiplication signal and the sensed signal (e.g., the signal 2152), and generating a comparison signal (e.g., the signal 2143) based on at least information associated with the multiplication signal and the sensed signal. Additionally, the method includes receiving at least the comparison signal, generating a modulation signal (e.g., the signal 2157) based on at least information associated with the comparison signal, receiving the modulation signal, and outputting a drive signal (e.g., the signal 2159) based on at least information associated with the modulation signal to affect the primary current flowing through the primary winding. The drive signal is associated with at least a plurality of switching periods, and each of the plurality of switching periods (e.g., $T_s$) includes at least an on-time period (e.g., $T_{on}$) and a demagnetization period (e.g., $T_{Demag}$). The first current signal represents the primary current at the beginning of the on-time period (e.g., $T_{on}$), and the second current signal represents the primary current at the end of the on-time period (e.g., $T_{on}$). For each of the plurality of switching periods, the process for processing information associated with the first current signal, the second current signal and the third current signal includes discharging or charging the capacitor with the first current signal and the second current signal during only the demagnetization period (e.g., $T_{Demag}$), and charging or discharging the capacitor with the third current signal during the switching period (e.g., $T_s$). Over the plurality of switching periods, accumulatively, the switching period (e.g., $T_s$) multiplied by the third current signal is equal to the demagnetization period (e.g., $T_{Demag}$) multiplied by a sum of the first current signal and the second current signal in magnitude.

According to yet another embodiment, a system (e.g., as implemented according to FIG. 23 and/or FIG. 25) for regulating a power converter includes a voltage-to-current-conversion component (e.g., the component 2366) configured to generate a first current signal (e.g., the signal 2381), a current-signal generator (e.g., the component 2360) configured to generate a second current signal (e.g., the signal 2361), and a capacitor (e.g., the component 2390 and/or the component 2590) coupled to the current-signal generator (e.g., the component 2360) and coupled, through a switch (e.g., the component 2380), to the voltage-to-current-conversion component. The capacitor is configured to generate a voltage signal (e.g., the signal 2383). Additionally, the system includes a multiplier component (e.g., the component 2396) configured to process information associated with the voltage signal (e.g., the signal 2383) and an input signal (e.g., the signal 2393) and generate a multiplication signal (e.g., the signal 2397) based on at least information associated with the voltage signal and the input signal. The input signal is related to the primary winding. Moreover, the system includes a comparator (e.g., the component 2342) configured to receive the multiplication signal (e.g., the signal 2397) and the sensed signal (e.g., the signal 2352) and generate a comparison signal (e.g., the signal 2343) based on at least information associated with the multiplication signal and the sensed signal, a modulation-signal generator (e.g., the component 2354) configured to receive at least the comparison signal and generate a modulation signal (e.g., the signal 2357), and a gate driver (e.g., the component 2358) configured to receive the modulation signal and output a drive signal (e.g., the signal 2359) to a switch. The switch is configured to affect the primary current flowing through the primary winding. The voltage-to-current-conversion component (e.g., the component 2366) is further configured to process information associated with the multiplication signal (e.g., the signal 2397) and generate the first current signal (e.g., the signal 2381) based on at least information associated with the multiplication signal. The drive signal is associated with at least a plurality of switching periods, each of the plurality of switching periods (e.g., $T_s$) includes at least an on-time period (e.g., $T_{on}$) for the switch and a demagnetization period (e.g., $T_{Demag}$) for a demagnetization process, and the first current signal represents the primary current at the end of the on-time period (e.g., $T_{on}$). For each of the plurality of switching periods, the first current signal discharges or charges the capacitor during only the demagnetization period (e.g., $T_{Demag}$), and the second current signal charges or discharges the capacitor during the switching period (e.g., $T_s$). Over the plurality of switching periods, accumulatively, the switching period (e.g., $T_s$) multiplied by the second current signal is equal to the demagnetization period (e.g., $T_{Demag}$) multiplied by the first current signal in magnitude.

According to yet another embodiment, a method (e.g., as implemented according to FIG. 23 and/or FIG. 25) for regulating a power converter includes generating a first current signal (e.g., the signal 2381) and a second current signal (e.g., the signal 2361), processing information associated with the first current signal and the second current signal, generating a voltage signal (e.g., the signal 2383), by at least a capacitor, based on at least information associated with the first current signal and the second current signal, and processing information associated with the voltage signal (e.g., the signal 2383) and an input signal (e.g., the signal 2393). The input signal is related to the primary winding. Additionally, the method includes generating a multiplication signal (e.g., the signal 2397) based on at least information associated with the voltage signal and the input signal, receiving the multiplication signal and the sensed signal (e.g., the signal 2352), and generating a comparison signal (e.g., the signal 2343) based on at least information associated with the multiplication signal and the sensed signal. Moreover, the method includes receiving at least the comparison signal, generating a modulation signal (e.g., the signal 2357) based on at least information associated with the comparison signal, receiving the modulation signal, and outputting a drive signal (e.g., the signal 2359) based on at least information associated with the modulation signal to affect the primary current flowing through the primary winding. The process for generating a first current signal (e.g., the signal 2381) and a second current signal (e.g., the signal 2361) includes processing information associated with the multiplication signal (e.g., the signal 2397) and generating the first current signal (e.g., the signal 2381) based on at least information associated with the multiplication signal. The drive signal is associated with at least a plurality of switching periods, each of the plurality of switching periods (e.g., $T_s$) includes at least an on-time period (e.g., $T_{on}$) and a demagnetization period (e.g., $T_{Demag}$), and the first current signal represents the primary current at the end of the on-time period (e.g., $T_{on}$). For each of the plurality of switching periods, the process for processing information associated with the first current signal and the second current signal includes discharging or charging the capacitor with the first current signal during only the demagnetization period (e.g., $T_{Demag}$), and charging or discharging the capacitor with the second current signal during the switching period (e.g., $T_s$). Over the plurality of switching periods, accumulatively, the switching period (e.g., $T_s$) multiplied by the second current signal is equal to the demagnetization period (e.g., $T_{Demag}$) multiplied by the first current signal in magnitude.

According to yet another embodiment, a system (e.g., as implemented according to FIG. 26 and/or FIG. 28) for regulating a power converter includes a sampling-and-holding and voltage-to-current-conversion component (e.g., the components 2662 and 2666) configured to receive at least a sensed signal (e.g., the signal 2652) and generate a first current signal (e.g., the signal 2681). The sensed signal is associated with a primary current flowing through a primary winding coupled to a secondary winding for a power converter. Additionally, the system includes a current-signal generator (e.g., the component 2660) configured to generate a second current signal (e.g., the signal 2661), and a capacitor (e.g., the component 2690 and/or the component 2890) coupled to the current-signal generator (e.g., the component 2660) and coupled, through a switch (e.g., the component 2680), to the sampling-and-holding and voltage-to-current-conversion component. The capacitor is configured to generate a voltage signal (e.g., the signal 2683). Moreover, the system includes a multiplier component (e.g., the component 2696) configured to process information associated with the voltage signal (e.g., the signal 2683) and an input signal (e.g., the signal 2693) and generate a multiplication signal (e.g., the signal 2697) based on at least information associated with the voltage signal and the input signal. The input signal is related to the primary winding. Also, the system includes a comparator (e.g., the component 2642) configured to receive the multiplication signal (e.g., the signal 2697) and the sensed signal (e.g., the signal 2652) and generate a comparison signal (e.g., the signal 2643) based on at least information associated with the multiplication signal and the sensed signal, a modulation-signal generator (e.g., the component 2654) configured to receive at least the comparison signal and generate a modulation signal (e.g., the signal 2657), and a gate driver (e.g., the component 2658) configured to receive the modulation signal and output a drive signal (e.g., the signal 2659) to a switch, the switch being configured to affect the primary current flowing through the primary winding. The drive signal is associated with at least a plurality of switching periods, each of the plurality of switching periods (e.g., $T_s$) includes at least an on-time period (e.g., $T_{on}$) for the switch and a demagnetization period (e.g., $T_{Demag}$) for a demagnetization process, and the first current signal represents the primary current at the end of the on-time period (e.g., $T_{on}$). For each of the plurality of switching periods, the first current signal discharges or charges the capacitor during only the demagnetization period (e.g., $T_{Demag}$), and the second current signal charges or discharges the capacitor during the switching period (e.g., $T_s$). Over the plurality of switching periods, accumulatively, the switching period (e.g., $T_s$) multiplied by the second current signal is equal to the demagnetization period (e.g., $T_{Demag}$) multiplied by the first current signal in magnitude.

According to yet another embodiment, a method (e.g., as implemented according to FIG. 26 and/or FIG. 28) for regulating a power converter includes receiving at least a sensed signal (e.g., the signal 2652). The sensed signal is associated with a primary current flowing through a primary winding coupled to a secondary winding for a power converter. Additionally, the method includes processing information associated with the sensed signal, generating a first current signal (e.g., the signal 2681) based on at least information associated with the sensed signal, generating a second current signal (e.g., the signal 2661), processing information associated with the first current signal and the second current signal, generating a voltage signal (e.g., the signal 2683), by at least a capacitor, based on at least information associated with the first current signal and the second current signal, and processing information associated with the voltage signal (e.g., the signal 2683) and an input signal (e.g., the signal 2693). The input signal is related to the primary winding. Moreover, the method includes generating a multiplication signal (e.g., the signal 2697) based on at least information associated with the voltage signal and the input signal, receiving the multiplication signal (e.g., the signal 2697) and the sensed signal (e.g., the signal 2652), and generating a comparison signal (e.g., the signal 2643) based on at least information associated with the multiplication signal and the sensed signal. Also, the method includes receiving at least the comparison signal, generating a modulation signal (e.g., the signal 2657) based on at least information associated with the comparison signal, receiving the modulation signal, and outputting a drive signal (e.g., the signal 2659) based on at least information associated with the modulation signal to affect the primary current flowing through the primary winding. The drive signal is associated with at least a plurality of switching periods, each of the plurality of switching periods (e.g., $T_s$) includes at least an on-time period (e.g., $T_{on}$) and a demagnetization period (e.g., $T_{Demag}$), and the first current signal represents the primary current at the end of the on-time period (e.g., $T_{on}$). For each of the plurality of switching periods, the process for processing information associated with the first current signal and the second current signal includes discharging or charging the capacitor with the first current signal during only the demagnetization period (e.g., $T_{Demag}$), and charging or discharging the capacitor with the second current signal during the switching period (e.g., $T_s$). Over the plurality of switching periods, accumulatively, the switching period (e.g., $T_s$) multiplied by the second current signal is equal to the demagnetization period (e.g., $T_{Demag}$) multiplied by the first current signal in magnitude.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined. In yet another example, various embodiments and/or examples of the present invention are combined so that a power conversion system can provide constant current control in various operation modes, such as in all of the DCM mode, the CCM mode and the QR mode under certain conditions (e.g., with different input voltages).

The present invention has a wide range of applications. Certain embodiments of the present invention can be used to drive one or more light emitting diodes with high power factor and precise control of constant output current.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for regulating a power converter, the system comprising:
a voltage-to-current converter configured to generate a first current signal;
a current-signal generator configured to generate a second current signal;
a capacitor coupled to the current-signal generator and the voltage-to-current converter, the capacitor being configured to generate a voltage signal; and
a drive signal generator configured to receive the voltage signal and a sensed signal, generate a drive signal based at least in part on the voltage signal and the sensed signal, and output the drive signal to a switch to affect a primary current of a power converter, the sensed signal being associated with the primary current;

wherein the voltage-to-current converter is further configured to generate the first current signal based at least in part on the voltage signal;

wherein:
   the drive signal is associated with at least one or more switching periods, each switching period of the one or more switching periods including at least an on-time period for the switch and a demagnetization period for a demagnetization process; and
   the first current signal represents the primary current at an end of the on-time period;
wherein for each switching period of the one or more switching periods,
   the first current signal discharges or charges the capacitor during only the demagnetization period;
   the second current signal charges or discharges the capacitor during the switching period; and
   the switching period multiplied by the second current signal is equal to the demagnetization period multiplied by the first current signal in magnitude.

2. The system of claim 1, and further comprising a low-pass filter coupled to the capacitor, the drive signal generator, and the voltage-to-current converter.

3. The system of claim 1 wherein:
   the voltage-to-current converter, the current-signal generator, and the drive signal generator are located on a chip; and
   the capacitor is located on or off the chip.

4. The system of claim 1 is configured to regulate an output current at a predetermined constant level in a quasi-resonant mode.

5. The system of claim 1, and further comprising a pulse-signal generator configured to output one or more signal pulses to the drive signal generator in response to one or more demagnetization pulses corresponding to one or more demagnetization periods.

6. A method for regulating a power converter, the method comprising:
   generating a first current signal and a second current signal;
   processing the first current signal and the second current signal;
   generating a voltage signal, by a capacitor, based at least in part on the first current signal and the second current signal;
   generating a drive signal based at least in part on the voltage signal and a sensed signal, the sensed signal being associated with a primary current of a power converter; and
   outputting the drive signal to affect the primary current;
wherein the generating a first current signal and a second current signal includes generating the first current signal based at least in part on the voltage signal;
wherein:
   the drive signal is associated with at least one or more switching periods, each switching period of the one or more switching periods including at least an on-time period and a demagnetization period; and
   the first current signal represents the primary current at an end of the on-time period;
wherein for each switching period of the one or more switching periods, the processing the first current signal and the second current signal includes:
   discharging or charging the capacitor with the first current signal during only the demagnetization period; and
   charging or discharging the capacitor with the second current signal during the switching period;
wherein the switching period multiplied by the second current signal is equal to the demagnetization period multiplied by the first current signal in magnitude.

7. A system for regulating a power converter, the system comprising:
   a first signal generator configured to receive a sensed signal and generate a first current signal, the sensed signal being associated with a primary current of a power converter;
   a second signal generator configured to receive the sensed signal and generate a second current signal;
   a current-signal generator configured to generate a third current signal;
   a capacitor coupled to the current-signal generator, the first signal generator, and the second signal generator, the capacitor being configured to generate a voltage signal; and
   a drive signal generator configured to generate a drive signal based at least in part on the voltage signal and a ramping signal, and output the drive signal to a switch to affect the primary current;
wherein:
   the drive signal is associated with at least a plurality of switching periods, each switching period of the plurality of switching periods including at least an on-time period for the switch and a demagnetization period for a demagnetization process;
   the first current signal represents the primary current at a beginning of the on-time period; and
   the second current signal represents the primary current at an end of the on-time period;
wherein for each switching period of the plurality of switching periods,
   the first current signal and the second current signal discharge or charge the capacitor during only the demagnetization period; and
   the third current signal charges or discharges the capacitor during the switching period;
wherein over the plurality of switching periods, accumulatively, the switching period multiplied by the third current signal is equal to the demagnetization period multiplied by a sum of the first current signal and the second current signal in magnitude.

8. The system of claim 7, and further comprising a low-pass filter coupled to the capacitor and the drive signal generator.

9. The system of claim 7 wherein:
   the first signal generator, the second signal generator, the current-signal generator, and the drive signal generator are located on a chip; and
   the capacitor is located on or off the chip.

10. The system of claim 7 is configured to regulate an output current at a predetermined constant level in a discontinuous conduction mode and a continuous conduction mode.

11. The system of claim 10 is further configured to achieve a power factor that is equal to or larger than 0.9 in the discontinuous conduction mode and the continuous conduction mode.

12. The system of claim 7 is configured to regulate an output current at a predetermined constant level in a discontinuous conduction mode.

13. The system of claim 12 is further configured to achieve a power factor that is equal to or larger than 0.9 in the discontinuous conduction mode.

14. The system of claim 7 is configured to regulate an output current at a predetermined constant level in a continuous conduction mode.

15. The system of claim 14 is further configured to achieve a power factor that is equal to or larger than 0.9 in the continuous conduction mode.

16. The system of claim wherein the on-time period is constant.

17. The system of claim 7, and further comprising a ramping signal generator configured to generate the ramping signal.

18. A method for regulating a power converter, the method comprising:
receiving a sensed signal, the sensed signal being associated with a primary current of a power converter;
generating a first current signal and a second current signal based at least in part on the sensed signal;
generating a third current signal;
processing information associated with the first current signal, the second current signal and the third current signal;
generating a voltage signal, by at least a capacitor, based at least in part on the first current signal, the second current signal and the third current signal;
generating a drive signal based at least in part on the voltage signal and a ramping signal; and
outputting the drive signal to affect the primary current;
wherein:
the drive signal is associated with at least a plurality of switching periods, each switching period of the plurality of switching periods including at least an on-time period and a demagnetization period;
the first current signal represents the primary current at a beginning of the on-time period; and
the second current signal represents the primary current at an end of the on-time period;
wherein for each switching period of the plurality of switching periods, the processing information associated with the first current signal, the second current signal and the third current signal includes:
discharging or charging the capacitor with the first current signal and the second current signal during only the demagnetization period; and
charging or discharging the capacitor with the third current signal during the switching period;
wherein over the plurality of switching periods, accumulatively, the switching period multiplied by the third current signal is equal to the demagnetization period multiplied by a sum of the first current signal and the second current signal in magnitude.

19. A system for regulating a power converter, the system comprising:
a voltage-to-current converter configured to generate a first current signal;
a current-signal generator configured to generate a second current signal;
a capacitor coupled to the current-signal generator and the voltage-to-current converter, the capacitor being configured to generate a voltage signal;
a multiplication signal generator configured to generate a multiplication signal based at least in part on the voltage signal and an input signal, the input signal being related to a primary winding; and a drive signal generator configured to receive the multiplication signal and a sensed signal, generate a drive signal based at least in part on the multiplication signal and the sensed signal, and output the drive signal to a switch to affect a primary current flowing through the primary winding;
wherein the voltage-to-current converter is further configured to process information associated with the multiplication signal and generate the first current signal based on at least information associated with the multiplication signal;
wherein:
the drive signal is associated with at least a plurality of switching periods, each switching period of the plurality of switching periods including at least an on-time period for the switch and a demagnetization period for a demagnetization process; and
the first current signal represents the primary current at an end of the on-time period;
wherein for each switching period of the plurality of switching periods,
the first current signal discharges or charges the capacitor during only the demagnetization period; and
the second current signal charges or discharges the capacitor during the switching period;
wherein over the plurality of switching periods, accumulatively, the switching period multiplied by the second current signal is equal to the demagnetization period multiplied by the first current signal in magnitude.

20. The system of claim 19, and further comprising a low-pass filter coupled to the capacitor and the multiplication signal generator.

21. The system of claim 19 wherein:
the voltage-to-current converter, the current-signal generator, the multiplication signal generator, and the drive signal generator are located on a chip; and
the capacitor is located on or off the chip.

22. The system of claim 19 is configured to regulate an output current at a predetermined constant level in a quasi-resonant mode.

23. The system of claim 21 is further configured to achieve a power factor that is equal to or larger than 0.9 in a quasi-resonant mode.

24. The system of claim 19, and further comprising a pulse-signal generator configured to output one or more signal pulses to the drive signal generator in response to one or more demagnetization pulses corresponding to one or more demagnetization periods.

25. A method for regulating a power converter, the method comprising:
generating a first current signal and a second current signal;
processing the first current signal and the second current signal;
generating a voltage signal, by at least a capacitor, based at least in part on the first current signal and the second current signal;
generating a multiplication signal based at least in part on the voltage signal and an input signal, the input signal being related to a primary winding;
generating a drive signal based at least in part on the multiplication signal and a sensed signal; and
outputting the drive signal to affect a primary current flowing through the primary winding;
wherein the generating a first current signal and a second current signal includes generating the first current signal based at least in part on the multiplication signal;

wherein:
the drive signal is associated with at least a plurality of switching periods, each switching period of the plurality of switching periods including at least an on-time period and a demagnetization period; and
the first current signal represents the primary current at an end of the on-time period;
wherein for each switching period of the plurality of switching periods, the processing the first current signal and the second current signal includes:
discharging or charging the capacitor with the first current signal during only the demagnetization period; and
charging or discharging the capacitor with the second current signal during the switching period;
wherein over the plurality of switching periods, accumulatively, the switching period multiplied by the second current signal is equal to the demagnetization period multiplied by the first current signal in magnitude.

* * * * *